(12) United States Patent
Lee

(10) Patent No.: US 11,570,436 B2
(45) Date of Patent: Jan. 31, 2023

(54) VIDEO SIGNAL ENCODING/DECODING METHOD AND DEVICE THEREFOR

(71) Applicant: APPLE INC., Cupertino, CA (US)

(72) Inventor: Bae Keun Lee, Seongnam-si (KR)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/259,668

(22) PCT Filed: Jan. 28, 2020

(86) PCT No.: PCT/KR2020/001299
§ 371 (c)(1),
(2) Date: Jan. 12, 2021

(87) PCT Pub. No.: WO2020/159198
PCT Pub. Date: Aug. 6, 2020

(65) Prior Publication Data
US 2021/0360240 A1    Nov. 18, 2021

(30) Foreign Application Priority Data

Jan. 28, 2019  (KR) .................. 10-2019-0010245
Jan. 28, 2019  (KR) .................. 10-2019-0010246

(51) Int. Cl.
*H04N 19/00* (2014.01)
*H04N 19/119* (2014.01)
(Continued)

(52) U.S. Cl.
CPC ......... *H04N 19/119* (2014.11); *H04N 19/105* (2014.11); *H04N 19/159* (2014.11);
(Continued)

(58) Field of Classification Search
CPC ............. H04N 19/119; H04N 19/105; H04N 19/159; H04N 19/176; H04N 19/46;
(Continued)

(56) References Cited

U.S. PATENT DOCUMENTS 8,406,292 B2 * 3/2013 Shimada .............. G11B 27/034
                                                            375/240.01
8,699,581 B2 * 4/2014 Koyabu ........... H04N 21/44008
                                                            375/240.12
(Continued)

FOREIGN PATENT DOCUMENTS

WO    2018/016823 A1    1/2018
WO    2018/097691 A2    5/2018
(Continued)

OTHER PUBLICATIONS

International Preliminary Report on Patentability in International Appln. No. PCT/KR2020/001299, dated Aug. 12, 2021, 12 pages (with English Translation).
(Continued)

*Primary Examiner* — Frank F Huang
(74) *Attorney, Agent, or Firm* — Fish & Richardson P.C.

(57) ABSTRACT

A video decoding method according to the present invention may comprise: a step for determining whether to divide a current block into a plurality of sub-blocks; a step for determining an intra prediction mode for the current block; and a step for performing intra prediction for each sub-block on the basis of the intra prediction mode, when the current block is divided into the plurality of sub-blocks.

15 Claims, 26 Drawing Sheets

(51) Int. Cl.
*H04N 19/105* (2014.01)
*H04N 19/159* (2014.01)
*H04N 19/176* (2014.01)
*H04N 19/46* (2014.01)
*H04N 19/61* (2014.01)
*H04N 19/625* (2014.01)
*H04N 19/172* (2014.01)
*H04N 19/179* (2014.01)
*H04N 19/182* (2014.01)
*H04N 19/194* (2014.01)
*H04N 19/196* (2014.01)
*H04N 19/31* (2014.01)
*H04N 19/33* (2014.01)
*H04N 19/426* (2014.01)

(52) U.S. Cl.
CPC ........... *H04N 19/176* (2014.11); *H04N 19/46* (2014.11); *H04N 19/619* (2014.11); *H04N 19/625* (2014.11); *H04N 19/172* (2014.11); *H04N 19/179* (2014.11); *H04N 19/182* (2014.11); *H04N 19/194* (2014.11); *H04N 19/196* (2014.11); *H04N 19/31* (2014.11); *H04N 19/33* (2014.11); *H04N 19/428* (2014.11)

(58) Field of Classification Search
CPC .............. H04N 19/619; H04N 19/625; H04N 19/172; H04N 19/179; H04N 19/182; H04N 19/194; H04N 19/196; H04N 19/31; H04N 19/33; H04N 19/428; H04N 19/12; H04N 19/11; H04N 19/70; H04N 19/184; H04N 19/436; H04N 19/50; H04N 19/593
See application file for complete search history.

(56) References Cited

U.S. PATENT DOCUMENTS

| | | | |
|---|---|---|---|
| 10,805,636 B2* | 10/2020 | Heo | H04N 19/132 |
| 2009/0232204 A1* | 9/2009 | Lee | H04N 19/146 |
| | | | 375/E7.076 |
| 2010/0074340 A1* | 3/2010 | Luo | H04N 21/44004 |
| | | | 375/E7.027 |
| 2010/0130136 A1* | 5/2010 | Sepehri-Nik | G06Q 30/02 |
| | | | 455/67.11 |
| 2010/0167689 A1* | 7/2010 | Sepehri-Nik | H04M 3/5158 |
| | | | 455/405 |
| 2019/0222837 A1* | 7/2019 | Lee | H04N 19/44 |

FOREIGN PATENT DOCUMENTS

| | | |
|---|---|---|
| WO | 2018/174457 A1 | 9/2018 |
| WO | 2018/212430 A1 | 11/2018 |

OTHER PUBLICATIONS

International Search Report and Written Opinion in International Appln. No. PCT/KR2020/001299, dated May 4, 2020, 14 pages (with English Translation).

* cited by examiner

[FIG. 1]
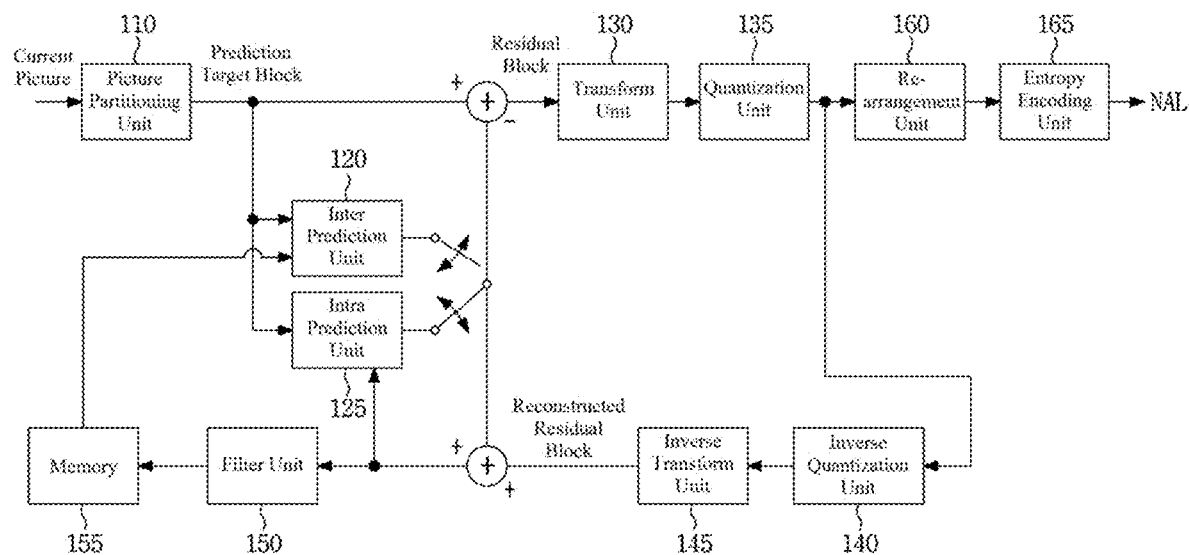
[FIG. 2]
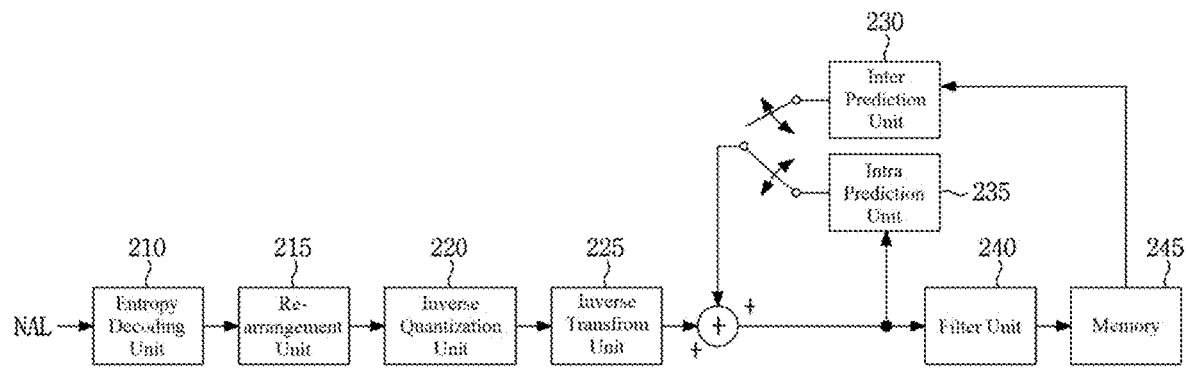

[FIG. 3]
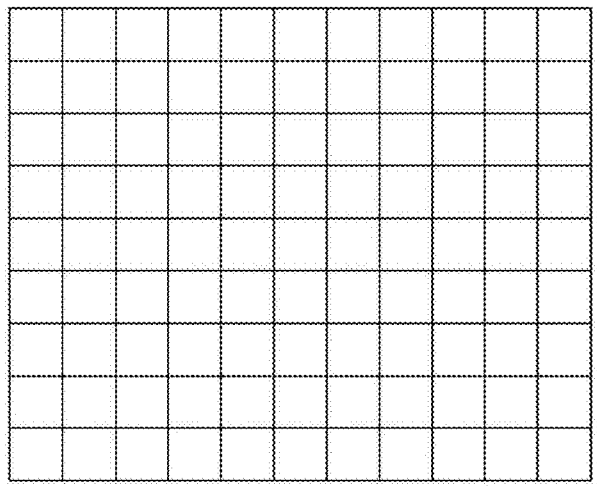
[FIG. 4]
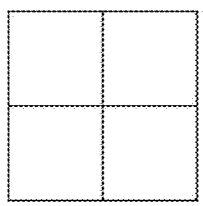 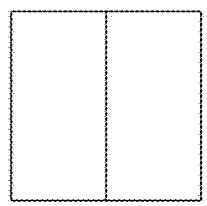 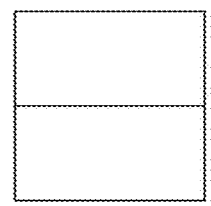 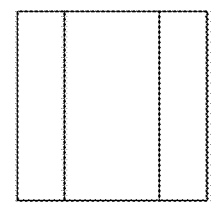 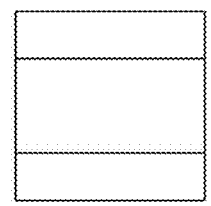
SPLIT_QT    SPLIT_BT_VER    SPLIT_BT_HOR    SPLIT_TT_VER    SPLIT_TT_HOR
[FIG. 5]
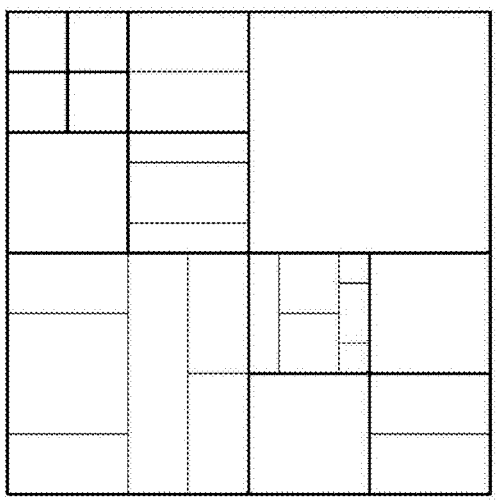

[FIG. 6]
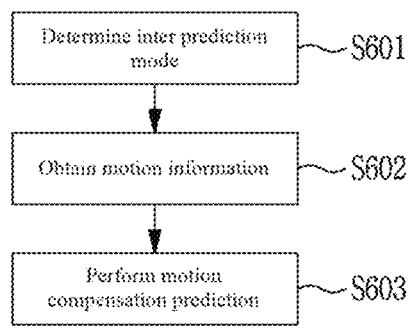
[FIG. 7]
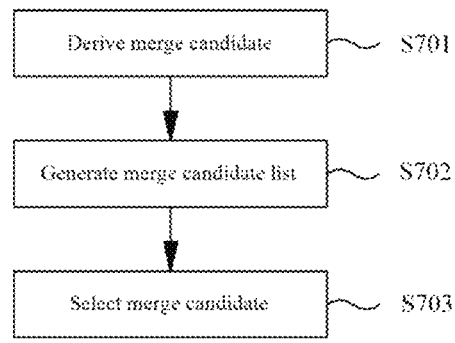

[FIG. 8]
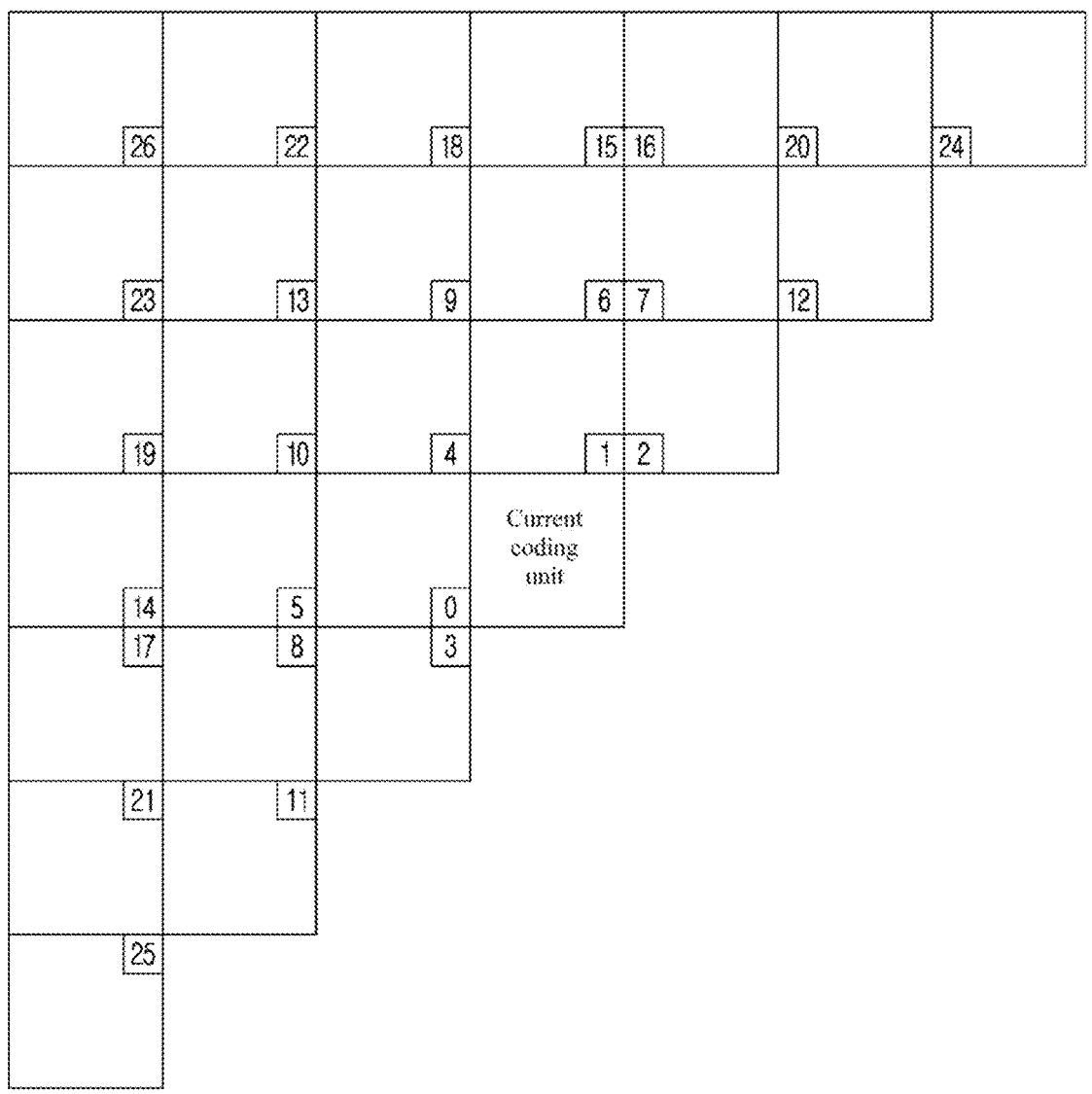

[FIG. 9]
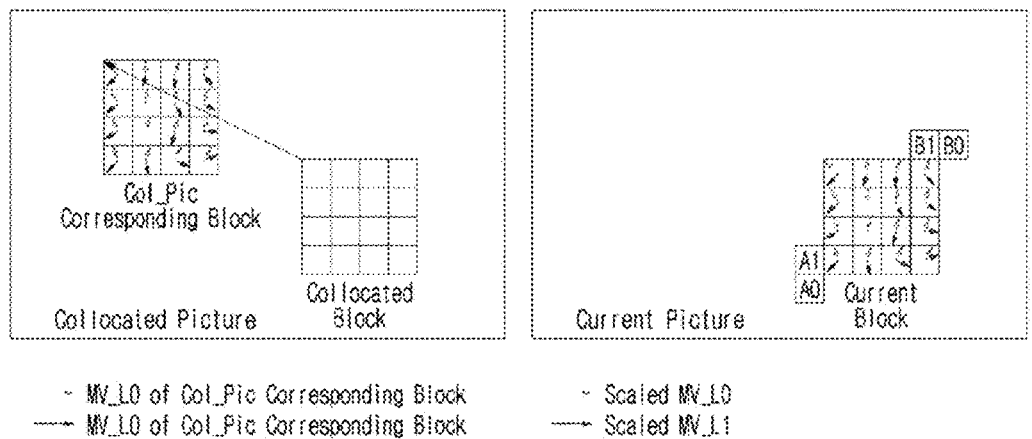
[FIG. 10]
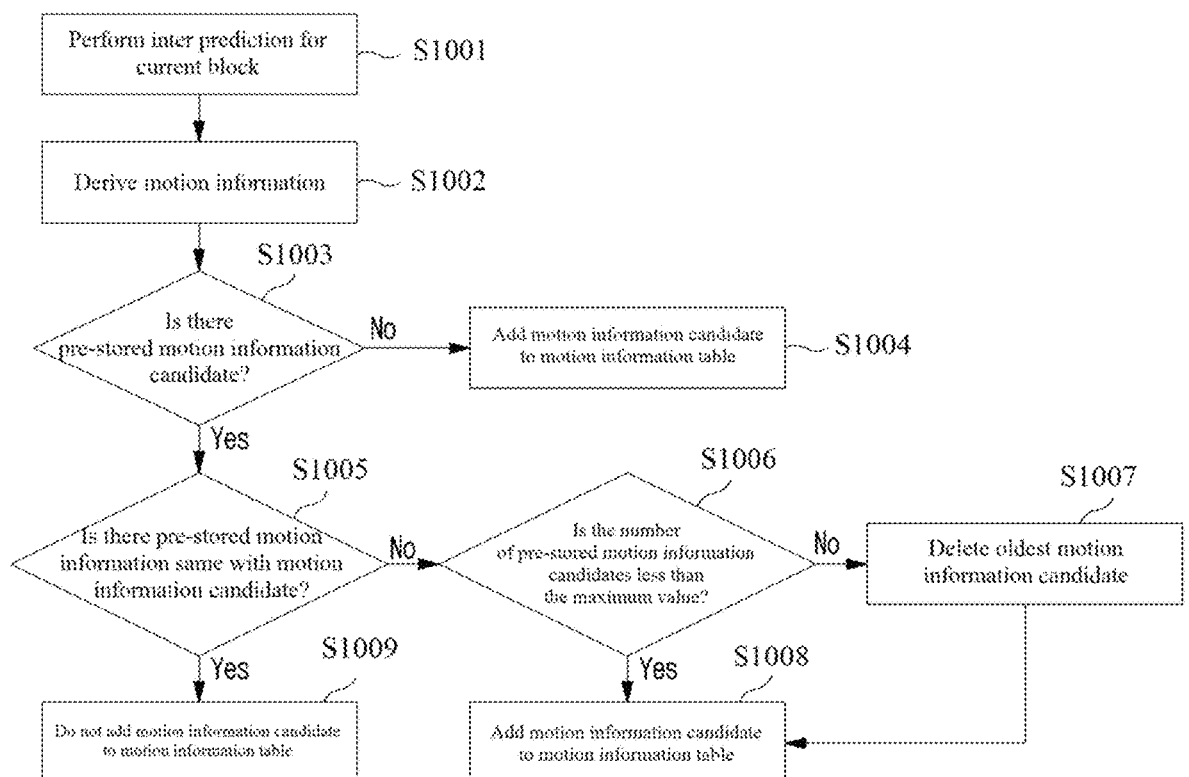

[FIG. 11]
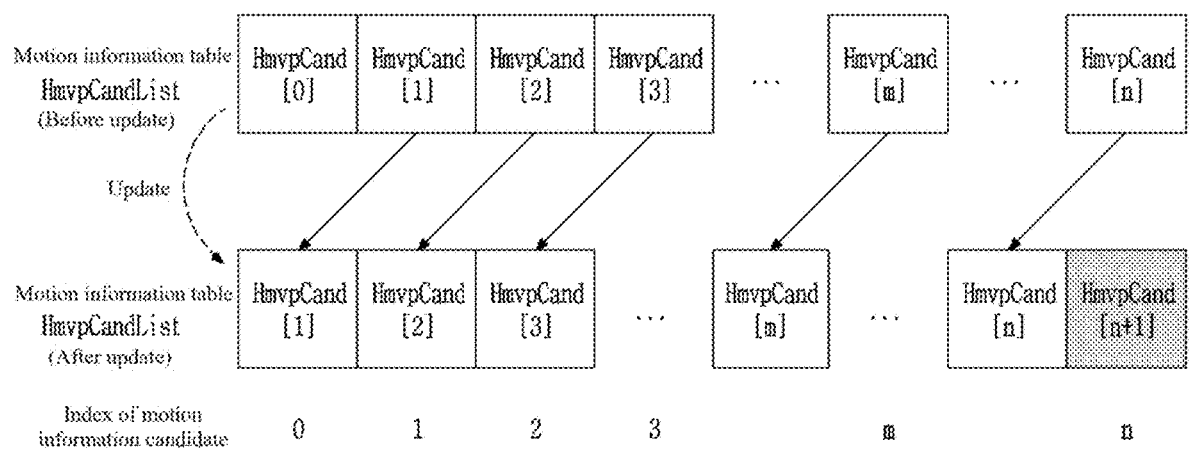
[FIG. 12]
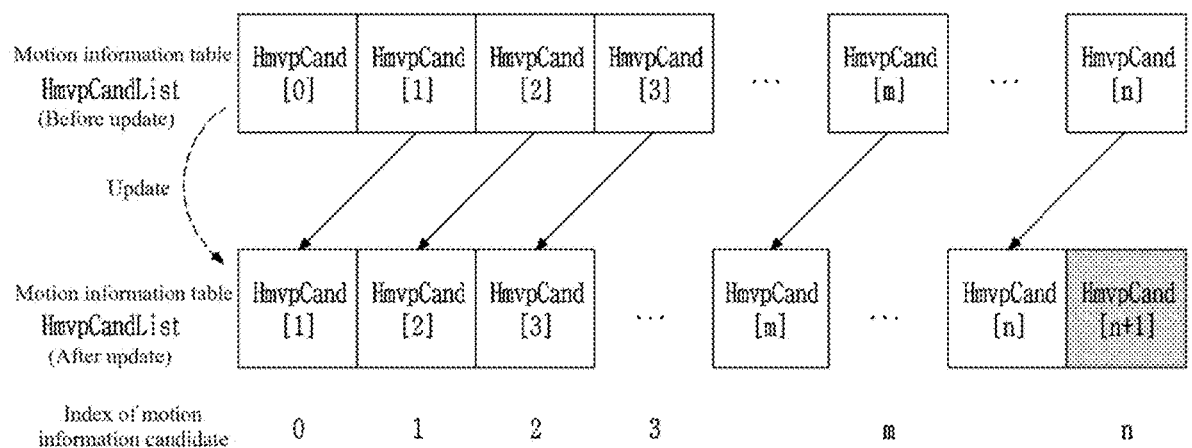

[FIG. 13]
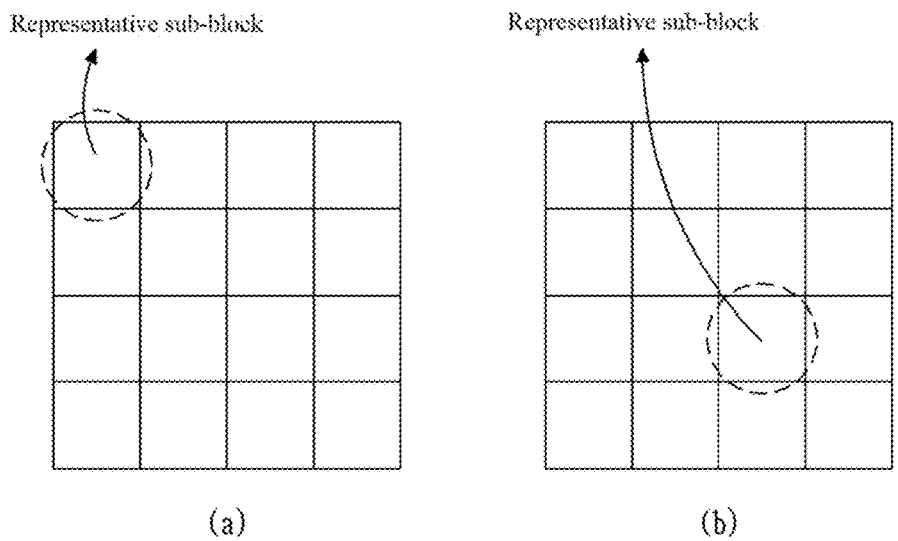
(a)         (b)
[FIG. 14]
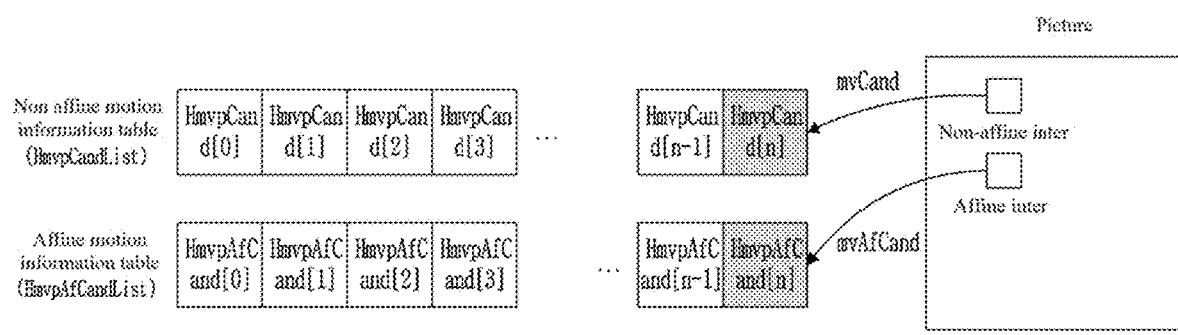

[FIG. 15]
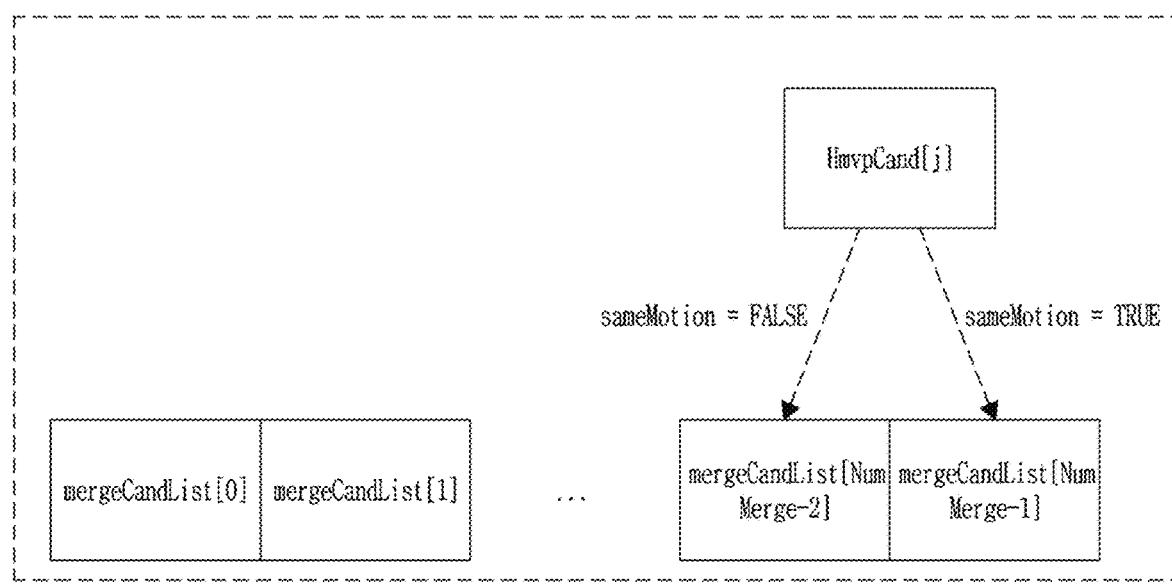

[FIG. 16]
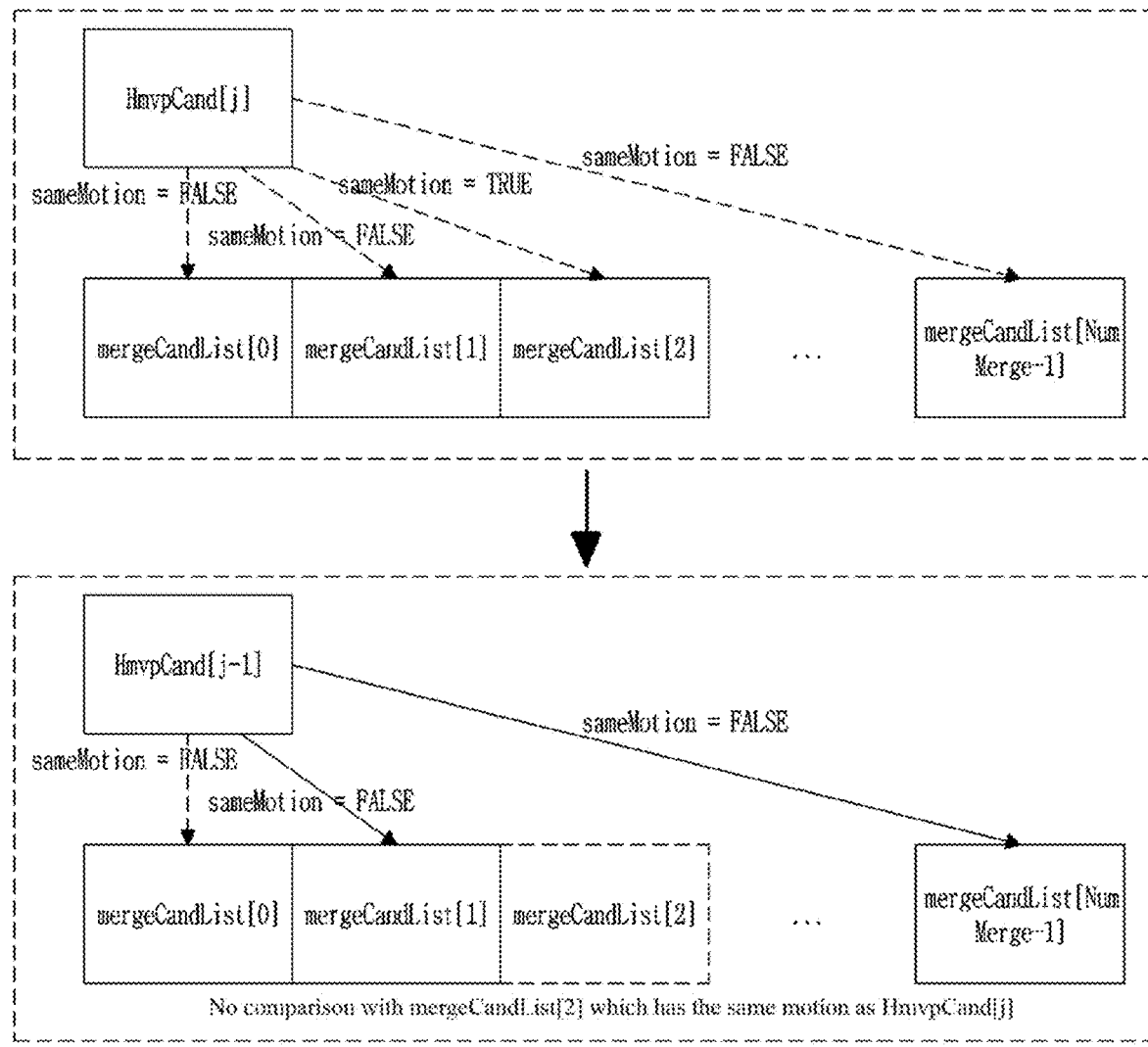
[FIG. 17]
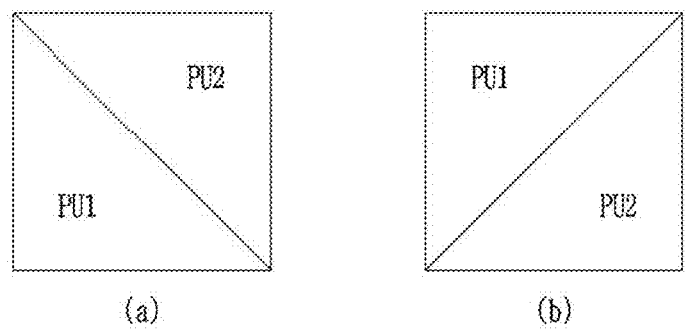

[FIG. 18]
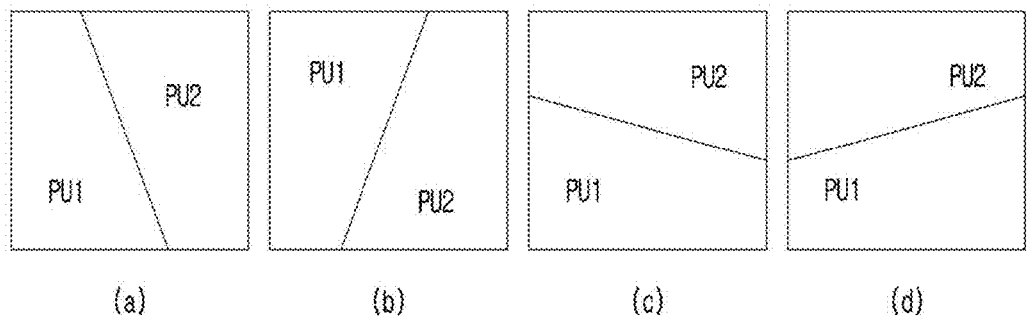
[FIG. 19]
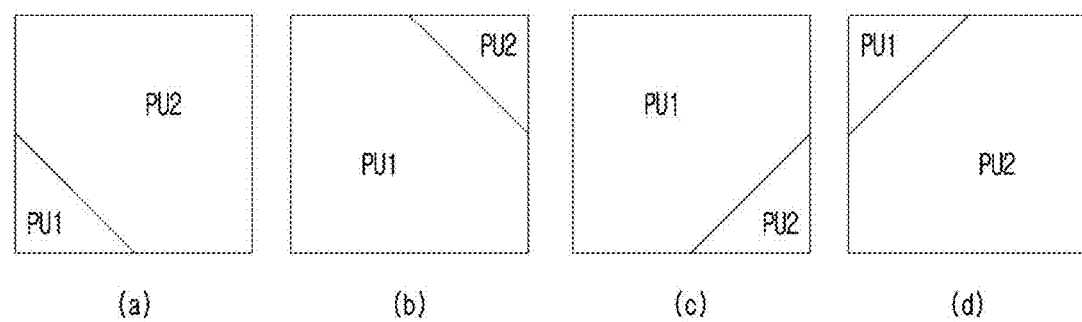
[FIG. 20]
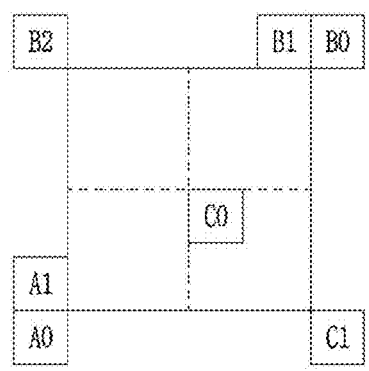

[FIG. 21]
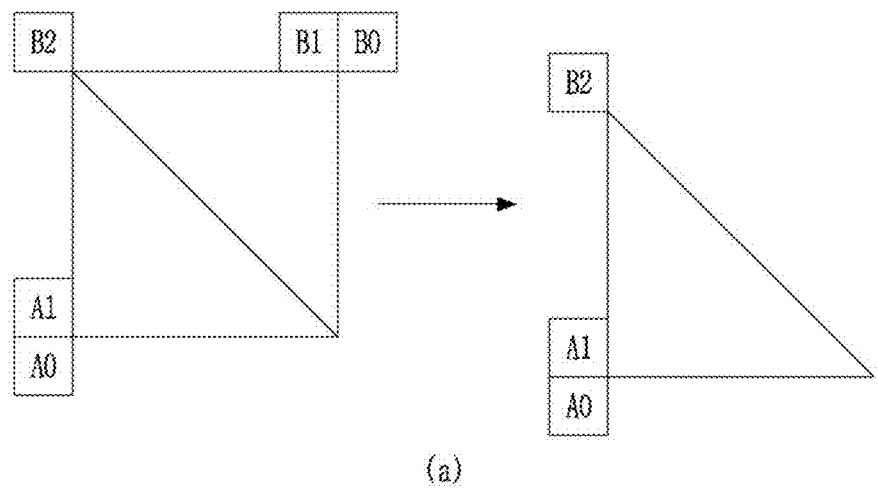
(a)
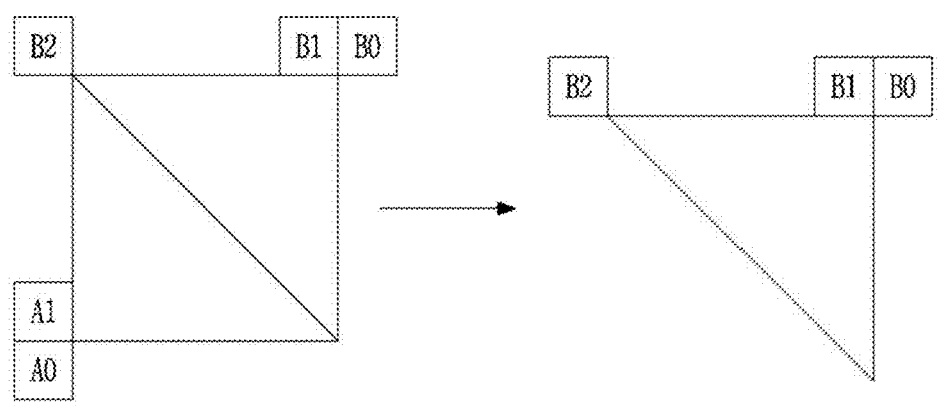
(b)

[FIG. 24]
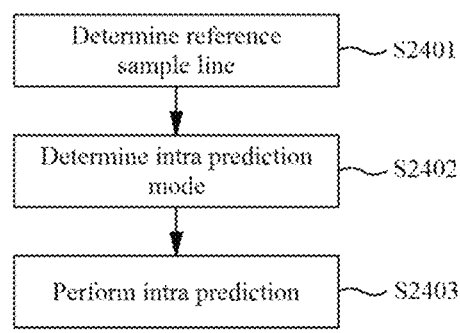

【FIG. 25】
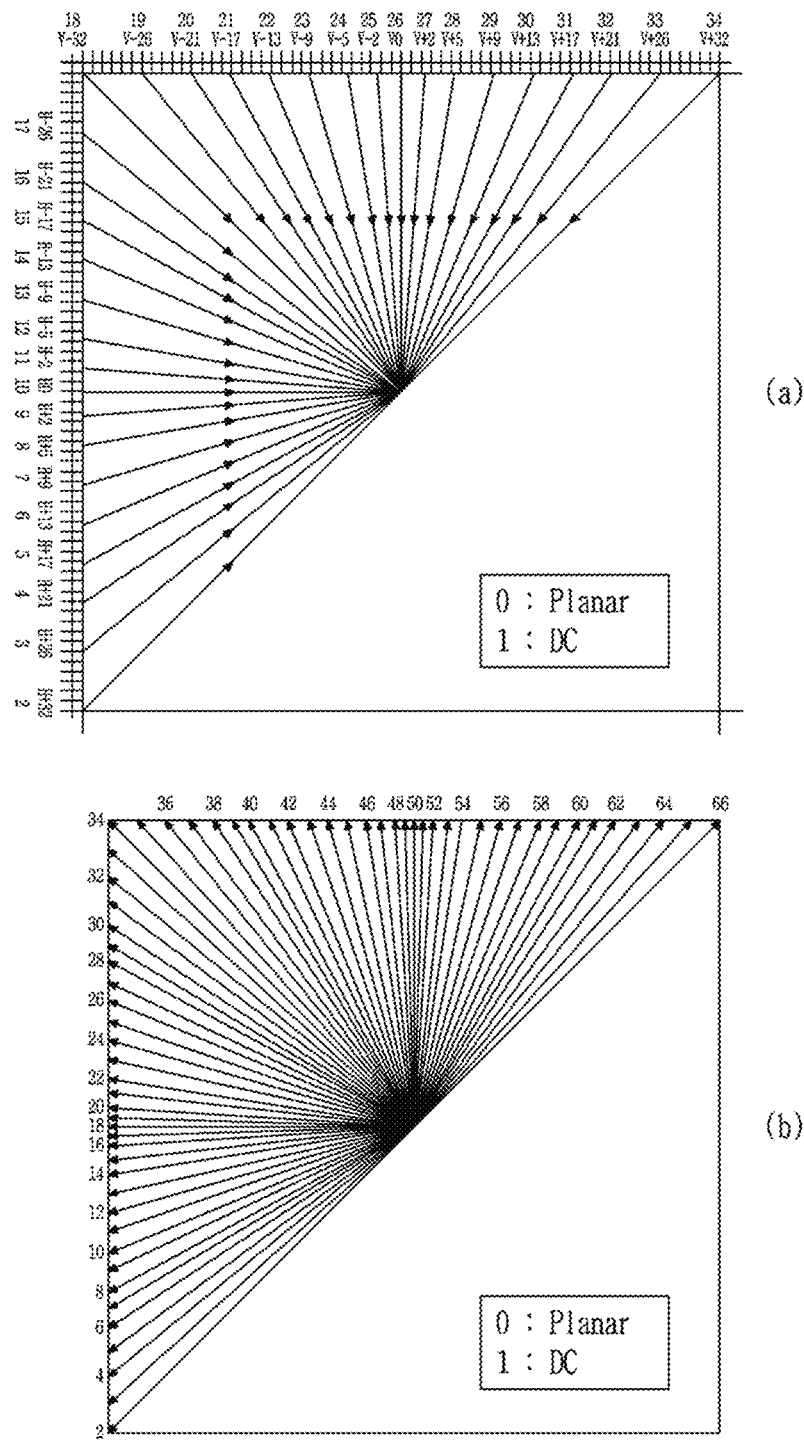

[FIG. 26]
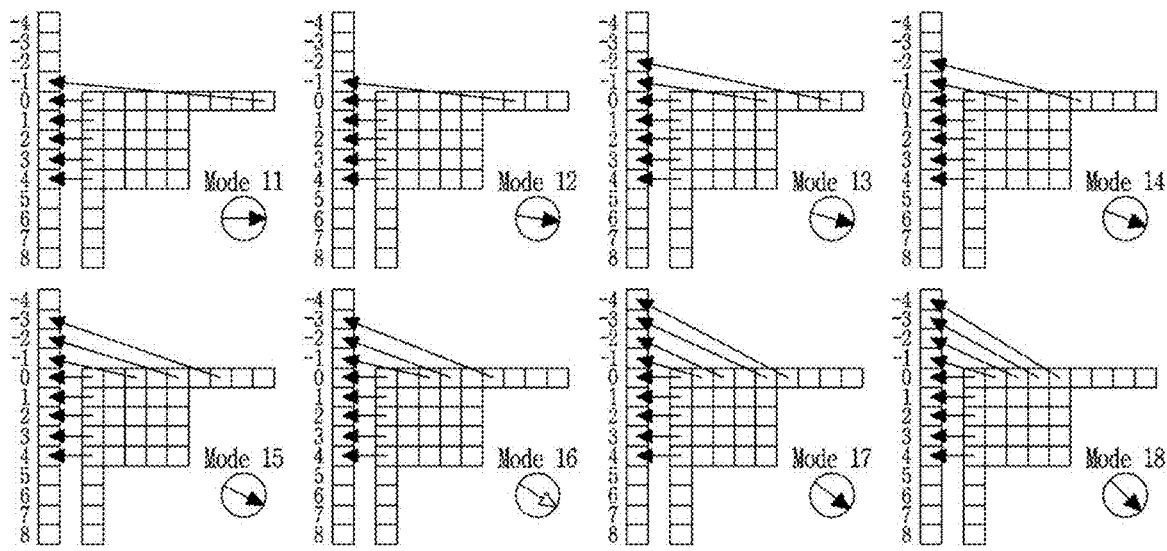
[FIG. 27]
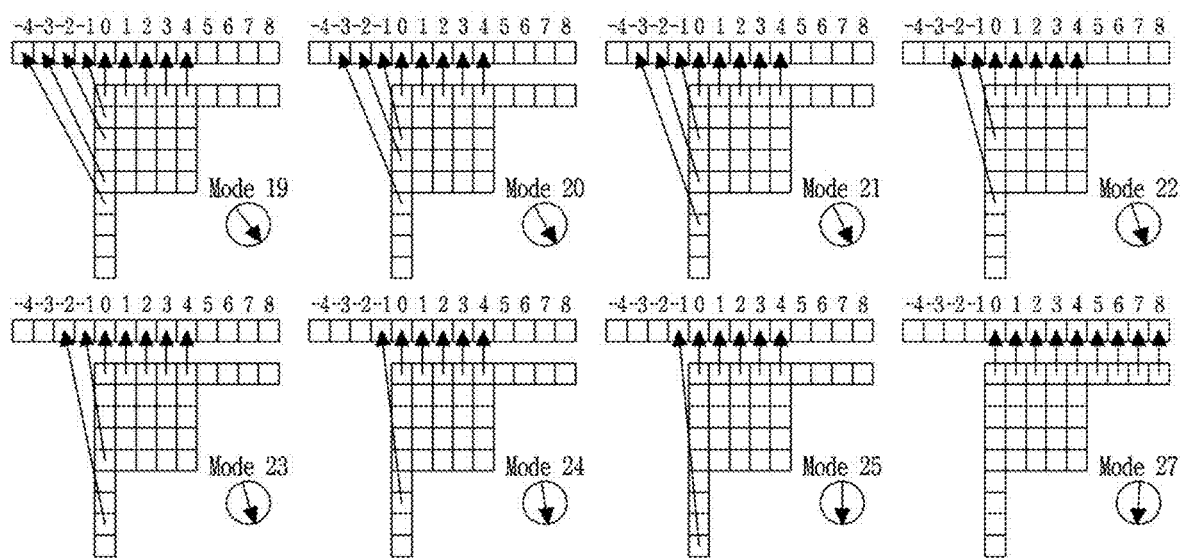

[FIG. 28]
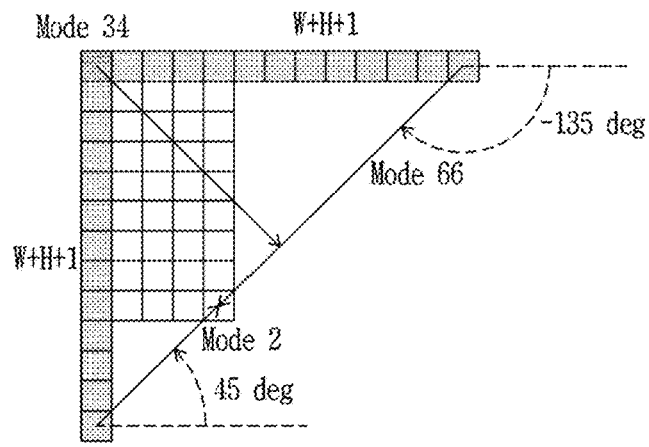
[FIG. 29]
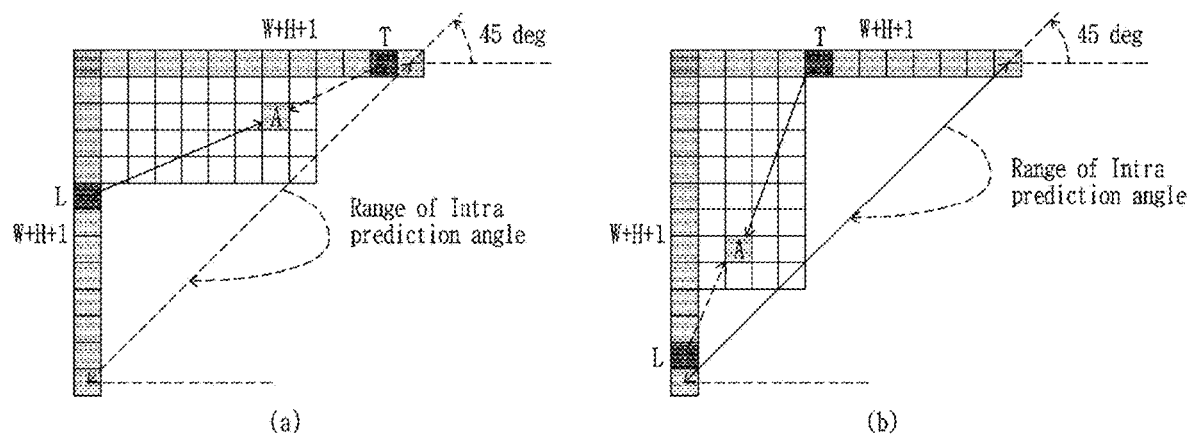
(a)　　　　　　　　　　　　　　(b)

【FIG. 30】
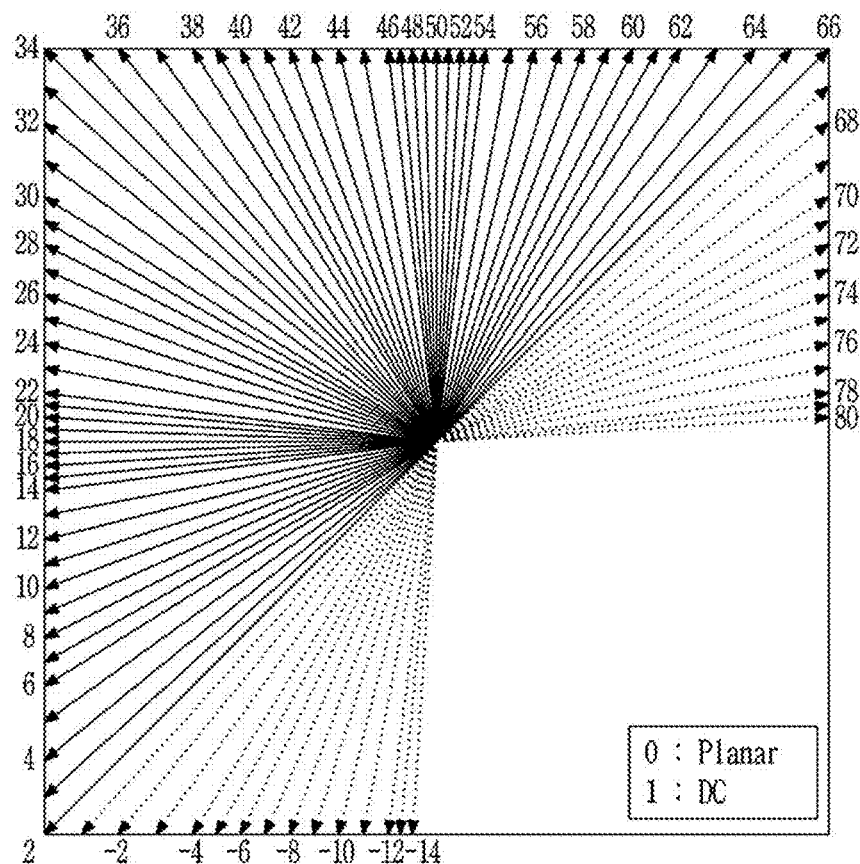

[FIG. 31]
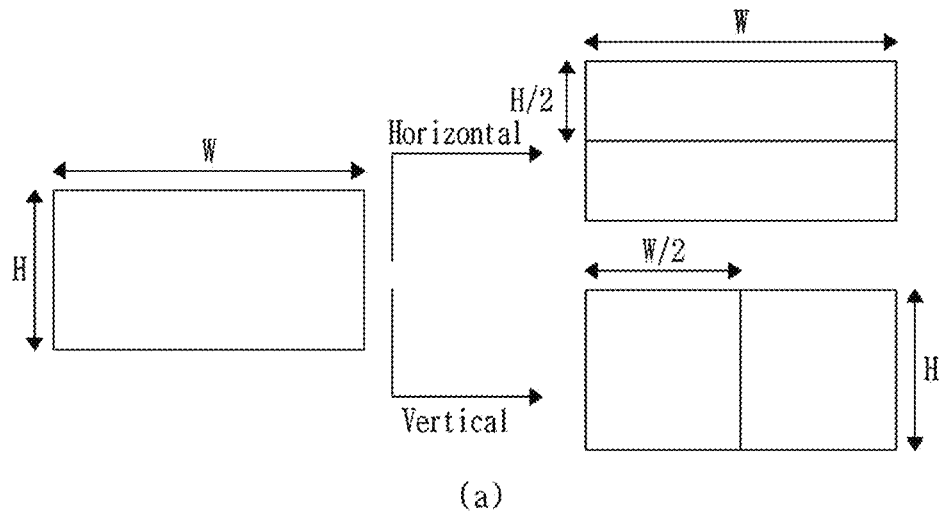
(a)
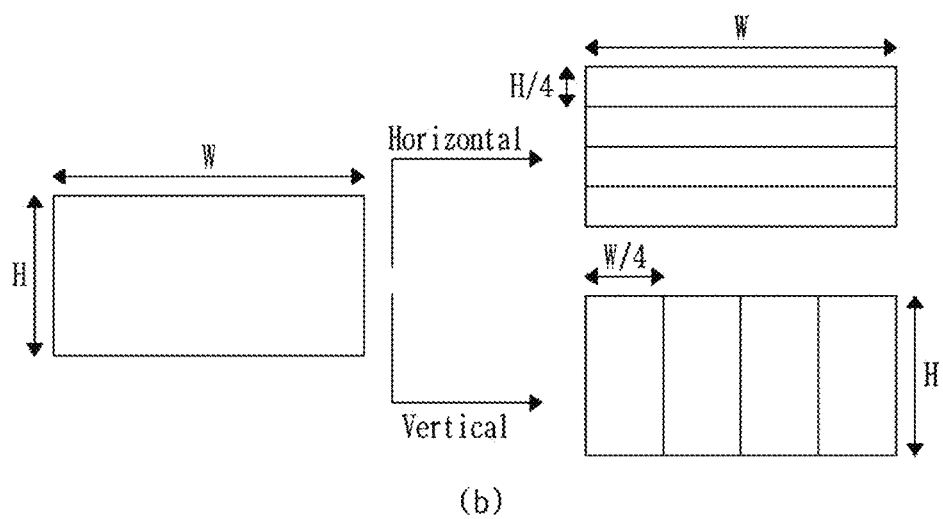
(b)
[FIG. 32]
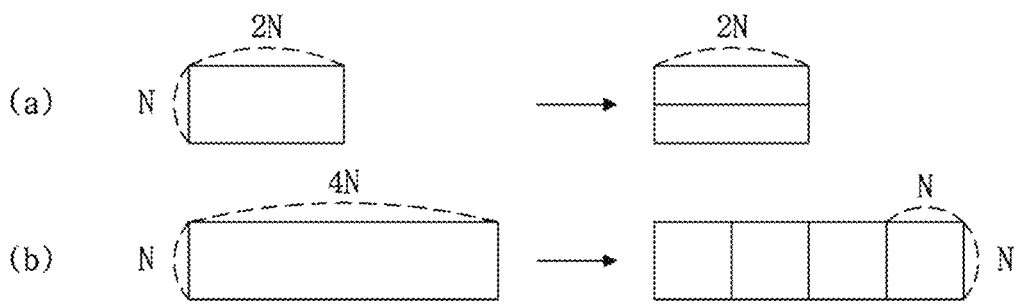

[FIG. 33]
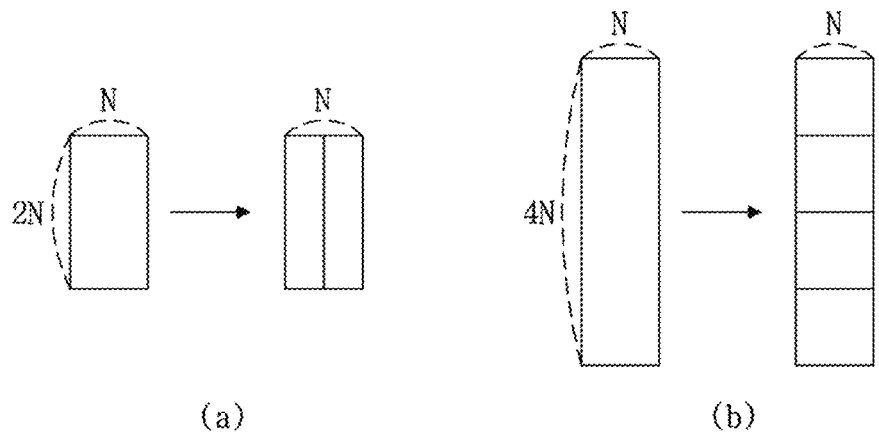
(a)     (b)
[FIG. 34]
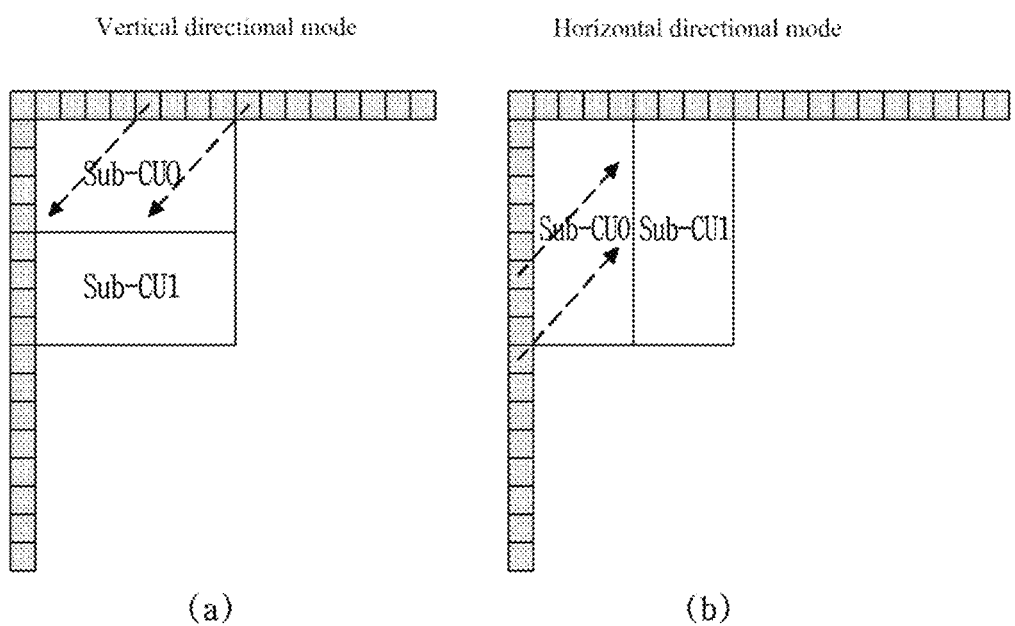
(a)     (b)

【FIG. 35】
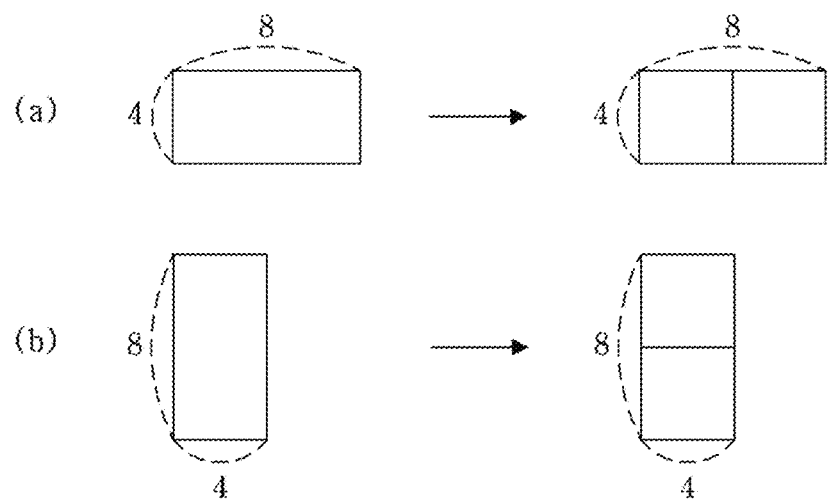
【FIG. 36】
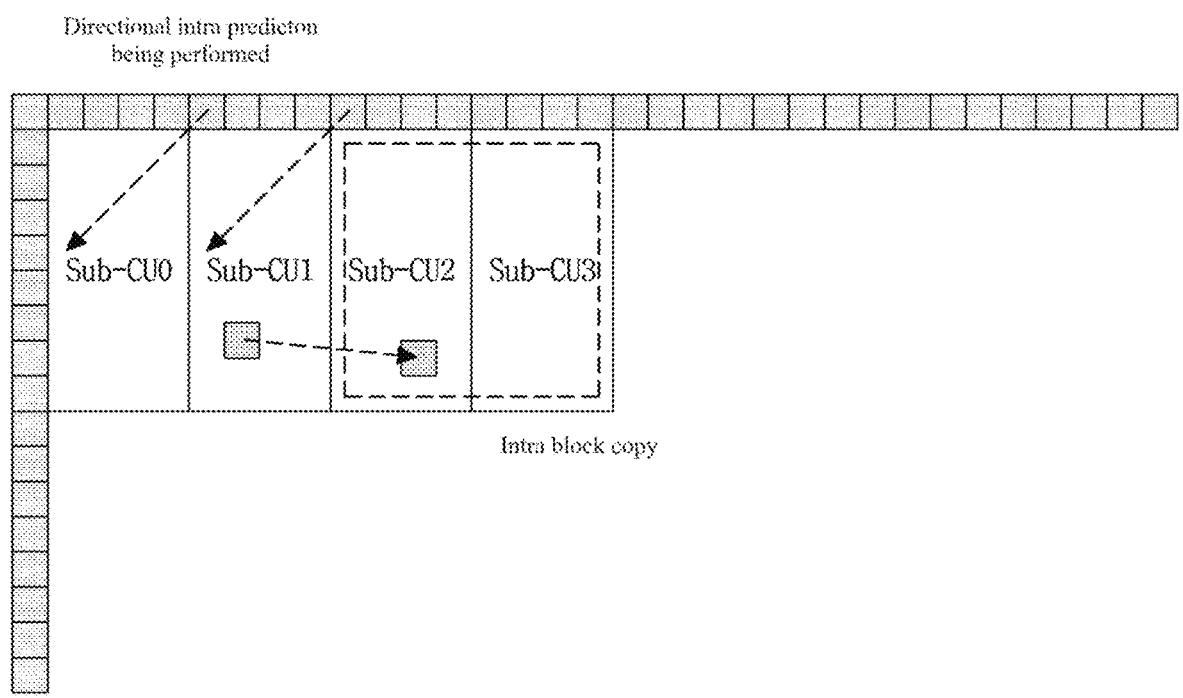

【FIG. 37】
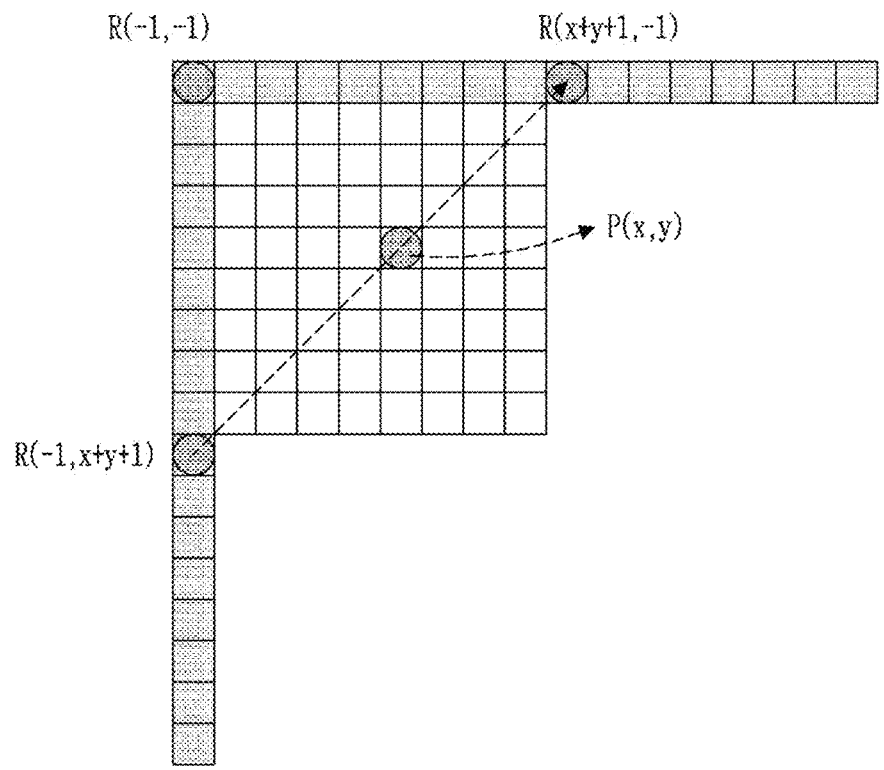
【FIG. 38】
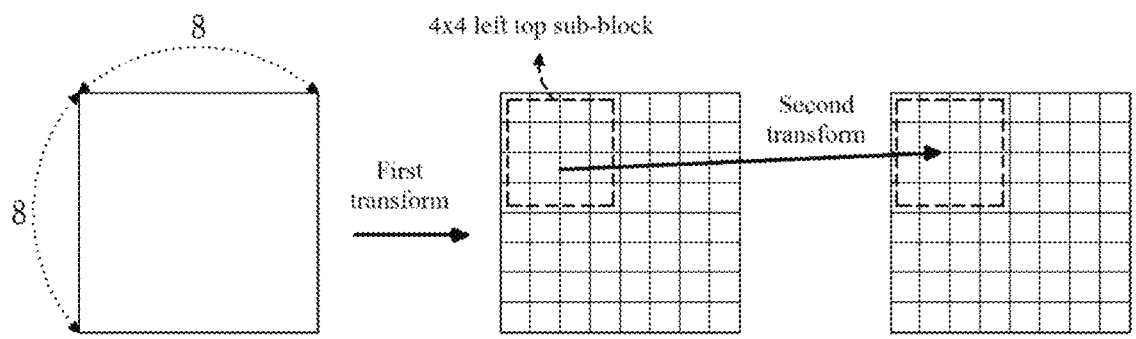

[FIG. 39]
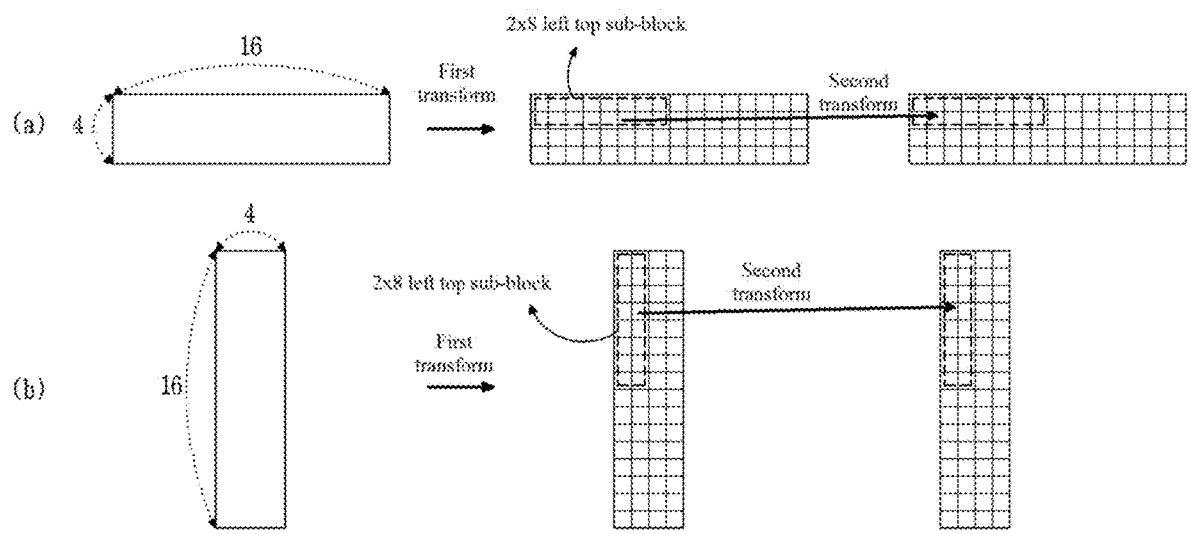

[FIG. 40]

[FIG. 41]
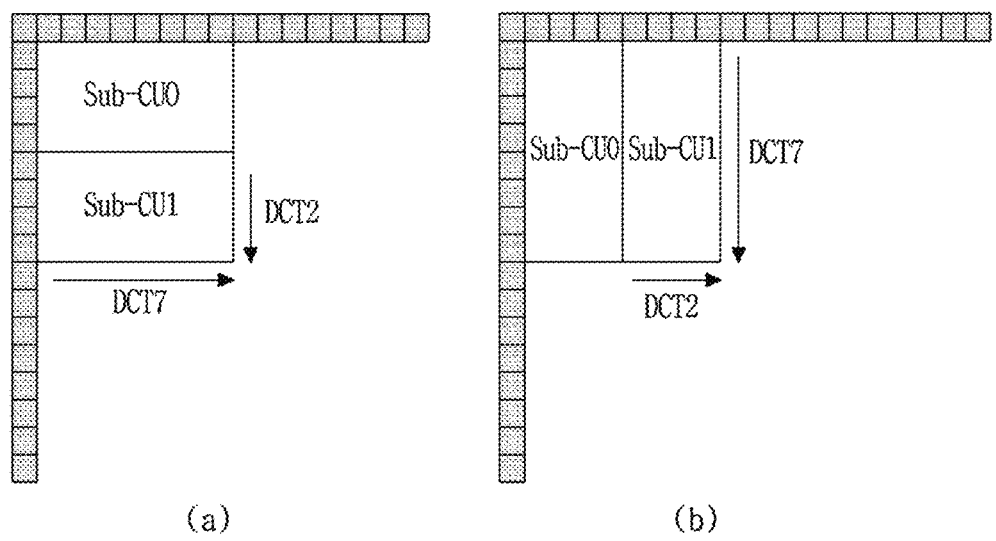

[FIG. 42]
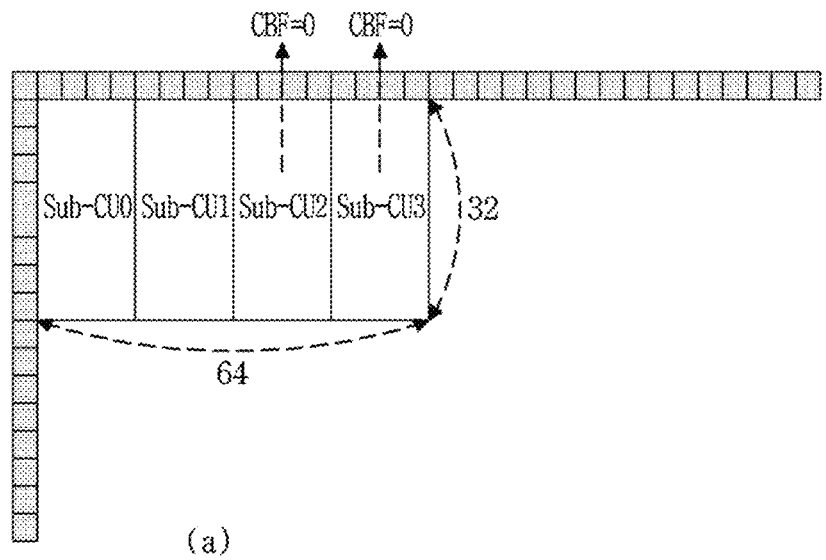
(a)
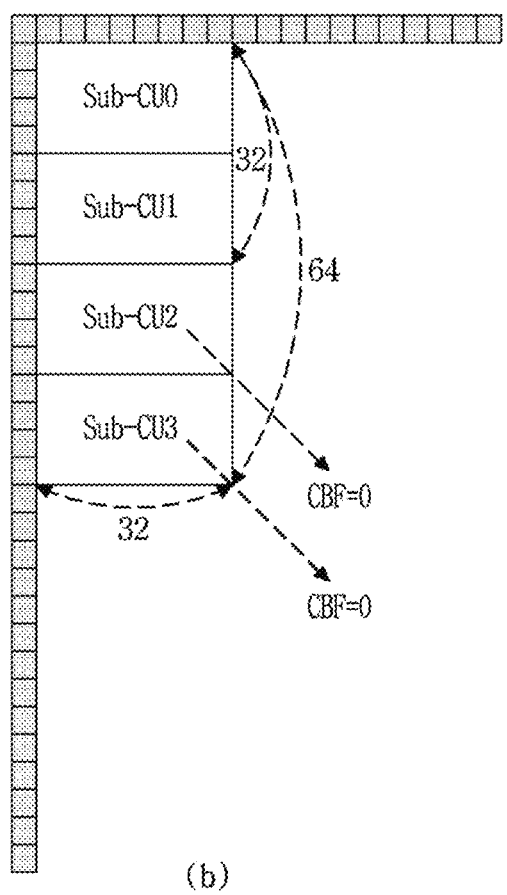
(b)

[FIG. 43]
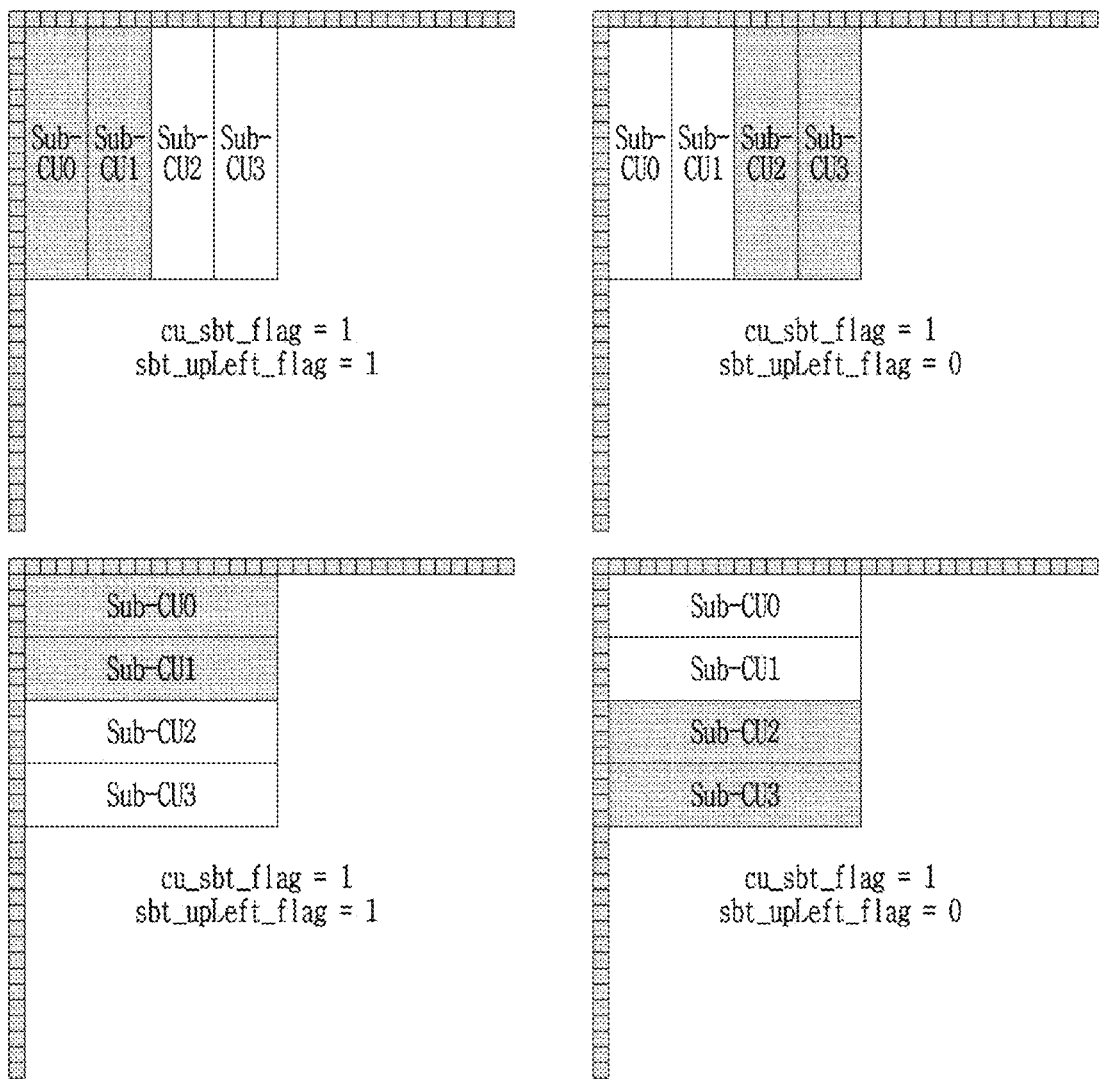

VIDEO SIGNAL ENCODING/DECODING METHOD AND DEVICE THEREFOR

This application claims the benefit under 35 U.S.C. section 371, of PCT International Application No.: PCT/KR2020/001299, filed on Jan. 28, 2020, which claims foreign priority to Korean Patent Application No.: 10-2019-0010245, filed on Jan. 28, 2019 and Korean Patent Application No.: 10-2019-010246, filed on Jan. 28, 2019, in the Korean Intellectual Property Office, the disclosures of which are hereby incorporated by reference in their entireties.

FIELD OF THE DISCLOSURE

The present disclosure relates to a video signal encoding/decoding method and a device therefor.

DESCRIPTION OF THE RELATED ART

As display panels become larger, video service of higher quality is required. The biggest problem with high-definition video service is that an amount of data is greatly increased. In order to solve the above problem, research for improving the video compression rate is being actively conducted. As a representative example, the Joint Collaborative Team on Video Coding (JCT-VC) was formed in 2009 by the Motion Picture Experts Group (MPEG) and the Video Coding Experts Group (VCEG) under the International Telecommunication Union-Telecommunication (ITU-T). The JCT-VC proposed High Efficiency Video Coding (HEVC), a video compression standard that has about twice compression performance of H.264/AVC, and that was approved as standard on Jan. 25, 2013. However, with rapid development of high-definition video services, the performance of HEVC is gradually showing its limitations.

DISCLOSURE

Technical Purpose

A purpose of the present disclosure is to provide a method for encoding/decoding a video signal in which a coding block is partitioned into a plurality of sub-blocks, and then intra-prediction is performed on a sub-block basis, and a device for performing the method.

A purpose of the present disclosure is to provide a method for dividing a video coding block into a plurality of sub-blocks, in which the coding block is adaptively divided based on a size or a shape of a current block, and a device for performing the method.

A purpose of the present disclosure is to provide a method for encoding/decoding a video signal in which a coding block is partitioned into a plurality of prediction units, and inter-prediction is performed on each prediction unit, and a device for performing the method.

A purpose of the present disclosure is to provide a method for encoding/decoding a video signal in which motion information of a plurality of prediction units included in one coding block are obtained from different merge candidates, and a device for performing the method.

A purpose of the present disclosure is to provide a method for encoding/decoding a video signal in which a coding block is partitioned into a plurality of sub-blocks, and then transform is performed on at least one of the plurality of sub-blocks, and a device for performing the method.

Technical purposes obtainable from the present disclosure are non-limited to the above-mentioned technical purposes, and other unmentioned technical purposes may be clearly understood from the following description by those having ordinary skill in the technical field to which the present disclosure pertains.

Technical Solutions

An aspect of the present disclosure provides a method for decoding video data, the method comprising: determining whether to partition a current block into a plurality of sub-blocks; determining an intra-prediction mode for the current block; and when the current block is partitioned into the plurality of sub-blocks, performing intra-prediction on each of the sub-blocks, based on the intra-prediction mode, wherein whether to partition the current block into the plurality of sub-blocks is determined based on a flag, wherein when a size of the current block is smaller than a threshold, parsing of the flag from a bitstream is omitted, wherein when the parsing of the flag is omitted, the flag is considered to indicate that the current block is not partitioned into the plurality of sub-blocks.

An aspect of the present disclosure provides a method for encoding video data, the method comprising: determining whether to partition a current block into a plurality of sub-blocks; determining an intra-prediction mode for the current block; and when the current block is partitioned into the plurality of sub-blocks, performing intra-prediction on each of the sub-blocks, based on the intra-prediction mode, wherein whether to encode a flag indicating whether to partition the current block into the plurality of sub-blocks into a bitstream is determined based on whether a size of the current block is smaller than a threshold, wherein when the size of the current block is smaller than the threshold, the encoding of the flag is omitted and thus the current block is not partitioned into the plurality of sub-blocks.

In one implementation of the first aspect, the method further comprises determining a reference sample line of the current block, wherein when an index of the determined reference sample line is greater than a threshold, the parsing of the flag from the bitstream is omitted.

In one implementation of the first aspect, a number of sub-blocks included in the current block is determined based on at least one of a size or a shape of the current block.

In one implementation of the first aspect, the method further comprises performing first inverse transform on the current block, wherein the first inverse transform is performed based on one of at least one transform core candidate, wherein a number of transform core candidates varies depending on whether the current block has been partitioned into the plurality of sub-blocks.

In one implementation of the first aspect, the method further comprises performing second inverse transform on the current block, wherein when the second inverse transform is performed, the transform core is set to DCT2.

In one implementation of the first aspect, a transform coefficient of a region in the current block on which the second inverse transform is not performed is 0.

In one implementation of the first aspect, whether to perform the second inverse transform is determined based on a position of a last transform coefficient in the current block.

It is to be understood that the foregoing summarized features are exemplary aspects of the following detailed description of the present disclosure without limiting the scope of the present disclosure.

Technical Effects

According to the present disclosure, dividing the coding block into the plurality of sub-blocks and then performing intra-prediction on a sub-block basis may allow intra-prediction efficiency to be improved.

According to the present disclosure, in intra-prediction, adaptively dividing the coding block based on the size or the shape of the current block may allow the intra-prediction efficiency to be improved.

According to the present disclosure, dividing the coding block into a plurality of prediction units and then performing inter-prediction on each prediction unit may allow inter-prediction efficiency to be improved.

According to the present disclosure, in encoding/decoding the video signal, obtaining the motion information of the plurality of prediction units included in one coding block from different merge candidates may allow inter-prediction efficiency to be improved.

According to the present disclosure, dividing the coding block into the plurality of sub-blocks, and then performing transform on at least one of the plurality of sub-blocks may allow encoding/decoding efficiency to be improved.

Effects obtainable from the present disclosure may be non-limited by the above-mentioned effect, and other unmentioned effects may be clearly understood from the following description by those having ordinary skill in the technical field to which the present disclosure pertains.

BRIEF DESCRIPTION OF THE DRAWINGS

FIG. 1 is a view showing a block diagram of a video encoding device (encoder) according to an embodiment of the present disclosure;

FIG. 2 is a view showing a block diagram of a video decoding device (decoder) according to an embodiment of the present disclosure;

FIG. 3 is a view showing a basic coding tree unit according to an embodiment of the present disclosure;

FIG. 4 is a view showing various partitioning types of a coding block.

FIG. 5 is a view of an example showing an aspect of partitioning a CTU.

FIG. 6 is a flow diagram of an inter prediction method according to an embodiment of the present disclosure.

FIG. 7 is a flow diagram of a process deriving the current block motion information under a merge mode.

FIG. 8 is a diagram of illustrating candidate blocks used to derive a merge candidate.

FIG. 9 is a diagram to describe an example of determining a motion vector per sub-block.

FIG. 10 is a diagram to describe the update aspect of a motion information table.

FIG. 11 is a diagram showing the update aspect of a motion information table.

FIG. 12 is a diagram showing an example in which the index of a pre-saved motion information candidate is updated.

FIG. 13 is a diagram showing the position of a representative sub-block.

FIG. 14 presents an example in which a motion information table is generated per inter-prediction mode.

FIG. 15 is a diagram showing an example in which a redundance check is performed only for a part of merge candidates.

FIG. 16 is a diagram showing an example in which a redundance check with a specific merge candidate is omitted.

FIG. 17 is a diagram showing an example of dividing the coding block into a plurality of prediction units using a diagonal line.

FIG. 18 is a diagram showing an example of dividing the coding block into two prediction units.

FIG. 19 shows examples of dividing the coding block into a plurality of prediction blocks of different sizes.

FIG. 20 is a diagram showing neighboring blocks used to derive a partitioning mode merge candidate.

FIG. 21 is a diagram for describing an example of determining availability of neighboring blocks for each prediction unit.

FIGS. 22 and 23 are diagrams showing an example of deriving a prediction sample based on a weighted sum of a first prediction sample and a second prediction sample.

FIG. 24 is a flow diagram of an intra-prediction method according to an embodiment of the present disclosure.

FIG. 25 is a diagram showing intra-prediction modes.

FIGS. 26 and 27 are a diagram showing the example of a one-dimensional array in which reference samples are arranged in a row.

FIG. 28 is a diagram illustrating an angle formed by directional intra-prediction modes with a straight line parallel to an x-axis.

FIG. 29 is a diagram showing an aspect in which a prediction sample is obtained in case that a current block has a non-square shape.

FIG. 30 is a diagram showing wide angle intra-prediction modes.

FIG. 31 is a diagram showing an example of vertical partitioning and horizontal partitioning.

FIG. 32 is a diagram showing an example of determining a partitioning type of a coding block.

FIG. 33 is a diagram showing an example of determining a partitioning type of a coding block.

FIG. 34 is a diagram showing an example in which a partitioning type of a coding block is determined based on an intra-prediction mode of the coding block.

FIG. 35 is a diagram to describe partitioning of a coding block.

FIG. 36 is a diagram showing an example in which a prediction encoding mode for each sub-block is set differently.

FIG. 37 is a diagram showing applicative aspect of PDPC.

FIGS. 38 and 39 are diagrams showing a sub-block to be subjected to second transform.

FIG. 40 is a diagram for describing an example in which a transform type of a current block is determined.

FIG. 41 is a diagram showing an example of determining a transform type of a sub-block.

FIG. 42 is a diagram to describe an example in which a residual coefficient of sub-blocks is set to 0.

FIG. 43 represents an example in which a position of a sub-block on which transform and/or quantization is performed is specified based on information signaled in a bitstream.

DETAILED DESCRIPTIONS

Hereinafter, embodiments of the present disclosure will be described in detail with reference to the accompanying drawings.

Image encoding and decoding is performed on a basis of a block. In an example, for a coding block, a transform block, or a prediction block, encoding/decoding processes such as transform, quantization, prediction, in-loop filtering, reconstruction, etc. may be performed.

Hereinafter, an encoding/decoding target block is referred to as a "current block". In an example, a current block may represent a coding block, a transform block, or a prediction block according to a current process of encoding/decoding.

In addition, the term "unit" used in the present specification represents a basis unit for performing a specific encoding/decoding process, and a "block" may be understood to represent a sample array having a predetermined size. Unless otherwise stated, "block" and "unit" may be applied interchangeably. In an example, in examples described later, a coding block and a coding unit may be understood to have the same meaning as each other.

FIG. 1 is view showing a block diagram of an image encoding device (encoder) according to an embodiment of the present disclosure.

Referring to FIG. 1, an image encoding device 100 may include a picture partitioning unit 110, predicting units 120 and 125, a transform unit 130, a quantization unit 135, a rearrangement unit 160, an entropy encoding unit 165, a dequantization unit 140, an inverse-transform unit 145, a filter unit 150, and a memory 155.

Components described in FIG. 1 are independently illustrated in order to show different characteristic functions in an image encoding device, and the FIG. does not mean that each component is constituted by separated hardware or one software unit. That is, each component is just enumerated for convenience of explanation, at least two components of respective components may constitute one component or one component may be partitioned into a plurality of components which may perform their functions. Even an embodiment of integrating respective components and embodiment of dividing a component are also included in the scope of the present disclosure unless they are departing from the spirit of the present disclosure.

Further, some components are not requisite components that perform essential functions of the present disclosure but are optional components for just improving performance. The present disclosure may be implemented with the requisite component for implementing the spirit of the present disclosure other than the component used to just improve the performance and a structure including only the requisite component other than the optional component used to just improve the performance is also included in the scope of the present disclosure.

The picture partitioning unit 110 may partition an input picture into at least one processing unit. In this connection, the processing unit may be a prediction unit (PU), a transform unit (TU), or a coding unit (CU). In the picture partitioning unit 110, a single picture may be partitioned into combinations of a plurality of coding units, prediction units, and transform units, and the picture may be encoded by selecting a combination of the coding units, the prediction units, and the transform units according to a predetermined condition (for example, cost function).

For example, a single picture may be partitioned into a plurality of coding units. In order to partition a picture into coding units, a recursive tree structure such as a quad-tree structure may be used, and a coding unit that is originated from a root such as a single image or largest coding unit may be partitioned into other coding units and may have child nodes as many as the partitioned coding units. A coding unit that is no longer partitioned according to certain restrictions becomes a leaf node. Namely, when it is assumed that only square partitioning is available for a single coding unit, a single coding unit may be partitioned into at most four other coding units.

Hereinafter, in the embodiment of the present disclosure, a coding unit may be used as a unit for encoding or may be used as a unit for decoding.

A prediction unit may be obtained by partitioning a single coding unit into at least one square or rectangle having the same size, or a single coding unit may be partitioned into prediction units in such a manner that one prediction unit may be different from another prediction unit in a shape and/or size.

In generation of a prediction unit based on a coding block to which intra-prediction is being performed, when the coding unit is not the smallest coding unit, intra-prediction may be performed without performing partitioning into a plurality of N×N prediction units.

The predicting units 120 and 125 may include an inter-predicting unit 120 performing inter-prediction and an intra predicting unit 125 performing intra-prediction. Whether to perform inter-prediction or intra-prediction on a prediction unit may be determined, and detailed information (for example, an intra-prediction mode, a motion vector, a reference picture, etc.) according to each prediction method may be determined. In this connection, a processing unit on which prediction is performed may differ with a processing unit for which a prediction method, and detail thereof are determined. For example, a prediction method, a prediction mode, etc. may be determined on the basis of a prediction unit, and prediction may be performed on the basis of a transform unit. A residual value (residual block) between the generated prediction block and an original block may be input to the transform unit 130. In addition, prediction mode information used for prediction, motion vector information, etc. may be encoded using a residual value by the entropy encoding unit 165 and may be transmitted to the decoder. When a specific encoding mode is used, an original block is encoded as it is and transmitted to a decoding unit without generating a prediction block through the predicting unit 120 or 125.

The inter-predicting unit 120 may predict a prediction unit on the basis of information on at least one of a previous picture and a subsequent picture of a current picture, or in some cases, may predict a prediction unit on the basis of information on some encoded regions in the current picture. The inter-predicting unit 120 may include a reference picture interpolation unit, a motion prediction unit, and a motion compensation unit.

The reference picture interpolation unit may receive reference picture information from the memory 155, and generate pixel information of a pixel at an integer or less from the reference picture. In case of a luma pixel, an 8-tap DCT-based interpolation filter having different coefficients may be applied so as to generate pixel information on a pixel at an integer or less for a ¼ pixel unit. In case of a chroma signal, a 4-tap DCT-based interpolation filter having different filter coefficients may be applied so as to generate pixel information on a pixel at an integer or less for a ⅛ pixel unit.

The motion prediction unit may perform motion prediction based on a reference picture interpolated by the reference picture interpolation unit. As methods for calculating a motion vector, various methods, such as a full search-based block matching algorithm (FBMA), a three step search (TSS) algorithm, a new three-step search (NTS) algorithm, etc. may be used. A motion vector may have a motion vector value in a unit of ½ or ¼ pixel on the basis of the interpolated pixel. The motion prediction unit may predict a current prediction unit by varying a motion prediction method. As motion prediction methods, various methods, such as a skip method, a merge method, an advanced motion vector prediction (AMVP) method, an intra block copy method, etc. may be used.

The intra-predicting unit 125 may generate a prediction unit on the basis of information on a reference pixel around a current block, which is pixel information in a current picture. When a neighboring block of a current prediction unit is a block for which inter-prediction is performed, and thus a reference pixel is a pixel for which inter-prediction is performed, a reference pixel included in the block for which inter-prediction is performed may be replaced by information on a reference pixel of a neighboring block for which intra-prediction is performed. In other words, when a reference pixel is unavailable, at least one reference pixel of available reference pixels may be applied in place of unavailable reference pixel information.

A prediction mode in intra-prediction may include a directional prediction mode using reference pixel information according to a prediction direction and a non-directional mode not using directional information when performing prediction. A mode for predicting luma information may be different from a mode for predicting chroma information. In order to predict the chroma information, information on an intra-prediction mode used for predicting the luma information or information on a predicted luma signal may be used.

In performing intra-prediction, when a prediction unit is identical in a size with a transform unit, intra-prediction may be performed on the prediction unit on the basis of pixels positioned at the left, the top-left, and the top of the prediction unit. However, in performing intra-prediction, when a prediction unit is different in a size with a transform unit, intra-prediction may be performed using a reference pixel based on the transform unit. In addition, intra-prediction using N×N partitioning may be only used for the smallest coding unit.

In an intra-prediction method, a prediction block may be generated after applying an adaptive intra smoothing (AIS) filter to a reference pixel according to a prediction mode. A type of AIS filter applied to a reference pixel may vary. In order to perform an intra-prediction method, an intra prediction mode for a current prediction unit may be predicted from an intra-prediction mode of a prediction unit present around the current prediction unit. In predicting a prediction mode for a current prediction unit using mode information predicted from a neighboring prediction unit, when an intra prediction mode for the current prediction unit is identical to an intra prediction mode of the neighboring prediction unit, information indicating that the current prediction unit and the neighboring prediction unit have the same prediction mode may be transmitted using predetermined flag information. When a prediction mode for the current prediction unit is different from prediction modes of the neighboring prediction units, entropy encoding may be performed to encode information on a prediction mode for a current block.

In addition, a residual block may be generated which includes information on a residual value that is a difference value between a prediction unit for which prediction is performed on by the predicting unit 120 or 125, and an original block of the prediction unit. The generated residual block may be input to the transform unit 130.

The transform unit 130 may perform transform on a residual block, which includes information on a residual value between an original block and a prediction unit generated by the predicting unit 120 or 125, using a transform method such as discrete cosine transform (DCT) or discrete sine transform (DST). In this connection, a DCT transform core includes at least one of DCT2 or DCT8 and a DST transform core includes DST7. Whether to apply DCT, or DST so as to perform transform on a residual block may be determined on the basis of information on an intra-prediction mode of a prediction unit which is used to generate the residual block. It is possible to skip a transform for a residual block. A flag indicating whether or not to skip a transform for a residual block may be encoded. A transform skip may be allowed for a residual block whose a size is smaller than or equal to a threshold value, a residual block of a luma component, or a residual block of a chroma component under 4:4:4 format.

The quantization unit 135 may perform quantization on values transformed into a frequency domain by the transform unit 130. A quantization coefficient may vary according to a block or importance of an image. Values calculated in the quantization unit 135 may be provided to the dequantization unit 140 and the rearrangement unit 160.

The rearrangement unit 160 may perform rearrangement on coefficient values with respect to quantized residual values.

The rearrangement unit 160 may change coefficients in the form of a two-dimensional block into coefficients in the form of a one-dimensional vector through a coefficient scanning method. For example, the rearrangement unit 160 may scan from a DC coefficient to a coefficient in a high frequency domain using a zigzag scanning method so as to change the coefficients into the form of a one-dimensional vector. According to a size and an intra prediction mode of a transform unit, rather than zigzag scanning, vertical directional scanning where coefficients in the form of a two-dimensional block are scanned in a column direction, or horizontal directional scanning where coefficients in the form of two-dimensional block are scanned in a row direction may be used. In other words, which scanning method among zigzag scanning, vertical directional scanning, and horizontal directional scanning is used may be determined according to a size and an intra prediction mode of a transform unit.

The entropy encoding unit 165 may perform entropy encoding on the basis of values calculated by the rearrangement unit 160. Entropy encoding may use various encoding methods, for example, exponential Golomb coding, context-adaptive variable length coding (CAVLC), or context-adaptive binary arithmetic coding (CABAL).

The entropy encoding unit 165 may encode various types of information, such as information on a residual value coefficient and information on a block type of a coding unit, information on a prediction mode, information on a partitioning unit, information on a prediction unit, information on a partitioning unit, information on a prediction unit and information on a transmission unit, information on a motion vector, information on a reference frame, information on a block interpolation, filtering information, etc. obtained from the rearrangement unit 160 and the predicting units 120 and 125.

The entropy encoding unit 165 may entropy encode coefficients of a coding unit input from the rearrangement unit 160.

The dequantization unit 140 may perform dequantization on values quantized in the quantization unit 135, and the inverse-transform unit 145 may perform inverse-transform on values transformed in the transform unit 130. A residual value generated by the dequantization unit 140 and the inverse-transform unit 145 may be added with a prediction unit predicted by a motion estimation unit, a motion compensation unit, or the intra-prediction unit which are included in the predicting units 120 and 125 so as to generate a reconstructed block.

The filter unit 150 may include at least one of a deblocking filter, an offset correction unit, and an adaptive loop filter (ALF).

The deblocking filter may remove block distortion that occurs due to boundaries between blocks in a reconstructed picture. In order to determine whether or not to perform deblocking, whether or not to apply a deblocking filter to a current block may be determined on the basis of pixels included in several rows and columns included in a block. When a deblocking filter is applied to a block, a strong filter or a weak filter is applied according to required deblocking filtering strength. In addition, in applying a deblocking filter, when performing horizontal directional filtering and vertical directional filtering, horizontal directional filtering and vertical directional filtering may be configured to be processed in parallel.

The offset correction unit may correct an original image by an offset in a unit of a pixel with respect to an image for which deblocking is performed. In order to perform offset correction on a specific picture, a method of applying a offset to a region which is determined after partitioning pixels of the image into the predetermined number of regions, or a method of applying an offset according to edge information of each pixel may be used.

Adaptive loop filtering (ALF) may be performed on the basis of a value obtained by comparing a filtered reconstructed image with an original image. Pixels included in an image may be partitioned into predetermined groups, a filter to be applied to each of the groups may be determined, and filtering may be individually performed on each group. Information on whether or not to apply ALF and may be transmitted for each coding unit (CU) for a luma signal, and a shape and a filter coefficient of an ALF filter to be applied may vary on the basis of each block. Alternatively, an ALF filter having the same shape (fixed shape) may be applied regardless of a feature of a block to which the filter will be applied.

In the memory 155, a reconstructed block or picture calculated through the filter unit 150 may be stored. The stored reconstructed block or picture may be provided to the predicting unit 120 or 125 when performing inter-prediction.

FIG. 2 is view showing a block diagram of an image decoding device (decoder) according to an embodiment of the present disclosure.

Referring to FIG. 2, an image decoding device 200 may include: an entropy decoding unit 210, a rearrangement unit 215, a dequantization unit 220, an inverse-transform unit 225, prediction units 230 and 235, a filter unit 240, and a memory 245.

When an image bitstream is input from the encoder, the input bitstream may be decoded according to an inverse process of the image encoding device.

The entropy decoding unit 210 may perform entropy decoding according to the inverse process of the entropy encoding by the entropy encoding unit of the image encoder. For example, in association with the methods performed by the image encoder device, various methods, such as exponential Golomb coding, context-adaptive variable length coding (CAVLC), or context-adaptive binary arithmetic coding (CABAC) may be applied.

The entropy decoding unit 210 may decode information on intra-prediction and inter-prediction performed by the encoder.

The rearrangement unit 215 may perform rearrangement on the bitstream entropy decoded by the entropy decoding unit 210 on the basis of the rearrangement method used in the encoder. Coefficients represented in the form of a one-dimensional vector may be reconstructed and rearranged into coefficients in the form of a two-dimensional block. The rearrangement unit 215 may perform rearrangement through a method of receiving information related to coefficient scanning performed in the encoder and of inversely scanning on the basis of the scanning order performed in the encoder.

The dequantization unit 220 may perform dequantization on the basis of a quantization parameter received from the encoder and coefficient values of the rearranged block.

The inverse-transform unit 225 may perform, an inverse transform, that is inverse DCT or inverse DST, against to a transform, that is DCT or DST, performed on the quantization result by the transform unit in the image encoder. In this connection, a DCT transform core may include at least one of DCT2 or DCT8, and a DST transform core may include DST7. Alternatively, when the transform is skipped in the image encoder, the inverse-transform also not be performed in the inverse-transform unit 225. Inverse transform may be performed on the basis of a transmission unit determined by the image encoder. The inverse transform unit 225 of the image decoder may selectively perform a transform method (for example, DCT, or DST) according to multiple pieces of information, such as a prediction method, a size of a current block, a prediction direction, etc.

The prediction unit 230 or 235 may generate a prediction block on the basis of information related to a prediction block received from the entropy decoding unit 210 and information on a previously decoded block or picture received from the memory 245.

As described above, as the operation of the image encoder, in performing intra-prediction, when a prediction unit is identical in size with a transform unit, intra-prediction may be performed on the prediction unit on the basis of pixels positioned at the left, the top-left, and the top of the prediction unit. However, in performing intra-prediction, when a prediction unit is different in size with a transform unit, intra-prediction may be performed using a reference pixel based on the transform unit. In addition, intra-prediction using N×N partitioning may be only used for the smallest coding unit.

The prediction units 230 and 235 may include a PU determination module, an inter-prediction unit, and an intra-prediction unit. The PU determination unit may receive various types of information, such as information on a prediction unit, information on a prediction mode of an intra-prediction method, information on a motion prediction of an inter-prediction method, etc. which are input from the entropy decoding unit 210, divide a prediction unit in a current coding unit, and determine whether inter-prediction or intra-prediction is performed on the prediction unit. Using information required in inter-prediction of a current prediction unit received from the image encoder, the inter-prediction unit 230 may perform inter-prediction on the current prediction unit on the basis of information on at least one of a previous picture and a subsequent picture of a current picture including the current prediction unit. Alternatively, inter-prediction may be performed on the basis of information on some pre-reconstructed regions in a current picture including the current prediction unit.

In order to perform inter-prediction, which method among a skip mode, a merge mode, an AMVP mode, or an intra block copy mode is used as a motion prediction method for a prediction unit included in a coding unit may be determined on the basis of the coding unit.

The intra prediction unit 235 may generate a prediction block on the basis of information on a pixel within a current picture. When a prediction unit is a prediction unit for which intra-prediction has been performed, intra-prediction may be performed on the basis of information on an intra-prediction mode of a prediction unit received from the image encoder. The intra prediction unit 235 may include an adaptive intra smoothing (AIS) filter, a reference pixel interpolation module, or a DC filter. The AIS filter may perform filtering on a reference pixel of a current block, and whether to apply the filter may be determined according to a prediction mode for a current prediction unit. A prediction mode of the prediction unit and information on an AIS filter which are received from the image encoder may be applied when performing AIS filtering on a reference pixel of a current block. When a prediction mode for the current block is a mode to which AIS filtering is not applied, the AIS filter may not be applied.

When a prediction mode of a prediction unit is a prediction mode for which intra-prediction is performed on the basis of a pixel value obtained by interpolating reference pixels, the reference pixel interpolation unit may interpolate the reference pixels so as to generate a reference pixel having a unit of an integer or less. When a prediction mode for a current prediction unit is a prediction mode where a prediction block is generated without interpolating reference pixels, the reference pixels may not be interpolated. The DC filter may generate a prediction block through filtering when a prediction mode for a current block is a DC mode.

A reconstructed block or picture may be provided to the filter unit 240. The filter unit 240 may include a deblocking filter, an offset correction module, and an ALF.

Information on whether or not a deblocking filter has been applied to a corresponding block or picture and information on whether a strong filter or a weak filter is applied when the deblocking filter is applied may be received from the image encoder. The deblocking filter of the image decoder may receive information on a deblocking filter from the image encoder, and the image decoder may perform deblocking filtering on a corresponding block.

The offset correction unit may perform offset correction on a reconstructed image on the basis of a type of offset correction, information on an offset value, etc. applied to an image when performing encoding.

The ALF may be applied to a coding unit on the basis of information on whether or not to apply ALF, information on an ALF coefficient, etc. received from the encoder. The above ALF information may be provided by being included in a particular parameter set.

In the memory 245, a reconstructed picture or block may be stored so as to be used as a reference picture or reference block, and the reconstructed picture may be provided to an output unit.

FIG. 3 is a view showing a basic coding tree unit according to an embodiment of the present disclosure.

The largest coding block may be defined as a coding tree block. A single picture may be partitioned into a plurality of coding tree units (CTU). A CTU may be a coding unit of the largest size, and may be referred to as the largest coding unit (LCU). FIG. 3 is a view showing an example where a single picture is partitioned into a plurality of CTUs.

A size of a CTU may be defined in a picture level or sequence level. For the same, information representing a size of a CTU may be signaled through a picture parameter set or sequence parameter set.

In an example, a size of a CTU for the entire picture within a sequence may be set to 128×128. Alternatively, one of 128×128 or 256×256 may be determined as a size of a CTU in a picture level. In an example, a CTU may be set to have a size of 128×128 in a first picture, and a size of 256×256 in a second picture.

Coding blocks may be generated by partitioning a CTU. A coding block represents a basic unit for performing encoding/decoding. In an example, prediction or transform may be performed for each coding block, or a prediction encoding mode may be determined for each coding block. In this connection, the prediction encoding mode represents a method of generating a prediction image. In an example, a prediction encoding mode may include intra-prediction, inter-prediction, current picture referencing (CPR), intra block copy (IBC) or combined prediction. For a coding block, a prediction block of the coding block may be generated using a prediction encoding mode of at least one of intra-prediction, inter-prediction, current picture referencing, or combined prediction.

Information representing a prediction encoding mode for a current block may be signaled in a bitstream. In an example, the information may be a 1-bit flag representing whether a prediction encoding mode is an intra mode or an inter mode. When a prediction encoding mode for a current block is determined as an inter mode, current picture referencing or combined prediction may be available.

Current picture referencing is setting a current picture as a reference picture and obtaining a prediction block of a current block from a region that has been already encoded/decoded within a current picture. In this connection, the current picture means a picture including the current block. Information representing whether or not current picture referencing is applied to a current block may be signaled in a bitstream. In an example, the information may be a 1-bit flag. When the flag is TRUE, a prediction encoding mode for a current block may be determined as current picture referencing, and when the flag is FALSE, a prediction encoding mode for a current block may be determined as inter-prediction.

Alternatively, a prediction encoding mode for a current block may be determined on the basis of a reference picture index. In an example, when a reference picture index indicates a current picture, a prediction encoding mode for a current block may be determined as current picture referencing. When a reference picture index indicates a picture other than a current picture, a prediction encoding mode for a current block may be determined as inter-prediction. In other words, current picture referencing is a prediction method using information on a region that has been already encoded/decoded within a current picture, and inter-prediction is a prediction method using information on another picture that has been already encoded/decoded.

Combined prediction represents a combined encoding mode combining at least two of intra-prediction, inter-prediction, and current picture referencing. In an example, when combined prediction is applied, a first prediction block may be generated on the basis of one of intra-prediction, inter-prediction or current picture referencing, and a second prediction block may be generated on the basis of another. When a first prediction block and a second prediction block are generated, a final prediction block may be generated by calculating an average or weighted sum of the first prediction block and the second prediction block. Information representing whether or not to apply combined prediction to a current block may be signaled in a bitstream. The information may be a 1-bit flag.

FIG. 4 is a view showing various partitioning types a coding block.

A coding block may be partitioned into a plurality of coding blocks on the basis of quad-tree partitioning, binary-tree partitioning or ternary tree partitioning. The partitioned coding block may be partitioned again into a plurality of coding blocks on the basis of quad-tree partitioning, binary-tree partitioning or ternary tree partitioning.

Quad-tree partitioning represents a method of partitioning a current block into four blocks. As a result of quad-tree partitioning, a current block may be partitioned into four square partitions (refer to "SPLIT_QT" of FIG. 4 (*a*)).

Binary-tree partitioning represents a method of partitioning a current block into two blocks. Partitioning a current block into two blocks along a vertical direction (that is, using a vertical line across the current block) may be referred to vertical directional binary-tree partitioning, and partitioning a current block into two blocks along a horizontal direction (that is, using a horizontal line across the current block) may be referred to as horizontal directional binary-tree partitioning. As a result of binary-tree partitioning, a current block may be partitioned into two non-square partitions. "SPLIT_BT_VER" of FIG. 4 (*b*) is a view showing a result of vertical directional binary-tree partitioning, and "SPLIT_BT_HOR" of FIG. 4 (*c*) is a view showing a result of horizontal directional binary-tree partitioning.

Ternary-tree partitioning represents a method of partitioning a current block into three blocks. Partitioning a current block into three blocks along a vertical direction (that is, using two vertical lines across the current block) may be referred to vertical directional ternary-tree partitioning, and partitioning a current block into three blocks along a horizontal direction (that is, using two horizontal lines across the current block) may be referred to as horizontal directional ternary-tree partitioning. As a result of ternary-tree partitioning, a current block may be partitioned into three non-square partitions. In this connection, a width/height of a partition positioned at the center of a current block may be twice than a width/height of other partitions. "SPLIT_TT_VER" of FIG. 4 (*d*) is a view showing a result of vertical directional ternary-tree partitioning, and "SPLIT_TT_HOR" of FIG. 4 (*e*) is a view showing a result of horizontal directional ternary-tree partitioning.

The number of partitioning times of a CTU may be defined as a partitioning depth. The maximum partitioning depth of a CTU may be determined in a sequence or picture level. Accordingly, the maximum partitioning depth of a CTU may vary on the basis of a sequence or picture.

Alternatively, the maximum partitioning depth may be independently determined for each partitioning method. In an example, the maximum partitioning depth where quad-tree partitioning is allowed may differ from the maximum partitioning depth where binary-tree partitioning and/or ternary-tree partitioning is allowed.

The encoder may signal information representing at least one of a partitioning type and a partitioning depth of a current block in a bitstream. The decoder may determine a partitioning type and a partitioning depth of a CTU on the basis of the information obtained by parsing a bitstream.

FIG. 5 is a view of an example showing an aspect of partitioning a CTU.

Partitioning the coding block using quad-tree partitioning, binary-tree partitioning and/or ternary-tree partitioning may be referred to as multi-tree partitioning.

Coding blocks generated by partitioning the coding block by applying multi-tree partitioning may be referred to child coding blocks. When a partitioning depth of a coding block is k, a partitioning depth of child coding blocks is set to k+1.

To the contrary, for coding blocks having a partitioning depth of k+1, a coding block having a partitioning depth of k may be referred to as a parent coding block.

A partitioning type of a current coding block may be determined on the basis of at least one of a partitioning type of a parent coding block and a partitioning type of a neighboring coding block. In this connection, the neighboring coding block may be a block adjacent to a current coding block, and include at least one of an top neighboring block, a left neighboring block, or a neighboring block adjacent to the top-left corner of the current coding block. In this connection, the partitioning type may include whether or not to apply quad-tree partitioning, whether or not to apply binary-tree partitioning, a direction of binary-tree partitioning, whether or not to apply ternary-tree partitioning, or a direction of ternary-tree partitioning.

In order to determine a partitioning type of a coding block, information representing whether or not a coding block is partitioned may be signaled in a bitstream. The information is a 1-bit flag of "split_cu_flag", and when the flag is TRUE, it may represent that a coding block is partitioned by a multi tree partitioning method.

When split_cu_flag is TRUE, information representing whether or not a coding block is partitioned by quad-tree partitioning may be signaled in a bitstream. The information is a 1-bit flag of split_qt_flag, and when the flag is TRUE, a coding block may be partitioned into four blocks.

In an example, in an example shown in FIG. 5, a CTU is partitioned by quad-tree partitioning, and thus four coding blocks having a partitioning depth of 1 are generated. In addition, it is shown that quad-tree partitioning is applied again to the first coding block and the fourth coding block among four coding blocks generated by quad-tree partitioning. As a result, four coding blocks having a partitioning depth of 2 may be generated.

In addition, by applying again quad-tree partitioning to a coding block having a partitioning depth of 2, a coding block having a partitioning depth of 3 may be generated.

When quad-tree partitioning is not applied to a coding block, whether to perform binary-tree partitioning or ternary-tree partitioning for the coding block may be determined according to at least one of a size of the coding block, whether or not the coding block is positioned at a picture boundary, the maximum partitioning depth, or a partitioning type of a neighboring block. When it is determined to perform binary-tree partitioning or ternary-tree partitioning for the coding block, information representing a partitioning direction may be signaled in a bitstream. The information may be a 1-bit flag of mtt_split_cu_vertical_flag. Whether a partitioning direction is a vertical direction or a horizontal direction may be determined on the basis of the flag. Additionally, information representing which one of binary-tree partitioning or ternary-tree partitioning is applied to the coding block may be signaled in a bitstream. The information may be a 1-bit flag of mtt_split_cu_binary_flag. Whether binary-tree partitioning is applied to the coding block or ternary-tree partitioning is applied to the coding block may be determined on the basis of the flag.

In an example, in an example shown in FIG. 5, vertical directional binary-tree partitioning is applied to a coding block having a partitioning depth of 1, vertical directional ternary-tree partitioning is applied to a left coding block among coding blocks generated by the partitioning, and vertical directional binary-tree partitioning is applied to a right coding block.

Inter-prediction is a prediction encoding mode predicting a current block using information on a previous picture. In an example, a block (hereinafter, collocated block) at the same position with a current block within a previous picture may be set as a prediction block of the current block. Hereinafter, a prediction block generated on the basis of a collocated block of the current block may be referred to as a collocated prediction block.

To the contrary, when an object present in a previous picture has moved to another position in a current picture, a current block may be effectively predicted using motions of the object. For example, when a motion direction and a size of the object is determined by comparing a previous picture with a current picture, a prediction block (or prediction image) of the current block may be generated according to motion information of the objects. Hereinafter, a prediction block generated using motion information may be referred to as a motion prediction block.

A residual block may be generated by subtracting a prediction block from a current block. In this connection, in case where an object moves, energy of a residual block may be reduced using a motion prediction block rather than using a collocated prediction block, and thus compression performance of the residual block may be improved.

As above, generating a prediction block using motion information may be referred to as motion estimation prediction. In the most inter-prediction, a prediction block may be generated on the basis of motion compensation prediction.

Motion information may include at least one of a motion vector, a reference picture index, a prediction direction, and a bidirectional weighting factor index. A motion vector represents a motion direction of an object and a magnitude. A reference picture index specifies a reference picture of a current block among reference pictures included in a reference picture list. A prediction direction indicates one of uni-directional L0 prediction, uni-directional L1 prediction, or bi-directional prediction (L0 prediction and L1 prediction). At least one of L0 directional motion information and L1 directional motion information may be applied according to a prediction direction of a current block. A bidirectional weighting factor index specifies a weighting factor applied to an L0 prediction block and a weighting factor applied to an L1 prediction block.

FIG. 6 is a flow diagram of an inter-prediction method according to the embodiment of the present disclosure.

In reference to FIG. 6, an inter-prediction method includes determining an inter-prediction mode for a current block (S601), obtaining motion information of the current block according to the determined inter-prediction mode (S602), and performing motion compensation prediction for a current block on the basis of the obtained motion information (S603).

In this connection, the inter-prediction mode may represent various methods for determining motion information of a current block, and include an inter-prediction mode using translation motion information, an inter-prediction mode using affine motion information. In an example, an inter-prediction mode using translation motion information may include a merge mode and a motion vector prediction mode, and an inter-prediction mode using affine motion information may include an affine merge mode and an affine motion vector prediction mode. Motion information on a current block may be determined on the basis of a neighboring block neighboring the current block or information obtained by parsing a bitstream.

Motion information of a current block may be derived from motion information of another block. In this connection, another block may be a block encoded/decoded by inter prediction previous to the current block. Setting motion information of a current block to be the same as motion information of another block may be defined as a merge mode. Also, setting a motion vector of another block as a prediction value of a motion vector of the current block may be defined as a motion vector prediction mode.

FIG. 7 is a flow diagram of a process deriving the motion information of a current block under a merge mode.

The merge candidate of a current block may be derived (S701). The merge candidate of a current block may be derived from a block encoded/decoded by inter-prediction prior to a current block.

FIG. 8 is a diagram illustrating candidate blocks used to derive a merge candidate.

The candidate blocks may include at least one of neighboring blocks including a sample adjacent to a current block or non-neighboring blocks including a sample non-adjacent to a current block. Hereinafter, samples determining candidate blocks are defined as base samples. In addition, a base sample adjacent to a current block is referred to as a neighboring base sample and a base sample non-adjacent to a current block is referred to as a non-neighboring base sample.

A neighboring base sample may be included in a neighboring column of a leftmost column of a current block or a neighboring row of an uppermost row of a current block. In an example, when the coordinate of a left-top sample of a current block is (0,0), at least one of a block including a base sample at a position of (−1, H−1), (W−1, −1), (W, −1), (−1, H) or (−1, 1) may be used as a candidate block. In reference to a diagram, the neighboring blocks of index 0 to 4 may be used as candidate blocks.

A non-neighboring base sample represents a sample that at least one of a x-axis distance or a y-axis distance with a base sample adjacent to a current block has a predefined value. In an example, at least one of a block including a base sample that a x-axis distance with a left base sample is a predefined value, a block including a non-neighboring sample that a y-axis distance with a top base sample is a predefined value or a block including a non-neighboring sample that a x-axis distance and a y-axis distance with a left-top base sample are a predefined value may be used as a candidate block. A predefined value may be a natural number such as 4, 8, 12, 16, etc. In reference to a diagram, at least one of blocks in an index 5 to 26 may be used as a candidate block.

Alternatively, a candidate block not belonging to the same coding tree unit as a current block may be set to be unavailable as a merge candidate. In an example, when a base sample is out of an upper boundary of a coding tree unit to which a current block belongs, a candidate block including the base sample may be set to be unavailable as a merge candidate.

A merge candidate may be derived from a temporal neighboring block included in a picture different from a current block. In an example, a merge candidate may be derived from a collocated block included in a collocated picture. Any one of reference pictures included in a reference picture list may be set as a collocated picture. Index information identifying a collocated picture among reference pictures may be signaled in a bitstream. Alternatively, a reference picture with a predefined index among reference pictures may be determined as a collocated picture.

The motion information of a merge candidate may be set the same as the motion information of a candidate block. In an example, at least one of a motion vector, a reference picture index, a prediction direction or a bidirectional weight index of a candidate block may be set as the motion information of a merge candidate.

A merge candidate list including a merge candidate may be generated S702.

The index of merge candidates in a merge candidate list may be assigned according to the predetermined order. In an example, an index may be assigned in the order of a merge candidate derived from a left neighboring block, a merge candidate derived from a top neighboring block, a merge candidate derived from a right-top neighboring block, a merge candidate derived from a left-bottom neighboring block, a merge candidate derived from a left-top neighboring block and a merge candidate derived from a temporal neighboring block.

When a plurality of merge candidates are included in a merge candidate, at least one of a plurality of merge candidates may be selected S703. Concretely, information for specifying one of a plurality of merge candidates may be signaled in a bitstream. In an example, information, merge_idx, representing an index of one of merge candidates included in a merge candidate list may be signaled in a bitstream.

A motion vector may be derived per sub-block.

FIG. 9 is a diagram to describe an example of determining a motion vector per sub-block.

Any motion vector among a plurality of merge candidates included in a merge candidate list may be set as an initial motion vector of a current block. In this connection, a merge candidate used to derive the initial motion vector may be determined by a syntax, merge_idx. Alternatively, when neighboring blocks adjacent to the current block are searched in the predetermined scanning order, the initial motion vector may be derived from an available merge candidate which was found first. In this connection, the predetermined scanning order may be the order of a neighboring block (A1) adjacent to the left of the current block, a neighboring block (B1) adjacent to the top of the current block, a neighboring block (B0) adjacent to the right-top corner of the current block and a neighboring block (A0) adjacent to the left-bottom corner of the current block. Alternatively, the predetermined scanning order may be defined in the order of B1, B0, A1 and A0 or may be determined in the order of B1, A1, B0 and A0.

When an initial motion vector is determined, a collocated picture of a current block may be determined. In this connection, the collocated picture may be set as a reference picture having a predefined index among reference pictures included in a reference picture list. For example, a predefined index may be 0 or the largest index. Alternatively, information for determining the collocated picture may be signaled in a bitstream. In an example, a syntax, collocated ref_idx, specifying a collocated picture in a reference picture list may be signaled in a bitstream.

When a collocated picture is determined, a block apart from a collocated block with the same position and size as a current block in the collocated picture by an initial motion vector may be determined. The block specified by an initial motion vector may be referred to as a collocated picture corresponding block. In an example, when an initial motion vector (for FIG. 9, the motion vector of A1 block) is (x1, y1), a block far apart from a block at the same position as the current block in the collocated picture (i.e., the collocated block) by (x1, y1) may be determined as a collocated picture corresponding block.

When a collocated picture corresponding block is determined, motion vectors of sub-blocks in the collocated picture corresponding block may be set as motion vectors of sub-blocks in a current block. In an example, when a current block is partitioned into 4×4 sized sub-blocks, a motion vector for 4×4 sized sub-blocks in the collocated picture corresponding block may be set as a motion vector of each sub-block in the current block.

When a sub-block in a collocated picture corresponding block has a bidirectional motion vector (e.g. L0 motion vector and L1 motion vector), the bidirectional motion vector of a sub-block in the collocated picture corresponding block may be taken as the bidirectional motion vector of a sub-block in a current block. Alternatively, based on whether a bidirectional prediction is applied to a current block, only L0 motion vector may be taken or only L1 motion vector may be taken from a sub-block in the collocated picture corresponding block.

Alternatively, when a reference picture of a current block is different from a reference picture of a collocated picture corresponding block, the motion vector of a sub-block in the collocated picture corresponding block may be scaled to derive the motion vector of a sub-block in the current block.

The reference picture of the current block and whether a bidirectional prediction is applied to the current block may be set the same as a merge candidate used to derive an initial motion vector. Alternatively, information for specifying the reference picture of the current block and/or information indicating whether a bidirectional prediction is applied to a current block may be signaled in a bitstream.

Information indicating whether a motion vector will be derived per sub-block may be signaled in a bitstream. The information may be a 1-bit flag, but it is not limited thereto. Alternatively, based on whether a bidirectional prediction is applied to a current block or at least one of the number of available merge candidates, whether a motion vector will be derived per sub-block may be determined.

When the number of merge candidates included in a merge candidate list is smaller than the threshold, a motion information candidate included in a motion information table may be added to a merge candidate list as a merge candidate. In this connection, the threshold may be the maximum number of merge candidates which may be included in a merge candidate list or a value in which an offset is subtracted from the maximum number of merge candidates. An offset may be a natural number such as 1 or 2, etc.

A motion information table includes a motion information candidate derived from a block encoded/decoded based on inter-prediction in a current picture. In an example, the motion information of a motion information candidate included in a motion information table may be set the same as the motion information of a block encoded/decoded based on inter-prediction. In this connection, motion information may include at least one of a motion vector, a reference picture index, a prediction direction or a bidirectional weight index.

A motion information candidate included in a motion information table also may be referred to as a inter region merge candidate or a prediction region merge candidate.

The maximum number of a motion information candidate which may be included in a motion information table may be predefined in an encoder and a decoder. In an example, the maximum number of a motion information candidate which may be included in a motion information table may be 1, 2, 3, 4, 5, 6, 7, 8 or more (e.g. 16).

Alternatively, information representing the maximum number of a motion information candidate which may be included in a motion information table may be signaled in a bitstream. The information may be signaled in a sequence, a picture or a slice level. The information may represent the maximum number of a motion information candidate which may be included in a motion information table. Alternatively, the information may represent difference between the maximum number of a motion information candidate which may be included in a motion information table and the maximum number of a merge candidate which may be included in a merge candidate list.

Alternatively, the maximum number of a motion information candidate which may be included in a motion information table may be determined according to a picture size, a slice size or a coding tree unit size.

A motion information table may be initialized in a unit of a picture, a slice, a tile, a brick, a coding tree unit or a coding tree unit line (a row or a column). In an example, when a slice is initialized, a motion information table is also initialized thus a motion information table may not include any motion information candidate.

Alternatively, information representing whether a motion information table will be initialized may be signaled in a bitstream. The information may be signaled in a slice, a tile, a brick or a block level. Until the information indicates the initialization of a motion information table, a pre-configured motion information table may be used.

Alternatively, information on an initial motion information candidate may be signaled in a picture parameter set or a slice header. Although a slice is initialized, a motion information table may include an initial motion information candidate. Accordingly, an initial motion information candidate may be applied for a block which is the first encoding/decoding target in a slice.

Alternatively, a motion information candidate included in the motion information table of a previous coding tree unit may be set as an initial motion information candidate. In an example, a motion information candidate with the smallest index or with the largest index among motion information candidates included in the motion information table of a previous coding tree unit may be set as an initial motion information candidate.

Blocks are encoded/decoded in the order of encoding/decoding, and blocks encoded/decoded based on inter-prediction may be sequentially set as a motion information candidate in the order of encoding/decoding.

FIG. 10 is a diagram to describe the update aspect of a motion information table.

For a current block, when inter-prediction is performed S1001, a motion information candidate may be derived based on a current block S1002. The motion information of a motion information candidate may be set the same as that of a current block.

When a motion information table is empty S1003, a motion information candidate derived based on a current block may be added to a motion information table S1004.

When a motion information table already includes a motion information candidate S1003, a redundancy check for the motion information of a current block (or, a motion information candidate derived based on it) may be performed S1005. A redundancy check is to determine whether the motion information of a pre-stored motion information candidate in a motion information table is the same as the motion information of a current block. A redundancy check may be performed for all pre-stored motion information candidates in a motion information table. Alternatively, a redundancy check may be performed for motion information candidates with an index over or below the threshold among pre-stored motion information candidates in a motion information table. Alternatively, a redundancy check may be performed for the predefined number of motion information candidates. In an example, 2 motion information candidates with smallest indexes or with largest indexes may be determined as targets for a redundancy check.

When a motion information candidate with the same motion information as a current block is not included, a motion information candidate derived based on a current block may be added to a motion information table S1008. Whether motion information candidates are identical may be determined based on whether the motion information (e.g. a motion vector/a reference picture index, etc.) of motion information candidates is identical.

In this connection, when the maximum number of motion information candidates are already stored in a motion information table S1006, the oldest motion information candidate may be deleted S1007 and a motion information candidate derived based on a current block may be added to a motion information table S1008. In this connection, the oldest motion information candidate may be a motion information candidate with the largest or the smallest index.

Motion information candidates may be identified by respective index. When a motion information candidate derived from a current block is added to a motion information table, the smallest index (e.g. 0) may be assigned to the motion information candidate and indexes of pre-stored motion information candidates may be increased by 1. In this connection, When the maximum number of motion information candidates are already stored in a motion information table, a motion information candidate with the largest index is removed.

Alternatively, when a motion information candidate derived from a current block is added to a motion information table, the largest index may be assigned to the motion information candidate. In an example, when the number of pre-stored motion information candidates in a motion information table is smaller than the maximum value, an index with the same value as the number of pre-stored motion information candidates may be assigned to the motion information candidate. Alternatively, when the number of pre-stored motion information candidates in a motion information table is equal to the maximum value, an index subtracting 1 from the maximum value may be assigned to the motion information candidate. Alternatively, a motion information candidate with the smallest index is removed and the indexes of residual pre-stored motion information candidates are decreased by 1.

FIG. 11 is a diagram showing the update aspect of a motion information table.

It is assumed that as a motion information candidate derived from a current block is added to a motion information table, the largest index is assigned to the motion information candidate. In addition, it is assumed that the maximum number of a motion information candidate is already stored in a motion information table.

When a motion information candidate HmvpCand[n+1] derived from a current block is added to a motion information table HmvpCandList, a motion information candidate HmvpCand[0] with the smallest index among pre-stored motion information candidates may be deleted and indexes of residual motion information candidates may be decreased by 1. In addition, the index of a motion information candidate HmvpCand[n+1] derived from a current block may be set to the maximum value (for an example shown in FIG. 11, n).

When a motion information candidate identical to a motion information candidate derived based on a current block is prestored S1005, a motion information candidate derived based on a current block may not be added to a motion information table S1009.

Alternatively, while a motion information candidate derived based on a current block is added to a motion information table, a pre-stored motion information candidate identical to the motion information candidate may be removed. In this case, it causes the same effect as when the index of a pre-stored motion information candidate is newly updated.

FIG. 12 is a diagram showing an example in which the index of a pre-stored motion information candidate is updated.

When the index of a pre-stored motion information candidate identical to a motion information candidate mvCand derived from a current block is hIdx, the pre-stored motion information candidate may be removed and the index of motion information candidates with an index larger than hIdx may be decreased by 1. In an example, an example shown in FIG. 12 showed that HmvpCand[2] identical to mvCand is deleted in a motion information table HvmpCandList and an index from HmvpCand[3] to HmvpCand[n] is decreased by 1.

And, a motion information candidate mvCand derived based on a current block may be added to the end of a motion information table.

Alternatively, an index assigned to a pre-stored motion information candidate identical to a motion information candidate derived based on a current block may be updated. For example, the index of a pre-stored motion information candidate may be changed to the minimum value or the maximum value.

The motion information of blocks included in a predetermined region may be set not to be added to a motion information table. In an example, a motion information candidate derived based on the motion information of a block included in a merge processing region may not be added to a motion information table. Since the encoding/decoding order for blocks included in a merge processing region is not defined, it is improper to use motion information of one of them for the inter-prediction of another of them. Accordingly, motion information candidates derived based on blocks included in a merge processing region may not be added to a motion information table.

Alternatively, the motion information of a block smaller than a preset size may be set not to be added to a motion information table. In an example, a motion information candidate derived based on the motion information of a coding block whose width or height is smaller than 4 or 8 or the motion information of a 4×4 sized coding block may not be added to a motion information table.

When motion compensation prediction is performed per sub-block basis, a motion information candidate may be derived based on the motion information of a representative sub-block among a plurality of sub-blocks included in a current block. In an example, when a sub-block merge candidate is used for a current block, a motion information candidate may be derived based on the motion information of a representative sub-block among sub-blocks.

The motion vector of sub-blocks may be derived in the following order. First, one of merge candidates included in the mere candidate list of a current block may be selected and an initial shift vector (shVector) may be derived based on the motion vector of a selected merge candidate. And, a shift sub-block that a base sample is at a position of (xColSb, yColSb) may be derived by adding an initial shift vector to the position (xSb, ySb) of the base sample of each sub-block in a coding block (e.g. a left-top sample or a center sample). The below Equation 1 shows a formula for deriving a shift sub-block.

$$(xColSb, yColSb) = (xSb + shVector[0] >> 4, ySb + shVector[1] >> 4)$$ [Equation 1]

Then, the motion vector of a collocated block corresponding to the center position of a sub-block including (xColSb, yColSb) may be set as the motion vector of a sub-block including (xSb, ySb).

A representative sub-block may mean a sub-block including the left-top sample or center sample of a current block.

FIG. 13 is a diagram showing the position of a representative sub-block.

FIG. 13 (a) presents an example in which a sub-block positioned at the left-top of a current block is set as a representative sub-block and FIG. 12 (b) presents an example in which a sub-block positioned at the center of a current block is set as a representative sub-block. When motion compensation prediction is performed in a basis of a sub-block, the motion information candidate of a current block may be derived based on the motion vector of a sub-block including the left-top sample of a current block or including the central sample of a current block.

Based on the inter-prediction mode of a current block, it may be determined whether a current block will be used as a motion information candidate. In an example, a block encoded/decoded based on an affine motion model may be set to be unavailable as a motion information candidate. Accordingly, although a current block is encoded/decoded by inter-prediction, a motion information table may not be updated based on a current block when the inter-prediction mode of a current block is an affine prediction mode.

Alternatively, a motion information candidate may be derived based on at least one sub-block vector of a sub-block included in a block encoded/decoded based on an affine motion model. In an example, a motion information candidate may be derived using a sub-block positioned at the left-top, the center or the right-top of a current block. Alternatively, the average value of the sub-block vectors of a plurality of sub-blocks may be set as the motion vector of a motion information candidate.

Alternatively, a motion information candidate may be derived based on the average value of the affine seed vectors of a block encoded/decoded based on an affine motion model. In an example, at least one average of the first affine seed vector, the second affine seed vector or the third affine seed vector of a current block may be set as the motion vector of a motion information candidate.

Alternatively, a motion information table may be configured per inter-prediction mode. In an example, at least one of a motion information table for a block encoded/decoded by an intra block copy, a motion information table for a block encoded/decoded based on a translation motion model or a motion information table for a block encoded/decoded based on an affine motion model may be defined. According to the inter-prediction mode of a current block, one of a plurality of motion information tables may be selected.

FIG. 14 presents an example in which a motion information table is generated per inter-prediction mode.

When a block is encoded/decoded based on a non-affine motion model, a motion information candidate mvCand derived based on the above block may be added to a non-affine motion information table HmvpCandList.

A motion information candidate may be set to include additional information except for motion information. In an example, at least one of the size, shape or partition information of a block may be additionally stored in a motion information candidate. When the merge candidate list of a current block is configured, only motion information candidate whose size, shape or partition information is identical or similar to a current block among motion information candidates may be applied or a motion information candidate whose size, shape or partition information is identical or similar to a current block may be added to a merge candidate list in advance.

When the number of a merge candidate included in the merge candidate list of a current block is smaller than the threshold, a motion information candidate included in a motion information table may be added to a merge candidate list as a merge candidate. The additional process is performed in the order reflecting sorted order of indexes of motion information candidates in ascending or descending order. In an example, a motion information candidate with the largest index may be first added to the merge candidate list of a current block.

When a motion information candidate included in a motion information table is added to a merge candidate list, a redundancy check between a motion information candidate and pre-stored merge candidates in the merge candidate list may be performed. As a result of a redundancy check, a motion information candidate with the same motion information as a pre-stored merge candidate may not be added to the merge candidate list.

A redundancy check may be performed only for a part of motion information candidates included in a motion information table. In an example, a redundancy check may be performed only for a motion information candidate with an index over or below the threshold. Alternatively, a redundancy check may be performed only for N motion information candidates with the largest index or the smallest index.

Alternatively, a redundancy check may be performed only for a part of pre-stored merge candidates in a merge candidate list. In an example, a redundancy check may be performed only for a merge candidate whose index is over or below the threshold or a merge candidate derived from a block at a specific position. In this connection, a specific position may include at least one of the left neighboring block, the top neighboring block, the right-top neighboring block or the left-bottom neighboring block of a current block.

FIG. 15 is a diagram showing an example in which a redundancy check is performed only for a part of merge candidates.

When a motion information candidate HmvpCand[j] is added to a merge candidate list, a redundancy check with 2 merge candidates with the largest index, mergeCandList[NumMerge-2] and mergeCandList[NumMerge-1], may be performed for a motion information candidate. In this connection, NumMerge may show the number of an available spatial merge candidate and a temporal merge candidate.

Unlike a shown example, when a motion information candidate HmvpCand[j] is added to a merge candidate list, a redundancy check with 2 merge candidates with the smallest index may be performed for a motion information candidate. For example, it may be checked whether mergeCandList[0] and mergeCandList[1] are identical to HmvpCand[j].

Alternatively, a redundancy check may be performed only for a merge candidate derived from a specific position. In an example, a redundancy check may be performed for at least one of a merge candidate derived from a neighboring block positioned at the left of a current block or at the top of a current block. When there is no merge candidate derived from a specific position in a merge candidate list, a motion information candidate may be added to a merge candidate list without a redundancy check.

When a motion information candidate HmvpCand[j] is added to a merge candidate list, a redundancy check with 2 merge candidates with the largest index, mergeCandList[NumMerge-2] and mergeCandList[NumMerge-1], may be performed for a motion information candidate. In this connection, NumMerge may show the number of an available spatial merge candidate and a temporal merge candidate.

A redundancy check with a merge candidate may be performed only for a part of motion information candidates. In an example, a redundancy check may be performed only for N motion information candidates with a large or a small index among motion information candidates included in a motion information table. In an example, a redundancy check may be performed only for motion information candidates with an index that the number and difference of motion information candidates included in a motion information table are below the threshold. When the threshold is 2, a redundancy check may be performed only for 3 motion information candidates with the largest index value among motion information candidates included in a motion information table. A redundancy check may be omitted for motion information candidates except for the above 3 motion information candidates. When a redundancy check is omitted, a motion information candidate may be added to a merge candidate list regardless of whether the same motion information as a merge candidate is exist or not.

Conversely, a redundancy check is set to be performed only for motion information candidates with an index that the number and difference of motion information candidates included in a motion information table are over the threshold.

The number of a motion information candidate that a redundancy check is performed may be redefined in an encoder and a decoder. In an example, the threshold may be an integer such as 0, 1 or 2.

Alternatively, the threshold may be determined based on at least one of the number of a merge candidate included in a merge candidate list or the number of motion information candidates included in a motion information table.

When a merge candidate identical to the first motion information candidate is found, a redundancy check with the merge candidate identical to the first motion information candidate may be omitted in a redundancy check for the second motion information candidate.

FIG. 16 is a diagram showing an example in which a redundancy check with a specific merge candidate is omitted.

When a motion information candidate HmvpCand[i] whose index is i is added to a merge candidate list, a redundancy check between the motion information candidate and pre-stored merge candidates in a merge candidate list is performed. In this connection, when a merge candidate mergeCandlist[j] identical to a motion information candidate HmvpCand[i] is found, a redundancy check between a motion information candidate HmvpCand[i−1] whose index is i−1 and merge candidates may be performed without adding the motion information candidate HmvpCand[i] to a merge candidate list. In this connection, a redundancy check between the motion information candidate HmvpCand[i−1] and the merge candidate mergeCandList[j] may be omitted.

In an example, in an example shown in FIG. 16, it was determined that HmvpCand[i] and mergeCandList[2] are identical. Accordingly, a redundancy check for HmvpCand[i−1] may be performed without adding HmvpCand[i] to a merge candidate list. In this connection, a redundancy check between HmvpCand[i−1] and mergeCandList[2] may be omitted.

When the number of a merge candidate included in the merge candidate list of a current block is smaller than the threshold, at least one of a pairwise merge candidate or a zero merge candidate may be additionally included except for a motion information candidate. A pairwise merge candidate means a merge candidate having a value obtained from averaging the motion vectors of more than 2 merge candidates as a motion vector and a zero merge candidate means a merge candidate whose motion vector is 0.

For the merge candidate list of a current block, a merge candidate may be added in the following order.

Spatial merge candidate-Temporal merge candidate-Motion information candidate-(Affine motion information candidate)-Pairwise merge candidate-Zero merge candidate A spatial merge candidate means a merge candidate derived from at least one of a neighboring block or a non-neighboring block and a temporal merge candidate means a merge candidate derived from a previous reference picture. An affine motion information candidate represents a motion information candidate derived from a block encoded/decoded by an affine motion model.

The coding block may be partitioned into a plurality of prediction units, and prediction may be performed on each of the divided prediction units. In this connection, a prediction unit represents a basic unit at which prediction is performed.

The coding block may be partitioned into a plurality of prediction units using at least one of a vertical line, a horizontal line, an oblique line, or a diagonal line. Each of the prediction units as obtained by partitioning the block using a partitioning line may have a shape such as a triangle, a rectangle, a trapezoid, or a pentagon. In one example, the coding block may be partitioned into two prediction units of a triangle shape, two prediction units of a trapezoidal shape, two prediction units of a rectangle shape, or one prediction unit of a triangle shape and one prediction unit of a pentagonal shape.

Information for determining at least one of the number, angle, or position of lines for dividing the coding block may be signaled in a bitstream. In one example, information indicating one of partition type candidates of the coding block may be signaled in a bitstream, or information specifying one of the plurality of line candidates used for dividing the coding block may be signaled in a bitstream. In one example, index information indicating one of a plurality of line candidates may be signaled in a bitstream.

The plurality of line candidates may have different angles and/or positions. The number of line candidates available for the current block may be determined based on a size or a shape of the current block, the number of available merge candidates, or whether a neighboring block at a specific position can be used as a merge candidate.

Alternatively, information for determining the number or type of line candidates may be signaled in a bitstream. In one example, using a 1-bit flag, whether an oblique line having an angle greater than a diagonal line and/or an oblique line having an angle smaller than the diagonal line may be used as a line candidate may be determined. The information may be signaled at a sequence, picture, or sequence level.

Alternatively, at least one of the number, angle, or position of the lines for dividing the coding block may be determined adaptively, based on at least one of the intra-prediction mode or inter-prediction mode of the coding block, a position of an available merge candidate, or a partitioning pattern of a neighboring block.

When the coding block is partitioned into a plurality of prediction units, intra-prediction or inter-prediction may be performed on each of the divided prediction units.

FIG. 17 is a diagram showing an example of dividing the coding block into a plurality of prediction units using a diagonal line.

As in the examples shown in FIGS. 17 (a) and (b), a coding block may be partitioned into two triangle shape prediction units using a diagonal line.

In FIGS. 17 (a) and (b), a coding block is partitioned into two prediction units using a diagonal line connecting two vertices of the coding block. However, the coding block may be partitioned into two prediction units using an oblique line whose at least one end does not meet with a vertex of the coding block.

FIG. 18 is a diagram showing an example of dividing the coding block into two prediction units.

As in the examples shown in FIGS. 18 (a) and (b), a coding block may be partitioned into two prediction units using an oblique line whose both ends are in contact with a top boundary and a bottom boundary of the coding block, respectively.

Alternatively, as in the examples shown in of FIGS. 18 (c) and (d), the coding block may be partitioned into two prediction units using an oblique line whose both ends are in contact with a left boundary and a right boundary of the coding block, respectively.

Alternatively, the coding block may be partitioned into two prediction blocks having different sizes. In one example, each end of the oblique line for dividing the coding block may be respectively in contact with two boundary lines of the coding block forming one vertex, such that the coding block may be partitioned into two prediction units of different sizes.

FIG. 19 shows examples of dividing the coding block into a plurality of prediction blocks of different sizes.

As in the examples shown in FIGS. 19 (a) and (b), a diagonal line connecting a left-top and a right-bottom of the coding block with each other may not meet with a left-top corner or right-bottom corner of the coding block but may meet with the left boundary, right boundary, top boundary or bottom boundary thereof, such that the coding block may be partitioned into two prediction units having different sizes.

Alternatively, as in the examples shown in FIGS. 19 (c) and (d), the diagonal line connecting the right-top and left-bottom of the coding block with each other may not meet with the left-top corner or right-bottom corner of the coding block but may meet with the left boundary, right boundary, top boundary or bottom boundary thereof, such that the coding block may be partitioned into two prediction units having different sizes.

Each of the prediction units generated by partitioning the coding block may be referred to as an 'N-th prediction unit'. In one example, in the examples shown in FIG. 17 to FIG. 19, PU1 may be defined as a first prediction unit, and PU2 may be defined as a second prediction unit. The first prediction unit refers to a prediction unit including a sample positioned at a left bottom in the coding block or a sample positioned at a left top in the coding block. The second prediction unit may refer to a prediction unit including a sample positioned at a right top or a sample positioned at a right bottom in the coding block.

Contrary to the above definition, a prediction unit including a sample positioned at the right top or a sample positioned at the right bottom in the coding block may be defined as the first prediction unit, and a prediction unit including a sample positioned at the left bottom or a sample positioned at the left top in the coding block may be defined as the second prediction unit.

Dividing the coding block using a horizontal line, vertical line, diagonal line, or oblique line may be referred to as prediction unit partitioning. A prediction unit generated by applying the prediction unit partitioning may be referred to as a triangle prediction unit, a quadrangular prediction unit, or a pentagonal prediction unit according to a shape thereof.

In embodiments as described below, it is assumed that the coding block is partitioned into the plurality of prediction units using a diagonal line. In particular, dividing the coding block into two prediction units using a diagonal line may be referred to as diagonal partitioning or triangle partitioning. However, even when a coding block is partitioned into the plurality of prediction units using a vertical line, a horizontal line, or an oblique line having an angle different from that of the diagonal line, prediction units may be encoded/decoding according to embodiments to be described later. That is, principles related to encoding/decoding of the triangle prediction unit which will be described later may equally be applied to encoding/decoding the rectangular prediction unit or the pentagonal prediction unit.

Whether to apply the prediction unit partitioning to the coding block may be determined based on at least one of a slice type, a maximum number of merge candidates that the a merge candidate list may include, a size of the coding block, a shape of the coding block, a prediction encoding mode of the coding block, or a partitioning pattern of a parent node.

In one example, whether to apply the prediction unit partitioning to the coding block may be determined based on whether a current slice is of a B type. The prediction unit partitioning may be allowed only when the current slice is of the B type.

Alternatively, it may be determined whether to apply prediction unit partitioning to the coding block, based on whether the maximum number of merge candidates included in the merge candidate list is 2 or greater. The prediction unit partitioning may be allowed only when the maximum number of merge candidates included in the merge candidate list is 2 or greater.

Alternatively, when at least one of a width or height of the coding block is greater than 64, there is a disadvantage in terms of hardware implementation that a data processing unit of 64×64 size is accessed redundantly. Accordingly, when at least one of the width or height of the coding block is greater than a threshold, the partitioning of the coding block into a plurality of prediction units may not be allowed. In one example, when at least one of the height or width of the coding block is greater than 64 (e.g., when at least one of the width or height is 128), the prediction unit partitioning may not be used.

Alternatively, in consideration of the maximum number of samples that may be simultaneously processed in hardware implementation, the prediction unit partitioning may not be allowed for the coding block in which a number of samples is greater than a threshold. In one example, for a coding tree block in which the number of samples is larger than 4096, the prediction unit partitioning may not be allowed.

Alternatively, the prediction unit partitioning may not be allowed for a coding block in which the number of samples included in the coding block is smaller than a threshold. In one example, when the number of samples included in the coding block is smaller than 64, the prediction unit partitioning is not applied to the coding block.

Alternatively, whether to apply the prediction unit partitioning to a coding block may be determined based on whether a ratio of a width and a height of the coding block is smaller than a first threshold or whether the ratio of the width and the height of the coding block is greater than a second threshold. In this connection, the ratio whRatio of the width and the height of the coding block may be determined as the ratio of the width CbW and the height CbH of the coding block as shown in following Equation 2:

$$whRatio = CbW/CbH \qquad \text{[Equation 2]}$$

The second threshold may be an inverse number of the first threshold. In one example, when the first threshold is k, the second threshold may be 1/k.

The prediction unit partitioning may be applied to a coding block only when the ratio of the width and the height of the coding block is present between the first threshold and the second threshold.

Alternatively, the prediction unit partitioning may be applied only when the ratio of the width and the height of the coding block is smaller than the first threshold or larger than the second threshold. In one example, when the first threshold is 16, the prediction unit partitioning may not be allowed for a coding block of a 64×4 or 4×64 size.

Alternatively, it may be determined whether to allow the prediction unit partitioning, based on the partitioning pattern of the parent node. In one example, when the coding block as the parent node is divided based on a quad-tree partitioning scheme, the prediction unit partitioning may be applied to a coding block who is a leaf node. To the contrary, when the coding block as the parent node is divided based on binary tree or triple tree partitioning scheme, the prediction unit partitioning may not be allowed for the coding block who is a leaf node.

Alternatively, it may be determined whether to allow the prediction unit partitioning, based on the prediction encoding mode of the coding block. In one example, the prediction unit partitioning may be allowed only when the coding block is encoded via intra-prediction, when the coding block is encoded via inter-prediction or when the coding block is encoded using a predefined inter-prediction mode. In this connection, the predefined inter-prediction mode may include at least one of a merge mode, a motion vector prediction mode, an affine merge mode, or an affine motion vector prediction mode.

Alternatively, it may be determined whether to allow the prediction unit partitioning based on a size of a parallel processing region. In one example, when a size of the coding block is larger than the size of the parallel processing region, the prediction unit partitioning may not be used.

In consideration of two or more of the above enumerated conditions, whether to apply the prediction unit partitioning to the coding block may be determined.

In another example, information indicating whether to apply the prediction unit partitioning to the coding block may be signaled in a bitstream. The information may be signaled at a sequence, picture, slice or block level. For example, a flag, triangle_partition_flag, indicating whether the prediction unit partitioning is applied to the coding block may be signaled at a coding block level.

Upon determination to apply the prediction unit partitioning to the coding block, information indicating the number of lines or the position of the line for dividing the coding block may be signaled in a bitstream.

In one example, when the coding block is partitioned into the plurality of prediction units using a diagonal line, information indicating a direction of the diagonal line for dividing the coding block may be signaled in a bitstream. In one example, a flag, triangle_partition_type_flag, indicating the direction of the diagonal line may be signaled in a bitstream. The flag indicates whether the coding block is divided using a diagonal line connecting a left-top and a right-bottom of the coding block to each other or using a diagonal line connecting a right-top and a left-bottom thereof to each other. A scheme of dividing the coding block using the diagonal line connecting the left-top and the right-bottom to each other may be referred to a left-triangle partition type. A scheme of dividing the coding block using a diagonal line connecting the right-top and the left-bottom to each other may be referred to as a right-triangle partition type. In one example, when a value of the flag is 0, it may indicate that the partition type of the coding block is the left-triangle partition type. When the value of the flag is 1, it may indicate that the partition type of the coding block is the right-triangle partition type.

Additionally, information indicating whether the sizes of the prediction units are equal to each other or information indicating a position of a diagonal line for dividing the coding block may be signaled in a bitstream. In one example, when information indicating the sizes of prediction units indicates that the sizes of the prediction units are the same, encoding of information indicating the position of the diagonal line may be omitted, and the coding block may be partitioned into two prediction units using a diagonal line passing through two vertices of the coding block. To the contrary, when the information indicating the sizes of the prediction units indicates that the sizes of the prediction units are not the same as each other, the position of the diagonal line used for dividing the coding block may be determined based on the information indicating the position of the diagonal line. In one example, when the left-triangle partition type is applied to the coding block, the position information may indicate whether the diagonal line is in contact with a left boundary and a bottom boundary of the coding block or whether the diagonal is in contact with a top boundary and a right boundary thereof. Alternatively, when the right-triangle partition type is applied to the coding block, the position information may indicate whether the diagonal line is in contact with the right boundary and the bottom boundary of the coding block or whether the diagonal line is in contact with the top boundary and the left boundary thereof.

Information indicating the partition type of the coding block may be signaled at a coding block level. Accordingly, the partition type may be determined for each coding block to which the prediction unit partitioning is applied.

In another example, information indicating the partition type may be signaled for a sequence, picture, slice, tile, or coding tree unit. In this case, the partition types of the coding blocks to which diagonal partitioning is applied in the sequence, picture, slice, tile, or coding tree unit may be set to be the same.

Alternatively, information used for determining a partition type for a first coding unit to which prediction unit partitioning is applied in a coding tree unit may be encoded and signaled in a bitstream. The same partition type as that for the first coding unit may be applied to second and subsequent coding units to which prediction unit partitioning is applied in the same coding tree unit.

In another example, the partition type of the coding block may be determined based on the partition type of a neighboring block. In this connection, the neighboring block may include at least one of a neighboring block adjacent to a left top corner of the coding block, a neighboring block adjacent to a right top corner of the coding block, a neighboring block adjacent to a left bottom corner of the coding block, a neighboring block located on above the coding block or a neighboring block located on a left side of the coding block. In one example, the partition type of a current block may be set to the same as the partition type of the neighboring block. Alternatively, the partition type of the current block may be determined based on whether the left-triangle partition type is applied to a neighboring block adjacent to a left top corner of the current block, or whether the right-triangle partition type is applied to a neighboring block adjacent to a right top corner or a left bottom corner of the current block.

In order to perform motion prediction compensation for a first prediction unit and a second prediction unit, motion information of each of the first prediction unit and the second prediction unit may be derived. In this connection, motion information of the first prediction unit and the second prediction unit may be derived from merge candidates included in a merge candidate list. To distinguish between a general merge candidate list and a merge candidate list used to derive motion information of the prediction units, the merge candidate list for deriving motion information of the prediction units may be referred to as a partitioning mode merge candidate list or a triangle merge candidate list. Further, a merge candidate included in the partitioning mode merge candidate list may be referred to as a partitioning mode merge candidate or a triangle merge candidate. However, applying the merge candidate derivation method and the merge candidate list construction scheme as above-described to a partitioning mode merge candidate derivation method and a partitioning mode merge candidate list construction method may be included in an idea of the present disclosure.

Information for determining the maximum number of partitioning mode merge candidates that the partitioning mode merge candidate list may include may be signaled in a bitstream. The information may indicate a difference between the maximum number of merge candidates that the merge candidate list may include and the maximum number of partitioning mode merge candidates that the partitioning mode merge candidate list may include.

The partitioning mode merge candidate may be derived from a spatial neighboring block and a temporal neighboring block to the coding block.

FIG. 20 is a diagram showing neighboring blocks used to derive the partitioning mode merge candidate.

The partitioning mode merge candidate may be derived using at least one of a neighboring block located above the coding block, a neighboring block located on a left side of the coding block, or a collocated blocks included in a picture different from a picture including the coding block. The neighboring block located above the coding block may include at least one of a block including a sample (xCb+CbW−1, yCb−1) located above the coding block, a block including a sample (xCb+CbW, yCb−1) located above the coding block or a block including a sample (xCb−1, yCb−1) located above the coding block. The neighboring block located on the left side of the coding block may include at least one of a block including a sample (xCb−1, yCb+CbH−1) located on the left side of the coding block or a block including a sample (xCb−1, yCb+CbH) located on the left side of the coding block. The collocated block may be determined as one of a block including a sample (xCb+CbW, yCb+CbH) adjacent to a right top corner of the coding block in a collocated picture, and a block including a sample (xCb/2, yCb/2) located at a center of the coding block.

The neighboring blocks may be searched in a predefined order, and a partitioning mode merge candidate list can be constructed with searched partitioning mode merge candidates according to a predefined order. In one example, the partitioning mode merge candidate list may be constructed by searching the partitioning mode merge candidates in an order of B1, A1, B0, A0, C0, B2, and C1.

Motion information of the prediction units may be derived based on the partitioning mode merge candidate list. That is, the prediction units may share a single partitioning mode merge candidate list.

In order to derive motion information of the prediction unit, information for specifying at least one of the partitioning mode merge candidates included in the partitioning mode merge candidate list may be signaled in a bitstream. In one example, index information, merge_triangle_idx, for specifying at least one of the partitioning mode merge candidates may be signaled in a bitstream.

The index information may specify a combination of a merge candidate of the first prediction unit and a merge candidate of the second prediction unit. In one example, Table 1 below is an example of a combination of merge candidates according to index information, merge_triangle_idx.

TABLE 1

| | merge_triangle_idx | | | | | | | | |
|---|---|---|---|---|---|---|---|---|---|
| | 0 | 1 | 2 | 3 | 4 | 5 | 6 | 7 | 8 |
| First prediction unit | 1 | 0 | 0 | 0 | 2 | 0 | 0 | 1 | 3 |
| Second prediction unit | 0 | 1 | 2 | 1 | 0 | 3 | 4 | 0 | 0 |

| | merge_triangle_idx | | | | | | | | |
|---|---|---|---|---|---|---|---|---|---|
| | 9 | 10 | 11 | 12 | 13 | 14 | 15 | 16 | 17 |
| First prediction unit | 4 | 0 | 1 | 1 | 0 | 0 | 1 | 1 | 1 |
| Second prediction unit | 0 | 2 | 2 | 2 | 4 | 3 | 3 | 4 | 4 |

| | merge_triangle_idx | | | | | | | | |
|---|---|---|---|---|---|---|---|---|---|
| | 18 | 19 | 20 | 21 | 22 | 23 | 24 | 25 | 26 |
| First prediction unit | 1 | 2 | 2 | 2 | 4 | 3 | 3 | 3 | 4 |
| Second prediction unit | 3 | 1 | 0 | 1 | 3 | 0 | 2 | 4 | 0 |

| | merge_triangle_idx | | | | | | | | |
|---|---|---|---|---|---|---|---|---|---|
| | 27 | 28 | 29 | 30 | 31 | 32 | 33 | 34 | 35 |
| First prediction unit | 3 | 2 | 4 | 4 | 2 | 4 | 3 | 4 | 3 |
| Second prediction unit | 1 | 3 | 1 | 1 | 3 | 2 | 2 | 3 | 1 |

| | merge_triangle_idx | | | |
|---|---|---|---|---|
| | 36 | 37 | 38 | 39 |
| First prediction unit | 2 | 2 | 4 | 3 |
| Second prediction unit | 4 | 4 | 2 | 4 |

When a value of the index information, merge_triangle_idx, is 1, this indicates that the motion information of the first prediction unit is derived from a merge candidate whose index is 1, and the motion information of the second prediction unit is derived from a merge candidate whose index is 0. Based on the index information, merge_triangle_idx, a partitioning mode merge candidate for deriving motion information of the first prediction unit and a partitioning mode merge candidate for deriving motion information of the second prediction unit may be determined. The partition type of the coding block to which the diagonal partitioning is applied may be determined based on the index information. That is, the index information may specify a combination of a merge candidate of the first prediction unit, a merge candidate of the second prediction unit, and a partitioning direction of the coding block. When the partition type of the coding block is determined based on the index information, the information, triangle_partition_type_flag, indicating the direction of the diagonal line used for dividing the coding block may not be encoded. A following Table 2 shows the partition type of the coding block in the index information, merge_triangle_idx.

TABLE 2

| | merge_triangle_idx | | | | | | | | |
|---|---|---|---|---|---|---|---|---|---|
| | 0 | 1 | 2 | 3 | 4 | 5 | 6 | 7 | 8 |
| TriangleDir | 0 | 1 | 1 | 0 | 0 | 1 | 1 | 1 | 0 |

| | merge_triangle_idx | | | | | | | | |
|---|---|---|---|---|---|---|---|---|---|
| | 9 | 10 | 11 | 12 | 13 | 14 | 15 | 16 | 17 |
| TriangleDir | 0 | 0 | 0 | 1 | 0 | 0 | 0 | 0 | 1 |

| | merge_triangle_idx | | | | | | | | |
|---|---|---|---|---|---|---|---|---|---|
| | 18 | 19 | 20 | 21 | 22 | 23 | 24 | 25 | 26 |
| TriangleDir | 1 | 1 | 1 | 0 | 0 | 1 | 1 | 1 | 1 |

| | merge_triangle_idx | | | | | | | | |
|---|---|---|---|---|---|---|---|---|---|
| | 27 | 28 | 29 | 30 | 31 | 32 | 33 | 34 | 35 |
| TriangleDir | 1 | 1 | 1 | 0 | 0 | 1 | 0 | 1 | 0 |

| | merge_triangle_idx | | | |
|---|---|---|---|---|
| | 36 | 37 | 38 | 39 |
| TriangleDir | 0 | 1 | 0 | 0 |

A variable, TriangleDir, of 0 indicates that the left-triangle partition type is applied to the coding block. A variable, TriangleDir, of 1 indicates that the right-triangle partition type is applied to the coding block. Based on a combination of Tables 1 and 2, the index information, merge_triangle_idx, may be set to specify a combination of the merge candidate of the first prediction unit, the merge candidate of the second prediction unit, and the partitioning direction of the coding block. In another example, only index information for one of the first prediction unit and the second prediction unit may be signaled, and an index of the merge candidate for the other of the first prediction unit and the second prediction unit may be determined based on the index information. In one example, a merge candidate of the first prediction unit may be determined based on index information, merge_triangle_idx, indicating one of the partitioning mode merge candidates. A merge candidate of the second prediction unit may be determined based on the merge_triangle_idx. In one example, the merge candidate of the second prediction unit may be derived by adding or subtracting an offset to or from the index information, merge_triangle_idx. The offset may be an integer such as 1 or 2. In one example, the merge candidate of the second prediction unit may be determined as a partitioning mode merge candidate having a value obtained by adding 1 to merge_triangle_idx as an index. When merge_triangle_idx indicates a partitioning mode merge candidate having the largest index value among the partitioning mode merge candidates, motion information of the second prediction unit may be derived from a partitioning mode merge candidate with an index of 0 or a partitioning mode merge candidate with a value obtained by subtracting 1 from merge_triangle_idx as an index.

Alternatively, motion information of the second prediction unit may be derived from a partitioning mode merge candidate having the same reference picture as that of a partitioning mode merge candidate of the first prediction unit as specified by the index information. In this connection, the partitioning mode merge candidate having the same reference picture as that of the partitioning mode merge candidate of the first prediction unit may mean a partitioning mode merge candidate having at least one of a L0 reference picture or a L1 reference picture which is the same as that of the partitioning mode merge candidate of the first prediction unit. When there are a plurality of partitioning mode merge candidates having the same reference picture as that of the partitioning mode merge candidate of the first prediction unit, one may be selected from the plurality of partitioning mode merge candidates, based on at least one of whether a corresponding merge candidate includes bidirectional motion information or a difference between an index of a corresponding merge candidate and the index information.

In another example, index information may be signaled for each of the first prediction unit and the second prediction unit. In one example, first index information, 1st_merge_idx, for determining the partitioning mode merge candidate of the first prediction unit and second index information, 2nd_merge_idx, for determining the partitioning mode merge candidate of the second prediction unit may be signaled in a bitstream. The motion information of the first prediction unit may be derived from a partitioning mode merge candidate determined based on the first index information, 1st_merge_idx. The motion information of the second prediction unit may be derived from a partitioning mode merge candidate determined based on the second index information, 2nd_merge_idx.

The first index information, 1st_merge_idx, may indicate an index of one among the partitioning mode merge candidates included in the partitioning mode merge candidate list. The partitioning mode merge candidate of the first prediction unit may be determined as a partitioning mode merge candidate indicated by the first index information, 1st_merge_idx.

The partitioning mode merge candidate indicated by the first index information, 1st_merge_idx, may not be used as a partitioning mode merge candidate of the second prediction unit. Accordingly, the second index information, 2nd_merge_idx, of the second prediction unit may indicate an index of one of remaining partitioning mode merge candidates excluding the partitioning mode merge candidate indicated by the first index information. When a value of the second index information, 2nd_merge_idx, is smaller than a value of the first index information, 1st_merge_idx, the partitioning mode merge candidate of the second prediction unit may be determined as a partitioning mode merge candidate having index information indicated by the second index information, 2nd_merge_idx. To the contrary, when the value of the second index information, 2nd_merge_idx, is equal to or greater than the value of the first index information, 1st_merge_idx, the partitioning mode merge candidate of the second prediction unit may be determined as a partitioning mode merge candidate having, as an index, a value obtained by adding 1 to the value of the second index information, 2nd_merge_idx.

Alternatively, whether to signal the second index information may be determined based on the number of partitioning mode merge candidates included in the partitioning mode merge candidate list. In one example, when the maximum number of partitioning mode merge candidates that the partitioning mode merge candidate list may include does not exceed 2, the signaling of the second index information may be omitted. When the signaling of the second index information is omitted, a second partitioning mode merge candidate may be derived by adding or subtracting an offset to or from the first index information. In one example, when the maximum number of partitioning mode merge candidates that the partitioning mode merge candidate list may include is 2, and the first index information indicates 0, the second partitioning mode merge candidate may be derived by adding 1 to the first index information. Alternatively, when the maximum number of partitioning mode merge candidates that the partitioning mode merge candidate list may include is 2, and the first index information indicates 1, the second partitioning mode merge candidate may be derived by subtracting 1 from the first index information.

Alternatively, when the signaling of the second index information is omitted, the second index information may be set as a default value. In this connection, the default value may be 0. The second partitioning mode merge candidate may be derived based on a comparing result between the first index information and the second index information. In one example, when the second index information is smaller than the first index information, a merge candidate having index 0 may be determined as the second partitioning mode merge candidate. When the second index information is equal to or greater than the first index information, a merge candidate having index 1 may be determined as the second partitioning mode merge candidate.

When the partitioning mode merge candidate has unidirectional motion information, the unidirectional motion information of the partitioning mode merge candidate may be set as motion information of the prediction unit. To the contrary, when the partitioning mode merge candidate has bidirectional motion information, only one of L0 motion information or L1 motion information may be set as motion information of the prediction unit. Which one of L0 motion information or L1 motion information is to be set as motion information of the prediction unit may be determined based on index of the partitioning mode merge candidate or motion information of another prediction unit.

In one example, when the index of the partitioning mode merge candidate is even, the L0 motion information of the prediction unit may be set to 0 and the L1 motion information of the partitioning mode merge candidate may be set as the L1 motion information of the prediction unit. To the contrary, when the index of the partitioning mode merge candidate is odd, the L1 motion information of the prediction unit may be set to 0 and the L0 motion information of the partitioning mode merge candidate may be set to 0. In another example, when the index of the partitioning mode merge candidate is even, the L0 motion information of the partitioning mode merge candidate may be set as the L0 motion information of the prediction unit. When the index of the partitioning mode merge candidate is odd, the L1 motion information of the partitioning mode merge candidate may be set as the L1 motion information of the prediction unit. Alternatively, for the first prediction unit, when the index of the partitioning mode merge candidate is even, the L0 motion information of the partitioning mode merge candidate may be set as the L0 motion information of the first prediction unit. For the second prediction unit, when the index of the partitioning mode merge candidate is odd, the L1 motion information of the partitioning mode merge candidate may be set as the L1 motion information of the second prediction unit.

Alternatively, when the first prediction unit has L0 motion information, the L0 motion information of the second prediction unit may be set to 0, and the L1 motion information of the partitioning mode merge candidate may be set as L1 information of the second prediction unit. To the contrary, when the first prediction unit has L1 motion information, the L1 motion information of the second prediction unit may be set to 0, and the L0 motion information of the partitioning mode merge candidate may be set as the L0 motion information of the second prediction unit.

A partitioning mode merge candidate list for deriving motion information of the first prediction unit and a partitioning mode merge candidate list for deriving motion information of the second prediction unit may be individually constructed.

In one example, when a partitioning mode merge candidate for deriving motion information of the first prediction unit in the partitioning mode merge candidate list is specified based on the index information for the first prediction unit, the motion information of the second prediction unit may be derived using a partitioning mode merge list including remaining partitioning mode merge candidates except for a partitioning mode merge candidate indicated by the index information. Specifically, the motion information of the second prediction unit may be derived from one of the remaining partitioning mode merge candidates.

Accordingly, the maximum number of partitioning mode merge candidates included in the partitioning mode merge candidate list of the first prediction unit and the maximum number of partitioning mode merge candidates included in the partitioning mode merge candidate list of the second prediction unit may be different from each other. In one example, when the partitioning mode merge candidate list of the first prediction unit includes M merge candidates, the partitioning mode merge candidate list of the second prediction unit may include M−1 merge candidates excluding a partitioning mode merge candidate indicated by the index information of the first prediction unit.

In another example, a merge candidate of each prediction unit may be derived based on neighboring blocks adjacent to the coding block. In this connection, availability of the neighboring block may be determined based on a shape or a position of the prediction unit.

FIG. 21 is a diagram for describing an example of determining availability of a neighboring block for each prediction unit.

A neighboring block that is not adjacent to the first prediction unit is set to be unavailable for the first prediction unit. A neighboring block that is not adjacent to the second prediction unit may be set to be unavailable for the second prediction unit.

In one example, as in the example shown in FIG. 21 (a), when a left-triangle partition type is applied to the coding block, blocks A1, A0, and A2 adjacent to the first prediction unit among the neighboring blocks adjacent to the coding block may be determined to be available for the first prediction unit, whereas blocks B0 and B1 not adjacent to the first prediction unit may be set not to be available for the first prediction unit. Accordingly, the partitioning mode merge candidate list for the first prediction unit may include partitioning mode merge candidates derived from the blocks A1, A0 and B2, but may not include partitioning mode merge candidates derived from blocks B0 and B1.

As in the example shown in FIG. 21 (b), when a left-triangle partition type is applied to the coding block, blocks B0 and B1 adjacent to the second prediction unit may be set to be available for the second prediction unit, and blocks A1, A0, and B2 may be set to be unavailable for the second prediction unit. Accordingly, the partitioning mode merge candidate list for the second prediction unit may include partitioning mode merge candidates derived from blocks B0 and B1, but may not include partitioning mode merge candidates derived from blocks A1, A0 and B2.

Accordingly, the number or a range of partitioning mode merge candidates that the prediction unit may use may be determined based on at least one of the position of the prediction unit or the partition type of the coding block.

In another example, the merge mode may be applied to only one of the first prediction unit and the second prediction unit. In this connection, motion information of the other of the first prediction unit and the second prediction unit may be set to be the same as the motion information of the prediction unit to which the merge mode is applied, or may be derived by refining motion information of the prediction unit to which the merge mode is applied.

In one example, based on the partitioning mode merge candidate, a motion vector and a reference picture index of the first prediction unit may be derived. In this connection, the motion vector of the second prediction unit may be derived by refining the motion vector of the first prediction unit. In one example, the motion vector of the second prediction unit may be derived by adding or subtracting a refined motion vector, {Rx, Ry}, to or from a motion vector, {mvD1LXx, mvD1LXy}, of the first prediction unit. A reference picture index of the second prediction unit may be set to be equal to the reference picture index of the first prediction unit.

Information for determining a refined motion vector representing a difference between the motion vector of the first prediction unit and the motion vector of the second prediction unit may be signaled in a bitstream. The information may include at least one of information indicating a size of the refined motion vector or information indicating a direction of the refined motion vector.

Alternatively, the direction of the refined motion vector may be derived based on at least one of a position, and an index of the prediction unit, and a partition type applied to the coding block.

In another example, a motion vector and a reference picture index of one of the first prediction unit and the second prediction unit may be signaled in a bitstream. A motion vector of the other of the first prediction unit and the second prediction unit may be derived by refining the signaled motion vector.

In one example, based on the information signaled in the bitstream, a motion vector and a reference picture index of the first prediction unit may be determined. The motion vector of the second prediction unit may be derived by refinement of the motion vector of the first prediction unit. In one example, the motion vector of the second prediction unit may be derived by adding or subtracting a refined motion vector, {Rx, Ry}, to a motion vector, {mvD1LXx, mvD1LXy}, of the first prediction unit. A reference picture index of the second prediction unit may be set to be equal to the reference picture index of the first prediction unit.

In another example, the merge mode may be applied to only one of the first prediction unit and the second prediction unit. Motion information of the other of the first prediction unit and the second prediction unit may be derived based on motion information of the prediction unit to which the merge mode is applied. In one example, a symmetric motion vector to the motion vector of the first prediction unit may be set as the motion vector of the second prediction unit. In this connection, the symmetric motion vector has the same size as that of the motion vector of the first prediction unit, but has an opposite direction in at least one of x-axis and y-axis components to that of the motion vector of the first prediction unit. Alternatively, the symmetric motion vector may mean a motion vector having the same size as that of a scaled vector obtained by scaling the motion vector of the first prediction unit, but having an opposite direction in at least one of x-axis and y-axis components to that of the scaled vector. In one example, when the motion vector of the first prediction unit is (MVx, MVy), the motion vector of the second prediction unit may be set to (MVx, -MVy), (-MVx, MVy) or (-MVx, -MVy) which is the symmetric motion vector to the motion vector of the first prediction unit.

A reference picture index of one of the first prediction unit and the second prediction unit to which the merge mode is not applied may be set to be equal to a reference picture index of the other thereof to which the merge mode is applied. Alternatively, a reference picture index of a prediction unit to which the merge mode is not applied may be set to a predefined value. In this connection, the predefined value may be the smallest index or the largest index in the reference picture list. Alternatively, information specifying the reference picture index of the prediction unit to which the merge mode is not applied may be signaled in a bitstream. Alternatively, the reference picture of the prediction unit to which the merge mode is not applied may be selected from a reference picture list different from a reference picture list to which a reference picture of the prediction unit to which the merge mode is applied belongs. In one example, when the reference picture of the prediction unit to which the merge mode is applied is selected from a L0 reference picture list, the reference picture of the prediction unit to which the merge mode is not applied may be selected from a L1 reference picture list. In this connection, the reference picture of the prediction unit to which the merge mode is not applied may be derived based on a difference in a picture order count (POC) between a reference picture of the prediction unit to which the merge mode is applied and a current picture. In one example, when the reference picture of the prediction unit to which the merge mode is applied is selected from the L0 reference picture list, a reference picture in the L1 reference picture list having a difference thereof from a current picture equal to or similar to a difference between a reference picture of the prediction unit to which the merge mode is applied and the current picture may be selected as the reference picture of the prediction unit to which the merge mode is not applied.

When a POC difference between the reference picture of the first prediction unit and the current picture is different from a POC difference between the reference picture of the second prediction unit and the current picture, a symmetric motion vector to a scaled motion vector obtained by scaling a motion vector of the prediction unit to which the merge mode is applied may be set as the motion vector of the prediction unit to which the merge mode is not applied. In this connection, the scaling may be performed based on each POC difference between each reference picture and the current picture.

In another example, a motion vector of each of the first prediction unit and the second prediction unit may be derived and then a refined vector may be added or subtracted to or from the derived motion vector. In one example, the motion vector of the first prediction unit may be derived by adding or subtracting a first refined vector to or from a first motion vector derived based on a first merge candidate, and the motion vector of the second prediction unit may be derived by adding or subtracting a second refined vector to or from a second motion vector derived based on a second merge candidate. Information for determining at least one of the first refined vector or the second refined vector may be signaled in a bitstream. The information may include at least one of information for determining a size of the refined vector or information for determining a direction of the refined vector.

The second refined vector may be a symmetric motion vector to the first refined vector. In this case, information for determining only one of the first refined vector and the second refined vector may be signaled in a bitstream. In one example, when the first refined vector is determined as (MVDx, MVDy) based on the information signaled in the bitstream, a symmetric motion vector, (-MVDx, MVDy), (MVDx, -MVDy) or (-MVDx, -MVDy), to the first refined vector may be set as the second refined vector. A symmetric motion vector to a scaled motion vector obtained by scaling the first refined vector may be set as the second refined vector, based on a POC of a reference picture of each of the prediction units.

In another example, motion information of one of the first prediction unit and the second prediction unit may derived based on a merge candidate, while motion information of the other thereof may be determined based on information signaled in a bitstream. In one example, a merge index for the first prediction unit may be signaled, while at least one of information for determining a motion vector for the second prediction unit and information for determining a reference picture for the second prediction unit may be signaled in a bitstream. The motion information of the first prediction unit may be set to be equal to motion information of the merge candidate specified by the merge index. The motion information of the second prediction unit may be specified by at least one of information for determining a motion vector and information for determining a reference picture as signaled in a bitstream.

Motion prediction compensation prediction for each coding block may be performed based on motion information of the first prediction unit and motion information of the second prediction unit. In this connection, image quality deterioration may occur in a boundary between the first prediction unit and the second prediction unit. In one example, continuity of image quality may deteriorate around an edge that exists in the boundary between the first prediction unit and the second prediction unit. In order to reduce the image quality deterioration in the boundary, a prediction sample may be derived via a smoothing filter or weighted prediction.

The prediction sample in the coding block to which diagonal partitioning is applied may be derived based on a weighted sum of a first prediction sample obtained based on the motion information of the first prediction unit and a second prediction sample obtained based on the motion information of the second prediction unit. Alternatively, a prediction sample of the first prediction unit may be derived from a first prediction block determined based on the motion information of the first prediction unit, and a prediction sample of the second prediction unit may be derived from a second prediction block determined based on the motion information of the second prediction unit. In this connection, a prediction samples located in a boundary region between the first prediction unit and the second prediction unit may be derived based on a weighted sum of a first prediction sample included in the first prediction block and a second prediction sample included in the second prediction block. In one example, Equation 3 below presents an example of deriving prediction samples of the first prediction unit and the second prediction unit.

$$P(x,y)=w1*P1(x,y)+(1-w1)*P2(x,y) \qquad \text{[Equation 3]}$$

In the Equation 3, P1 represents the first prediction sample, P2 represents the second prediction sample. w1 represents a weight applied to the first prediction sample, and (1−w1) represents a weight applied to the second prediction sample. As in the example shown in Equation 3, the weight applied to the second prediction sample may be derived by subtracting the weight applied to the first prediction sample from a constant value.

When the left-triangle partition type is applied to the coding block, the boundary region may include prediction samples, each sample having an x-axis coordinate and a y-axis coordinate which are the same. To the contrary, when the right-triangle partition type is applied to the coding block, the boundary region may include prediction samples, in which a sum of an x-axis coordinate and a y-axis coordinate of each sample is greater than or equal to a first threshold and is smaller than or equal to a second threshold.

A size of the boundary region may be determined based on at least one of a size of the coding block, a shape of the coding block, motion information of the prediction units, a difference between motion vectors of the prediction units, and a POC of the reference picture, or a difference between the first prediction sample and the second prediction sample at a diagonal boundary.

Figures 22, 23:
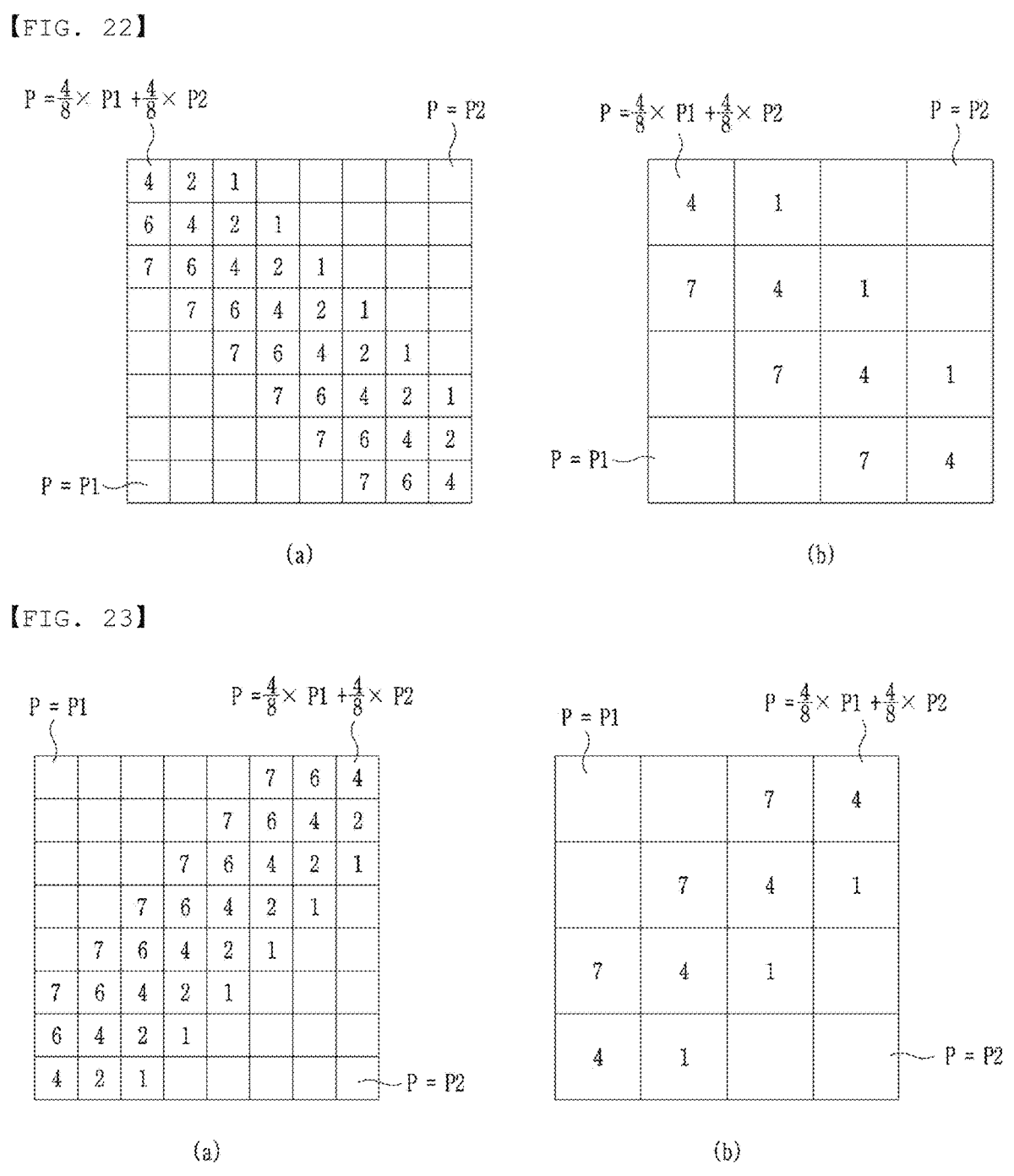

FIGS. 22 and 23 are diagrams showing examples of deriving a prediction sample based on a weighted sum of the first prediction sample and the second prediction sample. FIG. 22 is an example of a case where the left-triangle partition type is applied to the coding block. FIG. 23 is an example of a case where the right-triangle partition type is applied to the coding block. In addition, FIG. 22 (a) and FIG. 23 (a) are diagrams showing prediction patterns for a luma component. FIG. 22 (b) and FIG. 23 (b) are diagrams showing prediction patterns for a chroma component.

In the illustrated drawing, a number marked on a prediction sample located near a boundary of the first prediction unit and the second prediction unit indicates a weight applied to the first prediction sample. In one example, when the number marked on the prediction sample is N, a weight of N/8 may be applied to the first prediction sample, and a weight of (1−(N/8)) may be applied to the second prediction sample, thereby to derive the prediction sample.

In a non-boundary region, a first prediction sample or a second prediction sample may be determined as a prediction sample. Referring to the example of FIG. 22, in a region belonging to the first prediction unit, a first prediction sample derived based on motion information of the first prediction unit may be determined as a prediction sample. To the contrary, in a region belonging to the second prediction unit, a second prediction sample derived based on motion information of the second prediction unit may be determined as a prediction sample.

Referring to the example of FIG. 23, in a region where a sum of the x-axis coordinate and the y-axis coordinate is smaller than a first threshold, a first prediction sample derived based on motion information of the first prediction unit may be determined as a prediction sample. To the contrary, in a region in which the sum of the x-axis coordinate and the y-axis coordinate is greater than the second threshold, a second prediction sample derived based on motion information of the second prediction unit may be determined as a prediction sample.

A threshold for determining a non-boundary region may be determined based on at least one of a coding block size, a coding block shape, or a color component. In one example, when a threshold for a luma component is set to N, a threshold for a chroma component may be set to N/2.

The prediction samples included in the boundary region may be derived based on a weighted sum of the first prediction sample and the second prediction sample. In this connection, the weights applied to the first prediction sample and the second prediction sample may be determined based on at least one of a position of a prediction sample, a size of a coding block, a shape of a coding block, or a color component.

In one example, as in the example shown in FIG. 22 (a), prediction samples, each having the x-axis coordinate and the y-axis coordinate which are the same, may be derived by applying the same weight to the first prediction sample and the second prediction sample. Prediction samples in which an absolute value of a difference between the x-axis coordinate and the y-axis coordinate of each sample is 1 may be derived by setting a ratio of a weight applied to the first prediction sample and a weight applied to the second prediction sample to (3:1) or (1:3). Further, prediction samples in which an absolute value of a difference between the x-axis coordinate and the y-axis coordinate of each sample is 2 may be derived by setting a ratio of a weight applied to the first prediction sample and a weight applied to the second prediction sample to (7:1) or (1:7).

Alternatively, as in the example shown in FIG. 22 (b), prediction samples in which the x-axis coordinate and the y-axis coordinate of each sample are the same may be derived by applying the same weight to the first prediction sample and the second prediction sample. Prediction samples in which an absolute value of a difference between the x-axis coordinate and the y-axis coordinate of each sample is 1 may be derived by setting a ratio of a weight applied to the first prediction sample and a weight applied to the second prediction sample to (7:1) or (1:7).

In one example, as in the example shown in FIG. 23 (a), prediction samples in which a sum of the x-axis coordinate and the y-axis coordinates of each prediction sample is smaller than a width or a height of the coding block by 1 may be derived by applying the same weight to the first prediction sample and the second prediction sample. Prediction samples in which a sum of the x-axis coordinate and the y-axis coordinate of each sample is the same as the width or the height of the coding block or is smaller than the width or the height of the coding block by 2 may be derived by setting the ratio of the weight applied to the first prediction sample and the weight applied to the second prediction sample to (3:1) or (1:3). Prediction samples in which a sum of the x-axis coordinate and the y-axis coordinate of each sample is larger than the width or the height of the coding block by 1 or is smaller than the width or the height of the coding block by 3 may be derived by setting the ratio of the weight applied to the first prediction sample and the weight applied to the second prediction sample to (7:1) or (1:7).

Alternatively, as in the example shown in FIG. 23 (b), prediction samples in which a sum of the x-axis coordinate and the y-axis coordinate of each sample is smaller than the width or the height of the coding block by 1 may be derived by applying the same weight to the first prediction sample and the second prediction sample. Prediction samples in which a sum of the x-axis coordinate and the y-axis coordinate of each sample is the same as the width or the height of the coding block or is smaller than the width or the height of the coding block by 2 may be derived by setting a ratio between the weight applied to the first prediction sample and the weight applied to the second prediction sample to (7:1) or (1:7).

In another example, the weight may be determined based on a position of the prediction sample or a shape of the coding block. Following Equation 4 to Equation 6 represent examples of deriving weights when the left-triangle partition type is applied to the coding block. Equation 4 presents an example of deriving a weight applied to the first prediction sample when the coding block is square.

$$w1=(x-y+4)/8 \quad \text{[Equation 4]}$$

In the above Equation 4, x and y represent a position of the prediction sample. When the coding block is non-square, the weight applied to the first prediction sample may be derived as in Equation 5 or Equation 6. Equation 5 represents a case where the width of the coding block is greater than the height thereof. Equation 6 represents a case where the width of the coding block is smaller than the height thereof.

$$w1=((x/whRatio)-y+4)/8 \quad \text{[Equation 5]}$$

$$w1=(x-(y*whRatio)+4)/8 \quad \text{[Equation 6]}$$

When the right-triangle partition type is applied to the coding block, following Equation 7 to Equation 9 may be applied to determine the weight applied to the first prediction sample. Equation 7 presents an example of deriving the weight applied to the first prediction sample when the coding block is square.

$$w1=(CbW-1-x-y)+4)/8 \quad \text{[Equation 7]}$$

In the above Equation 7, CbW represents the width of the coding block. When the coding block is non-square, the weight applied to the first prediction sample may be derived using following Equation 8 or Equation 9. Equation 8 represents a case where the width of the coding block is greater than the height thereof. Equation 9 represents a case where the width of the coding block is smaller than the height thereof.

$$w1=(CbH-1-(x/whRatio)-y+4)/8 \quad \text{[Equation 8]}$$

$$w1=(CbW-1-x-(y*whRatio)+4)/8 \quad \text{[Equation 9]}$$

In the above Equation 8, CbH represents the height of the coding block.

As in the illustrated example, a prediction sample included in the first prediction unit among prediction samples within the boundary region may be derived by applying a first weight to the first prediction sample and applying a second weight smaller than the first weight to the second prediction sample. A prediction sample included in the second prediction unit among prediction samples within the boundary region may be derived by applying a first weight to the first prediction sample and applying a second weight greater than the first weight to the second prediction sample.

When diagonal partitioning is applied to the coding block, a combined prediction mode in which an intra-prediction mode and a merge mode are combined may not be applied to the coding block.

When encoding/decoding of a current coding block is completed, motion information of the current coding block for which the encoding/decoding has been completed may be stored for encoding/decoding of a next coding block. The motion information may be stored on a sub-block basis having a preset size. In one example, a sub-block having a preset size may have a 4×4 size. Alternatively, based on the size or the shape of the coding block, the size or the shape of the sub-block may vary.

When the sub-block belongs to the first prediction unit, motion information of the first prediction unit may be stored as motion information of the sub-block. To the contrary, when the sub-block belongs to the second prediction unit, motion information of the second prediction unit may be stored as motion information of the sub-block.

When the sub-block belongs to a boundary of the first prediction unit and the second prediction unit, one of motion information of the first prediction unit and motion information of the second prediction unit may be set as motion information of the sub-block. In one example, motion information of the first prediction unit may be set as motion information of the sub-block, or motion information of the second prediction unit may be set as motion information of the sub-block.

In another example, when the sub-block belongs to the boundary of the first prediction unit and the second prediction unit, one of the L0 motion information and L1 motion information of the sub-block may be derived from the first prediction unit, while the other of the L0 motion information and the L1 motion information of the sub-block may be derived from the second prediction unit. In one example, the L0 motion information of the first prediction unit may be set as the L0 motion information of the sub-block, and the L1 motion information of the second prediction unit may be set as the L1 motion information of the sub-block. However, when each of the first prediction unit and the second prediction unit has only the L0 motion information or only the L1 motion information, one of the first prediction unit and the second prediction unit may be selected and then the motion information of the sub-block may be determined based on the selected one. Alternatively, an average value of the motion vectors of the first prediction unit and the second prediction unit may be set as the motion vector of the sub-block.

Motion information of a current coding block for which encoding/decoding has been completed may be updated to a motion information table. In this connection, motion information of a coding block to which the prediction unit partitioning is applied may not be added to the motion information table.

Alternatively, only motion information of one of a plurality of prediction units generated by partitioning the coding block may be added to the motion information table. In one example, while motion information of the first prediction unit may be added to the motion information table, motion information of the second prediction unit may not be added to the motion information table. In this connection, a prediction unit to be added to the motion information table may be selected based on at least one of a coding block size, a coding block shape, a prediction unit size, a prediction unit shape, or whether bi-directional prediction has been performed on the prediction unit.

Alternatively, motion information of each of the plurality of prediction units generated by partitioning the coding block may be added to the motion information table. In this connection, an order in which motion information of the plurality of prediction units are added to the motion information table may be predefined in the encoder and the decoder. In one example, motion information of a prediction unit including a left-top sample or a left-bottom corner sample may be added to the motion information table before motion information of a prediction unit that does not include the left-top sample or the left-bottom corner sample is added thereto. Alternatively, an order at which motion information of each prediction unit is added to the motion information table may be determined based on at least one of a merge index, a reference picture index, or a motion vector size of each prediction unit.

Alternatively, a combination of motion information of the first prediction unit and motion information of the second prediction unit may be added to the motion information table. One of the L0 motion information and the L1 motion information of the combination may be derived from the first prediction unit, while the other of the L0 motion information and the L1 motion information thereof may be derived from the second prediction unit.

Alternatively, motion information to be added to the motion information table may be determined based on whether reference pictures of the first prediction unit and the second prediction unit are the same as each other. In one example, when the reference pictures of the first prediction unit and the second prediction unit are different from each other, motion information of one of the first prediction unit and the second prediction unit or a combination of motion information of the first prediction unit and motion information of the second prediction unit may be added to the motion information table. To the contrary, when the reference picture of the first prediction unit and the second prediction unit are the same as each other, an average of the motion vector of the first prediction unit and the motion vector of the second prediction unit may be added to the motion information table.

Alternatively, a motion vector to be added to the motion information table may be determined based on a size of the coding block, a shape of the coding block, or a partitioning type of the coding block. In one example, when the right-triangle partitioning is applied to the coding block, motion information of the first prediction unit may be added to the motion information table. To the contrary, when the left-triangle partitioning is applied to the coding block, motion information of the second prediction unit may be added to the motion information table, or a combination of motion information of the first prediction unit and motion information of the second prediction unit may be added to the motion information table.

A motion information table for storing motion information of a coding block to which the prediction unit partitioning is applied may be separately defined. In one example, motion information of the coding block to which the prediction unit partitioning is applied may be stored in a partitioning mode motion information table. The partitioning mode motion information table may be referred to as a triangle motion information table. That is, motion information of the coding block to which the prediction unit partitioning is not applied may be stored in a general motion information table, whereas motion information of the coding block to which the prediction unit partitioning is applied may be stored in the partitioning mode motion information table. The embodiments in which the motion information of the coding block to which the prediction unit partitioning is applied is added to the motion information table as described above may be applied to updating the partitioning mode motion information table. In one example, the partitioning mode motion information table may include motion information of the first prediction unit, motion information of the second prediction unit, a combination of motion information of the first prediction unit and motion information of the second prediction unit, and motion information obtained by averaging a motion vector of the first prediction unit and a motion vector of the second prediction unit.

When the prediction mode partitioning is not applied to the coding block, a merge candidate may be derived using the general motion information table. To the contrary, when the prediction mode partitioning is applied to the coding block, a merge candidate may be derived using the prediction mode motion information table.

Intra-prediction is to predict a current block by using a reconstructed sample that has been already encoded/decoded and which is around the current block. In this connection, a reconstructed sample before applying an in-loop filter may be applied for intra-prediction of the current block.

An intra-prediction method includes intra-prediction based on a matrix and intra-prediction according to a direction with a neighboring reconstruction sample. Information indicating an intra-prediction method of a current block may be signaled in a bitstream. The information may be a 1-bit flag. Alternatively, an intra-prediction of a current block may be determined on the basis of at least one of a position of the current block, a size of the current block, a shape of the current block, or an intra-prediction method of a neighboring block. In an example, when a current block is present crossing a picture boundary, it may be set such that an intra-prediction method based on a matrix is not applied to the current block.

An intra-prediction method based on a matrix is a method of obtaining a prediction block of a current block on the basis of a matrix product of a matrix stored in the encoder and the decoder, and reconstruction samples around the current block. Information for specifying any one of a plurality of prestored matrices may be signaled in a bitstream. The decoder may determine a matrix for performing intra-prediction on a current block on the basis of the above information and a size of the current block.

General intra-prediction is a method of obtaining a prediction block of a current block on the basis of a non-directional intra-prediction mode or directional intra-prediction mode. Hereinafter, with reference to figures, a process of intra-prediction based on general intra-prediction will be described in detail.

FIG. 24 is a flow diagram of an intra-prediction method according to an embodiment of the present disclosure.

A reference sample line of a current block may be determined S2401. The reference sample line means a group of reference samples included in a k-th line apart from a top and/or a left of the current block. A reference sample may be derived from a reconstructed sample encoded/decoded around the current block.

Index information identifying a reference sample line for a current block among a plurality of reference sample lines may be signaled in a bitstream. In an example, index information, intra_luma_ref_idx, for specifying the reference sample line of the current block may be signaled in the bitstream. The index information may be signaled per coding block.

A plurality of reference sample lines may include at least one of a first line, a second line or a third line at a top and/or left of a current block. A reference sample line composed of a row adjacent to the top of the current block and a column adjacent to the left of the current block among a plurality of reference sample lines may be referred to as an adjacent reference sample line, and other reference sample lines may be referred to as a non-adjacent reference sample line.

Table 3 shows an index assigned to each candidate reference sample line.

TABLE 3

| Index (intra_luma_ref_idx) | Reference sample line |
|---|---|
| 0 | Adjacent reference sample line |
| 1 | First non-adjacent reference sample line |
| 2 | Second non-adjacent reference sample line |

Based on at least one of a position, a size, a shape of a current block or a prediction encoding mode of a neighboring block, a reference sample line of the current block may be determined. In one example, when the current block adjoins a boundary of a picture, a tile, a slice or a coding tree unit, an adjacent reference sample line may be determined as the reference sample line of the current block. A reference sample line may include top reference samples positioned at a top of the current block and left reference samples positioned at a left of the current block. The top reference samples and left reference samples may be derived from reconstructed samples around the current block. The reconstructed samples may be in a state before an in-loop filter is applied.

Next, an intra-prediction mode of a current block may be determined S2402. For the intra-prediction mode of the current block, at least one of a non-directional intra-prediction mode or a directional intra-prediction mode may be determined as the intra-prediction mode of the current block. Non-directional intra-prediction modes includes a planar and a DC and directional intra-prediction modes includes 33 or 65 modes from a left-bottom diagonal direction to a right-top diagonal direction.

FIG. 25 is a diagram showing intra-prediction modes.

FIG. 25 (a) shows 35 intra-prediction modes and FIG. 25 (b) shows 67 intra-prediction modes.

The larger or smaller number of intra-prediction modes than shown in FIG. 25 may be defined.

Based on an intra-prediction mode of a neighboring block adjacent to a current block, an MPM (Most Probable Mode) may be set. In this connection, a neighboring block may include a left neighboring block adjacent to a left of the current block and a top neighboring block adjacent to a top of the current block.

The number of MPMs included in an MPM list may be preset in an encoder and a decoder. In an example, the number of MPMs may be 3, 4, 5 or 6. Alternatively, information representing the number of MPMs may be signaled in a bitstream. Alternatively, based on at least one of a prediction encoding mode of a neighboring block, a size, a shape or a reference sample line index of a current block, the number of MPMs may be determined. In an example, while N MPMs may be applied when an adjacent reference sample line is determined as the reference sample line of the current block, M MPMs may be applied when a non-adjacent reference sample line is determined as the reference sample line of the current block. As M is a natural number smaller than N, in an example, N may be 6 and M may be 5, 4 or 3. Accordingly, while the intra-prediction mode of the current block may be determined as any one of 6 candidate intra-prediction modes when the index of the reference sample line of the current block is 0 and an MPM flag is true, the intra-prediction mode of the current block may be determined as any one of 5 candidate intra-prediction modes when the index of the reference sample line of the current block is larger than 0 and an MPM flag is true.

Alternatively, the fixed number (e.g. 6 or 5) of MPM candidates may be applied regardless of the index of the reference sample line of the current block.

An MPM list including a plurality of MPMs may be generated and information indicating whether the same MPM as an intra-prediction mode of a current block is included in the MPM list may be signaled in a bitstream. As the information is a 1-bit flag, it may be referred to as an MPM flag. When the MPM flag represents the same MPM as the current block is included in the MPM list, index information identifying one of MPMs may be signaled in a bitstream. In an example, index information, mpm_idx, specifying any one of plural MPMs may be signaled in a bitstream. An MPM specified by the index information may be set as the intra-prediction mode of the current block. When the MPM flag represents the same MPM as the current block is not included in the MPM list, remaining mode information indicating any one of remaining intra-prediction modes except for MPMs may be signaled in a bitstream. Remaining mode information represents an index value corresponding to the intra-prediction mode of the current block when an index is reassigned to remaining intra-prediction modes except for MPMs. A decoder may determine the intra-prediction mode of the current block by arranging MPMs in the ascending order and comparing remaining mode information with MPMs. In an example, when remaining mode information is equal to or smaller than MPM, the intra-prediction mode of the current block may be derived by adding 1 to remaining mode information.

In deriving an intra-prediction mode of a current block, comparing a part of MPMs with remaining mode information may be omitted. In an example, MPMs in a non-directional intra-prediction mode among MPMs may be excluded from a comparison target. When non-directional intra-prediction modes are set as MPMs, remaining mode information clearly indicates a directional intra-prediction mode, so the intra-prediction mode of the current block may be derived by comparing remaining MPMs except for non-directional intra-prediction modes with remaining mode information. Instead of excluding non-directional intra-prediction modes from a comparison target, a result value may be compared with remaining MPMs after adding the number of non-directional intra-prediction modes to remaining mode information.

Instead of setting a default mode as an MPM, information indicating whether an intra-prediction mode of a current block is the default mode may be signaled in a bitstream. The information is a 1-bit flag and the flag may be referred to as a default mode flag. The default mode flag may be signaled only when an MPM flag represents that the same MPM as the current block is included in an MPM list. As described above, the default mode may include at least one of a planar, DC, a vertical direction mode or a horizontal direction mode. In an example, when the planar is set as the default mode, the default mode flag may indicate whether the intra-prediction mode of the current block is the planar. When the default mode flag indicates that the intra-prediction mode of the current block is not the default mode, one of MPMs indicated by index information may be set as the intra-prediction mode of the current block.

When a default mode flag is used, it may be set that an intra-prediction mode same with a default mode is not set as an MPM. In an example, when the default mode flag indicates that whether the intra-prediction mode of the current block is a planar, the intra-prediction mode of the current block may be derived by using 5 MPMs excluding an MPM corresponding to the planar.

When a plurality of intra-prediction modes are set as default modes, index information indicating any one of default modes may be further signaled in a bitstream. The intra-prediction mode of the current block may be set as a default mode indicated by the index information.

When an index of a reference sample line of a current block is not 0, it may be set not to use a default mode. In an example, when a non-adjacent reference sample line is determined as the reference sample line of the current block, it may be set not to use a non-directional intra-prediction mode such as a DC mode or a planar mode. Accordingly, when an index of a reference sample line is not 0, a default mode flag may not be signaled and a value of the default mode flag may be inferred to a predefined value (i.e. false).

When an intra-prediction mode of a current block is determined, prediction samples for the current block may be obtained based on a determined intra-prediction mode S2403.

When the DC mode is selected, prediction samples for the current block may be generated based on an average value of the reference samples. In detail, values of all of samples within the prediction block may be generated based on an average value of the reference samples. An average value may be derived using at least one of top reference samples adjacent to the top of the current block, and left reference samples adjacent to the left of the current block.

The number or a range of the reference samples used when deriving an average value may vary based on the shape of the current block. In an example, when a current block is a non-square block where a width is greater than a height, an average value may be calculated by using top reference samples. To the contrary, when a current block is a non-square block where a width is smaller than a height, an average value may be calculated by using left reference samples. In other words, when a width and a height of the current block are different, reference samples adjacent to the greater length may be applied so as to calculate an average value. Alternatively, whether to calculate an average value by using top reference samples or by using left reference samples may be determined on the basis of a ratio between a width and a height of the current block.

When a planar mode is selected, a prediction sample may be obtained by using a horizontal directional prediction sample and a vertical directional prediction sample. In this connection, the horizontal directional prediction sample may be obtained on the basis of a left reference sample and a right reference sample which are positioned at the same horizontal line with the prediction sample, and the vertical directional prediction sample may be obtained on the basis of an top reference sample and a bottom reference sample which are positioned at the same vertical line with the prediction sample. In this connection, the right reference sample may be generated by copying a reference sample adjacent to the top-right corner of the current block, and the bottom reference sample may be generated by copying a reference sample adjacent to the lower-left corner of the current block. The horizontal directional prediction sample may be obtained on the basis of a weighted sum of the left reference sample and the right reference sample, and the vertical directional prediction sample may be obtained on the basis of a weighted sum of the top reference sample and the bottom reference sample. In this connection, a weighting factor assigned to each reference sample may be determined according to a position of the prediction sample. The prediction sample may be obtained on the basis of an average or a weighted sum of the horizontal directional prediction sample and the vertical directional prediction sample. When a weighted sum is used, a weighting factor assigned to the horizontal directional prediction sample and the vertical directional prediction sample may be determined on the basis of a position of the prediction sample.

When a directional prediction mode is selected, a parameter representing a prediction direction (or prediction angle) of the selected directional prediction mode may be determined. Table 4 below represents an intra directional parameter of intraPredAng for each intra-prediction mode.

TABLE 4

| | PredModeIntra | | | | | | |
|---|---|---|---|---|---|---|---|
| | 1 | 2 | 3 | 4 | 5 | 6 | 7 |
| IntraPredAng | — | 32 | 26 | 21 | 17 | 13 | 9 |
| | PredModeIntra | | | | | | |
| | 8 | 9 | 10 | 11 | 12 | 13 | 14 |
| IntraPredAng | 5 | 2 | 0 | −2 | −5 | −9 | −13 |
| | PredModeIntra | | | | | | |
| | 15 | 16 | 17 | 18 | 19 | 20 | 21 |
| IntraPredAng | −17 | −21 | −26 | −32 | −26 | −21 | −17 |
| | PredModeIntra | | | | | | |
| | 22 | 23 | 24 | 25 | 26 | 27 | 28 |
| IntraPredAng | −13 | −9 | −5 | −2 | 0 | 2 | 5 |
| | PredModeIntra | | | | | | |
| | 29 | 30 | 31 | 32 | 33 | 34 | |
| IntraPredAng | 9 | 13 | 17 | 21 | 26 | 32 | |

Table 4 represents an intra directional parameter of each intra-prediction mode where an index thereof is one of 2 to 34 when 35 intra-prediction modes are defined. When directional intra-prediction modes are defined more than 33, an intra directional parameter of each intra-prediction mode may be set by subdividing Table 4. Top reference samples and left reference samples for the current block are arranged in a line, and then a prediction sample may be obtained on the basis of a value of an intra directional parameter. In this connection, when a value of the intra directional parameter is a negative value, left reference samples and top reference samples may be arranged in a line.

FIGS. 26 and 27 are views respectively showing examples of one-dimensional arrangement where reference samples are arranged in a line.

FIG. 26 is a view showing vertical directional one-dimensional arrangement where reference samples are arranged in a vertical direction, and FIG. 27 is a view showing horizontal directional one-dimensional arrangement where reference samples are arranged in a horizontal direction. Examples of FIGS. 26 and 27 will be described in assumption that 35 intra-prediction modes are defined.

When an intra-prediction mode index is any one of 11 to 18, horizontal directional one-dimensional arrangement may be applied where top reference samples are rotated in counterclockwise, and when an intra-prediction mode index is any one of 19 to 25, vertical directional one-dimensional arrangement may be applied where left reference samples are rotated in clockwise. When arranging reference samples in a line, an intra-prediction mode angle may be considered.

A reference sample determining parameter may be determined on the basis of an intra directional parameter. The reference sample determining parameter may include a reference sample index for specifying a sample, and a weighting factor parameter for determining a weighting factor applied to the reference sample.

A reference sample index, iIdx, and a weighting factor parameter, ifact, may be respectively obtained through Equations 10 and 11 below.

$$iIdx=(y+1)*P_{ang}/32 \quad \text{[Equation 10]}$$

$$i_{fact}=[(y+1)*P_{ang}]\&31 \quad \text{[Equation 11]}$$

In Equations 10 and 11, $P_{ang}$ represents an intra directional parameter. A reference sample specified by a reference sample index of iIdx corresponds to an integer pel.

In order to derive a prediction sample, at least one reference sample may be specified. In detail, according to a slope of a prediction mode, a position of a reference sample used for deriving a prediction sample may be specified. In an example, a reference sample used for deriving a prediction sample may be specified by using a reference sample index of iIdx.

In this connection, when a slope of an intra-prediction mode is not represented by one reference sample, a prediction sample may be generated by performing interpolation on a plurality of reference samples. In an example, when a slope of an intra-prediction mode is a value between a slope between a prediction sample and a first reference sample, and a slope between the prediction sample and a second reference sample, the prediction sample may be obtained by performing interpolation on the first reference sample and the second reference sample. In other words, when an angular line according to an intra-prediction angle does not pass a reference sample positioned at an integer pel, a prediction sample may be obtained by performing interpolation on reference samples positioned adjacent to the left and the right, or the top and the bottom of the position where the angular line passes.

Equation 12 below represents an example of obtaining a prediction sample on the basis of reference samples.

$$P(x,y)=((32-i_{fact})/32)*Ref\_1D(x+iIdx+1)+(i_{fact}/32) \\ *Ref\_1D(x+iIdx+2) \quad \text{[Equation 12]}$$

In Equation 12, P represents a prediction sample, and Ref_1D represents any one of reference samples that are arranged in a line. In this connection, a position of the reference sample may be determined by a position (x, y) of the prediction sample and a reference sample index of iIdx.

When a slope of an intra-prediction mode is possibly represented by one reference sample, a weighting factor parameter of ifact is set to 0. Accordingly, Equation 12 may be simplified as Equation 13 below.

$$P(x,y)=Ref\_1D(x+iIdx+1) \quad \text{[Equation 13]}$$

Intra-prediction for a current block may be performed on the basis of a plurality of intra-prediction modes. In an example, an intra-prediction mode may be derived for each prediction sample, and a prediction sample may be derived on the basis of an intra-prediction mode assigned to each prediction sample.

Alternatively, an intra-prediction mode may be derived for each region, intra-prediction for each region may be performed on the basis of an intra-prediction mode assigned to each region. In this connection, the region may include at least one sample. At least one of a size and a shape of the region may be adaptively determined on the basis of at least one of a size of the current block, a shape of the current block, and an intra-prediction mode for the current block. Alternatively, at least one of a size and a shape of the region may be predefined in the encoder and the decoder independent to a size or shape of the current block.

FIG. 28 is a view showing a degree formed between directional intra-prediction modes and a straight line parallel to an x axis.

As an example shown in FIG. 28, directional prediction modes may be present between the lower-left diagonal direction and the top-right diagonal direction. Describing a degree formed between the x axis and a directional prediction mode, directional prediction modes may be present from 45 degrees (bottom-left diagonal direction) to −135 degrees (top-right diagonal direction).

When a current block is a non-square, a case may be present where a prediction sample is derived by using, among reference samples positioned at the angular line according to an intra-prediction angle, a reference sample that is positioned farther than a reference sample close to a prediction sample according to an intra-prediction mode for the current block.

FIG. 29 is a view shown an aspect of obtaining a prediction sample when a current block is a non-square.

In an example, as an example shown in FIG. 29 (*a*), it is assumed that a current block is a non-square where a width is greater than a height, and an intra-prediction mode for the current block is a directional intra-prediction mode having an angle from degree to 45 degrees. In the above case, when deriving a prediction sample A around a right column of the current block, among reference samples positioned at the angular mode according to the above degree, rather than using a top reference sample T close to the prediction sample, a case may be present where a left reference sample L far away from the prediction sample is used.

In another example, as an example shown in FIG. 29 (*b*), it is assumed that a current block is a non-square where a height is greater than a width, and an intra-prediction mode for the current block is a directional intra-prediction mode from −90 degrees to −135 degrees. In the above case, when deriving a prediction sample A around a bottom row of the current block, among reference samples positioned at the angular mode according to the above degree, rather than using a left reference sample L close to the prediction sample, a case may be present where a top reference sample T far away from the prediction sample is used.

To solve the above problem, when a current block is a non-square, an intra-prediction mode for the current block may be substituted with an intra-prediction mode in opposite direction. Accordingly, for a non-square block, directional prediction modes having angles greater or smaller than those of directional prediction modes shown in FIG. 25 may be used. The above directional intra-prediction mode may be defined as a wide angle intra-prediction mode. A wide angle intra-prediction mode represents a directional intra-prediction mode that does not belong to a range of 45 degrees to −135 degrees.

FIG. 30 is a view showing wide angle intra-prediction modes.

In an example show in FIG. 30, intra-prediction modes having indices from −1 to −14 and intra-prediction modes having indices from 67 to 80 represent wide angle intra-prediction modes.

In FIG. 30, 14 wide angle intra-prediction modes (from −1 to −14) which are greater in angle than 45 degrees and 4 wide angle intra-prediction modes (from 67 to 80) which are smaller in angle than −135 degrees are shown. However, more or fewer number of wide angle intra-prediction modes may be defined.

When a wide angle intra-prediction mode is used, a length of top reference samples may be set to 2W+1, and a length of left reference samples may be set to 2H+1.

By using a wide angle intra-prediction mode, a sample A shown in FIG. 30 (*a*) may be predicted by using a reference sample T, and a sample A shown in FIG. 30 (*b*) may be predicted by a reference sample L.

In addition to legacy intra-prediction modes and N wide angle intra-prediction modes, a total of 67+N intra-prediction modes may be used. In an example, Table 5 represents an intra directional parameter for intra-prediction modes when 20 wide angle intra-prediction modes are defined.

TABLE 5

| | PredModeIntra | | | | | | | | |
|---|---|---|---|---|---|---|---|---|---|
| | −10 | −9 | −8 | −7 | −6 | −5 | −4 | −3 | −2 |
| intraPredAngle | 114 | 93 | 79 | 68 | 60 | 54 | 49 | 45 | 39 |
| | PredModeIntra | | | | | | | | |
| | −1 | 2 | 3 | 4 | 5 | 6 | 7 | 8 | 9 |
| intraPredAngle | 35 | 32 | 29 | 26 | 23 | 21 | 19 | 17 | 15 |
| | PredModeIntra | | | | | | | | |
| | 10 | 11 | 12 | 13 | 14 | 15 | 16 | 17 | 18 |
| intraPredAngle | 13 | 11 | 9 | 7 | 5 | 3 | 2 | 1 | 0 |
| | PredModeIntra | | | | | | | | |
| | 19 | 20 | 21 | 22 | 23 | 24 | 25 | 26 | 27 |
| intraPredAngle | −1 | −2 | −3 | −5 | −7 | −9 | −11 | −13 | −15 |
| | PredModeIntra | | | | | | | | |
| | 28 | 29 | 30 | 31 | 32 | 33 | 34 | 35 | 36 |
| intraPredAngle | −17 | −19 | −21 | −23 | −26 | −29 | −32 | −29 | −26 |
| | PredModeIntra | | | | | | | | |
| | 37 | 38 | 39 | 40 | 41 | 42 | 43 | 44 | 45 |
| intraPredAngle | −23 | −21 | −19 | −17 | −15 | −13 | −11 | −9 | −7 |
| | PredModeIntra | | | | | | | | |
| | 46 | 47 | 48 | 49 | 50 | 51 | 52 | 53 | 54 |
| intraPredAngle | −5 | −3 | −2 | −1 | 0 | 1 | 2 | 3 | 5 |
| | PredModeIntra | | | | | | | | |
| | 55 | 56 | 57 | 58 | 59 | 60 | 61 | 62 | 63 |
| intraPredAngle | 7 | 9 | 11 | 13 | 15 | 17 | 19 | 21 | 23 |
| | PredModeIntra | | | | | | | | |
| | 64 | 65 | 66 | 67 | 68 | 69 | 70 | 71 | 72 |
| intraPredAngle | 26 | 29 | 32 | 35 | 39 | 45 | 49 | 54 | 60 |
| | PredModeIntra | | | | | | | | |
| | 73 | | 74 | | 75 | | 76 | | |
| intraPredAngle | 68 | | 79 | | 93 | | 114 | | |

When a current block is a non-square, and an intra-prediction mode for the current block which is obtained in S2502 belongs to a transform range, the intra-prediction mode for the current block may be transformed into a wide angle intra-prediction mode. The transform range may be determined on the basis of at least one of a size, a shape, or a ratio of the current block. In this connection, the ratio may represent a ratio between a width and a height of the current block. When a current block is a non-square where a width is greater than a height, a transform range may be set from an intra-prediction mode index (for example, 66) of an top-right diagonal direction to (an intra-prediction mode index of the top-right diagonal direction−N). In this connection, N may be determined on the basis of a ratio of the current block. When an intra-prediction mode for the current block belongs to a transform range, the intra-prediction mode may be transformed into a wide angle intra-prediction mode. The transform may be subtracting a predefined value from the intra-prediction mode, and the predefined value may be the total number (for example, 67) of intra-prediction modes excluding a wide angle intra-prediction mode.

In the above example, intra-prediction mode from the number 66 to the number 53 may be respectively transformed into wide angle intra-prediction modes from the number −1 to the number −14.

When a current block is a non-square where a height is greater than a width, a transform range may be set from an intra-prediction mode index (for example, 2) of a bottom-left diagonal direction to (the intra-prediction mode index of the lower-left diagonal direction+M). In this connection, M may be determined on the basis of a ratio of the current block. When an intra-prediction mode for the current block belongs to a transform range, the intra-prediction mode may be transformed into a wide angle intra-prediction mode. The transform may be adding a predefined value to the intra-prediction mode, and the predefined value may be the total number (for example, 65) of directional intra-prediction mode excluding a wide angle intra-prediction mode.

In the above example, intra-prediction mode from the number 2 to the number 15 may be respectively transformed into wide angle intra-prediction modes from the number 67 to the number 80.

Hereinafter, intra-prediction modes belonging to a transform range are referred to as wide angle intra prediction replacement modes.

A transform range may be determined on the basis of a ratio of the current block. In an example, Tables 6 and 7 respectively show a transform range of a case where 35 intra-prediction modes excluding a wide angle intra-prediction mode are defined, and a case where 67 intra-prediction modes excluding a wide angle intra-prediction mode are defined.

TABLE 6

| Condition | Replaced Intra Prediction Modes |
|---|---|
| W/H = 2 | Modes 2, 3, 4 |
| W/H > 2 | Modes 2, 3, 4, 5, 6 |
| W/H = 1 | None |
| H/W = 1/2 | Modes 32, 33, 34 |
| H/W < 1/2 | Modes 30, 31, 32, 33, 34 |

TABLE 7

| Condition | Replaced Intra Prediction Modes |
|---|---|
| W/H = 2 | Modes 2, 3, 4, 5, 6, 7 |
| W/H > 2 | Modes 2, 3, 4, 5, 6, 7, 8, 9, 10, 11 |
| W/H = 1 | None |
| H/W = 1/2 | Modes 61, 62, 63, 64, 65, 66 |
| H/W < 1/2 | Modes 57, 58, 59, 60, 61, 62, 63, 64, 65, 66 |

As examples shown in Tables 4 and 5, the number of wide angle intra prediction replacement modes included in a transform range may vary according to a ratio of the current block. The ratio of the current block may be further subdivided to set a transform range as shown in Table 8 below.

TABLE 8

| Condition | Replaced Intra Prediction Modes |
|---|---|
| W/H = 16 | Modes 12, 13, 14, 15 |
| W/H = 8 | Modes 12, 13 |
| W/H = 4 | Modes 2, 3, 4, 5, 6, 7, 8, 9, 10, 11 |
| H/W = 2 | Modes 2, 3, 4, 5, 6, 7 |
| H/W = 1 | None |
| W/H = 1/2 | Modes 61, 62, 63, 64, 65, 66 |
| W/H = 1/4 | Modes 57, 58, 59, 60, 61, 62, 63, 64, 65, 66 |
| W/H = 1/8 | Modes 55, 56 |
| H/W = 1/16 | Modes 53, 54, 55, 56 |

When the non-adjacent reference sample line is determined as the reference sample line for the current block or when the multi-line intra prediction encoding method for selecting one of the plurality of reference sample lines is used, the prediction method may be configured not to use the wide angle intra prediction mode. That is, although the current block has a non-square shape, and the intra prediction mode for the current block belongs to the transform range, the intra prediction mode for the current block may not be transformed into the wide angle intra prediction mode. Alternatively, when the intra prediction mode for the current block is determined as the wide angle intra prediction mode, the prediction method may be configured such that the non-adjacent reference sample lines are unavailable as the reference sample line for the current block or may be configured not to use the multi-line intra prediction encoding method for selecting one of the plurality of reference sample lines. When the multi-line intra prediction encoding method is not used, the adjacent reference sample line may be determined as the reference sample line for the current block.

When the wide angle intra prediction mode is not used, each of refW and refH may be set to a sum of nTbW and nTbH. Accordingly, the non-adjacent reference sample line spaced from the current block by i may include (nTbW+nTbH+offsetX[i]) top reference samples and (nTbW+nTbH+offsetY[i]) left reference samples except for the left-top reference sample. That is, the non-adjacent reference sample line spaced from the current block by i may include (2nTbW+2nTbH+offsetX[i]+offsetY[i]+1) reference samples. For example, when a value of whRatio is greater than 1, a value of offsetX may be set to be larger than a value of offsetY. In one example, when the value of offsetX may be set to 1, and the value of offsetY may be set to 0. To the contrary, when the value of whRatio is smaller than 1, the value of offsetY may be set to be larger than the value of offsetX. In one example, the value of offsetX may be set to 0, and the value of offsetY may be set to 1.

Since wide angle intra-prediction modes are used in addition to legacy intra-prediction modes, resource for encoding wide angle intra-prediction modes may be increased, and thus encoding efficiency may be reduced. Accordingly, rather than encoding a wide angle intra-prediction mode as it is, a replaced intra-prediction mode for the wide angle intra-prediction modes are encoded so as to improve encoding efficiency.

In an example, when a current block is encoded by using a wide angle intra-prediction mode of the number 67, the number 2 that is a wide angle replacement intra-prediction mode of the number 67 may be encoded as an intra-prediction mode for the current block. In addition, when a current block is encoded by using a wide angle intra-prediction mode of the number −1, the number 66 that is a wide angle replacement intra-prediction mode of the number −1 may be encoded as an intra-prediction mode for the current block.

The decoder may decode an intra-prediction mode for the current block, and determine whether or not the decoded intra-prediction mode belongs to a transform range. When the decoded intra-prediction mode is a wide angle replacement intra-prediction mode, the intra-prediction mode may be transformed into a wide angle intra-prediction mode.

Alternatively, when a current block is encoded through a wide angle intra-prediction mode, the wide angle intra-prediction mode may be encoded as it is.

Encoding of an intra prediction mode may be performed based on an MPM list described above. Specifically, when a neighboring block is encoded in a wide angle intra prediction mode, an MPM may be set based on a wide angle replacement intra prediction mode corresponding to the wide angle intra prediction mode.

A coding block or a transform block may be partitioned into a plurality of sub-blocks (or sub-partitions). When the coding block or the transform block is partitioned into a plurality of sub-blocks, prediction, transform, and quantization may be performed for each sub-block. Dividing the coding block or the transform block into the plurality of sub-blocks may be defined as a sub-partition intra encoding method.

Information indicating whether the sub-partition intra encoding method is applied may be signaled in a bitstream. The information may be a 1-bit flag. In one example, a syntax element 'intra_subpartitions_mode_flag' indicating whether the coding block or the transform block is partitioned into the plurality of sub-blocks may be signaled in a bitstream.

Alternatively, whether to apply the sub-partition intra encoding method may be determined based on at least one of a size, a shape, or an intra-prediction mode of the coding block or the transform block. In one example, when the intra-prediction mode of the coding block is a non-directional intra-prediction mode (e.g., planner or DC mode) or a predefined directional intra-prediction mode (e.g., horizontal intra-prediction mode, vertical intra-prediction mode, or diagonal intra-prediction mode), the sub-partition intra encoding method may not be applied. Alternatively, when the size of the coding block is smaller than a threshold, the sub-partition intra encoding method may not be applied.

Alternatively, when intra-prediction for the sub-block is performed based on the intra-prediction mode of the coding block, whether to apply the sub-partition intra encoding method may be determined based on whether a reconstructed sample included in a neighboring sub-block should be used as a reference sample in intra-prediction of a corresponding sub-block. In one example, when an intra-prediction mode of a coding block is a diagonal intra-prediction mode or a wide angle intra-prediction mode, and when a reconstructed sample included in the neighboring sub-block cannot be utilized as a reference sample in performing intra-prediction for a corresponding sub-block based on the intra-prediction mode, the sub-partition intra encoding method may not be applied.

Alternatively, when a height and width ratio of the coding block is greater than or smaller than a threshold, the sub-partition intra encoding method may not be applied. Alternatively, when at least one of the height or the width of the coding block is smaller than a threshold, the sub-partition intra encoding method may not be applied. In one example, when the width or the height of the coding block is smaller than the threshold, or when both the height and the width of a coding block are smaller than the threshold, the sub-partition intra encoding method may not be applied. Alternatively, when the number of samples included in the coding block is smaller than or equal to a threshold, the sub-partition intra encoding method may not be applied. The threshold may have a predefined value in the encoder and the decoder. Alternatively, information for determining the threshold may be signaled in a bitstream.

Alternatively, whether to signal a flag indicating whether to apply the sub-partition intra encoding method or not may be determined, based on at least one of the size, shape, or the intra-prediction mode of the coding block or the transform block. In one example, only when both the height and the width of the coding block are smaller than a threshold and/or the size of the coding block is greater than a threshold, a flag indicating whether the sub-partition intra encoding method is applied may be encoded and signaled in a bitstream. When the flag indicating whether the sub-partition intra encoding method is applied is not encoded, the sub-partition intra encoding method may not be applied.

When the sub-partition intra encoding method is not applied, the signaling of the syntax element, intra_subpartitions_mode_flag, may be omitted. When the signaling of the flag is omitted, the flag may be considered to indicate that the sub-partition intra encoding method is not applied.

When the sub-partition intra encoding method is applied, a partitioning type of the coding block or the transform block may be determined. In this connection, the partitioning type indicates a direction of partitioning of the coding block or the transform block. In one example, vertical partitioning means partitioning the coding block or the transform block using at least one vertical line. Horizontal partitioning may mean partitioning the coding block or the transform block using at least one horizontal line.

FIG. 31 is a diagram showing an example of vertical partitioning and horizontal partitioning.

FIG. 31 (a) presents an example in which a coding block is partitioned into two sub-blocks and FIG. 31 (b) presents an example in which a coding block is partitioned into four sub-blocks.

Information for determining the partitioning type of the coding block or the transform block may be signaled in a bitstream. In one example, information indicating whether vertical partitioning or horizontal partitioning is applied to the coding block or the transform block may be signaled in a bitstream. The information may be a 1-bit flag, intra_subpart_type_flag. When a value of the flag value is 1, this indicates that the coding block or the transform block is partitioned in the horizontal direction, and when the value of the flag is 0, this indicates that the coding block or the transform block is partitioned in the vertical direction.

Alternatively, the partitioning type of the coding block or the transform block may be determined based on a size, a shape or an intra-prediction mode of the coding block or the transform block. In one example, based on the ratio of the width and the height of the coding block, the partitioning type of the coding block may be determined. For example, when the value of whRatio representing the height and width ratio of the coding block is greater than or equal to a first threshold, the vertical partitioning may be applied to the coding block. Otherwise, the horizontal partitioning may be applied to the coding block.

FIG. 32 is a diagram showing an example of determining a partitioning type of a coding block.

For convenience of description, it is assumed that the first threshold is 2. In the example shown in FIG. 32 (a), the whRatio of the coding block is 1, and thus is smaller than the first threshold. Accordingly, encoding of information indicating the partitioning type of the coding block may be omitted, and the horizontal partitioning may be applied to the coding block.

In the example shown in FIG. 32 (b), the whRatio of the coding block is 2, and is equal to the first threshold. Accordingly, encoding of information indicating the partitioning type of the coding block may be omitted, and the vertical partitioning may be applied to the coding block.

The partitioning type of the coding block may be determined using a second threshold having an opposite sign to that of the first threshold. In one example, when a value of whRatio is smaller than the second threshold, and the horizontal partitioning may be applied to the coding block. Otherwise, the vertical partitioning may be applied to the coding block. Absolute values of the first threshold and second threshold may be the same, and the first threshold and the second threshold may have opposite signs. In one example, when the first threshold is N (where, N is an integer such as 1, 2, 4, etc.), the second threshold may be −N.

FIG. 33 is a diagram showing an example of determining a partitioning type of a coding block.

For convenience of description, it is assumed that the second threshold is −2. In the example shown in FIG. 33 (a), the whRatio of the coding block is −1, and is greater than the second threshold. Accordingly, encoding of information indicating the partitioning type of the coding block may be omitted, and the vertical partitioning may be applied to the coding block.

In the example shown in FIG. 33 (b), the whRatio of the coding block is −2, and is the same as the second threshold. Accordingly, encoding of information indicating the partitioning type of the coding block may be omitted, and the horizontal partitioning may be applied to the coding block.

Alternatively, the partitioning type of the coding block may be determined based on the first threshold and the second threshold. In one example, when the value of whRatio is greater than the first threshold, the horizontal partitioning may be applied to the coding block. When the value of whRatio is smaller than the second threshold, the vertical partitioning may be applied to the coding block. When the value of whRatio exists between the first threshold and the second threshold, information may be parsed from the bitstream and the partitioning type of the current block may be determined based on the parsed information.

The first threshold and the second threshold may be predefined in the encoder and the decoder. Alternatively, the first threshold and the second threshold may be defined for each sequence, each picture, or each slice.

Alternatively, the partitioning type may be determined based on the size of the coding block or the transform block. In one example, when the size of the coding block is N×n, the vertical partitioning may be applied. When the size of the coding block is n×N, the horizontal partitioning may be applied. In this connection, n may be a natural number smaller than N. N and/or n may be predefined values in the encoder and the decoder. Alternatively, information for determining N and/or n may be signaled in a bitstream. In one example, N may be 32, 64, 128 or 256, and the like. Accordingly, when the size of the coding block is 128×n (where, n is a natural number such as 16, 32 or 64), the vertical partitioning may be applied. When the size of the coding block is n×128, the horizontal partitioning may be applied.

Alternatively, the partitioning type of the coding block or the transform block may be determined based on an intra-prediction mode of the coding block or the transform block. In one example, when the intra-prediction mode of the coding block has a horizontal direction or a direction similar to the horizontal direction, the vertical partitioning may be applied to the coding block. In this connection, the intra-prediction mode in a direction similar to the horizontal direction may mean an intra-prediction mode whose an index difference from an index of the horizontal intra-prediction mode (e.g., INTRA_ANGULAR18 shown in FIG. 25 (b)) is smaller than a threshold (e.g., INTRA_ANGULAR18±N). To the contrary, when the intra-prediction mode of the coding block has a vertical direction or a direction similar to the vertical direction, the horizontal partitioning may be applied to the coding block. In this connection, the intra-prediction mode in a direction similar to the vertical direction may mean an intra-prediction mode whose an index difference from an index of the vertical intra-prediction mode (e.g., INTRA_ANGULAR50 shown in FIG. 25 (b)) is smaller than a threshold (e.g., INTRA_ANGULAR50±N). In this connection, the threshold N may be a predefined value in the encoder and the decoder. Alternatively, information for determining the threshold N may be signaled at a sequence, picture, or slice level.

FIG. 34 is a diagram showing an example in which a partitioning type of a coding block is determined based on an intra-prediction mode of the coding block.

As in the example shown in FIG. 34 (a), when the intra-prediction mode of the coding block is in a direction similar to the vertical direction, the horizontal partitioning may be applied to the coding block.

To the contrary, as in the example shown in FIG. 34 (b), when the intra-prediction mode of the coding block is in a direction similar to the horizontal direction, the vertical partitioning may be applied to the coding block.

Contrary to the illustrated example, when the intra-prediction mode of the coding block is in a horizontal direction or a direction similar to the horizontal direction, the horizontal partitioning may be applied. When the intra-prediction mode of the coding block is in a vertical direction or a direction similar to the vertical direction, the vertical partitioning may be applied.

The partitioning type of the coding block or the transform block may be determined based on whether at least one of a width or a height of each of sub-blocks generated by partitioning the coding block or the transform block based on the vertical partitioning is smaller than a threshold. In this connection, the threshold may be an integer such as 2, 4, or 8.

FIG. 35 is a diagram to describe partitioning of a coding block.

When the horizontal partitioning is applied to a 4×8 sized coding block shown in FIG. 35 (a), the coding block is partitioned into two sub-blocks, each having a 2×8 size. In this case, since a width of the sub-block is smaller than a threshold, the horizontal partitioning may not be available for the coding block. To the contrary, when the vertical partitioning is applied to the coding block of a 4×8 size, the coding block is partitioned into two sub-blocks, each having a 4×4 size. Since both the width and the height of the sub-block are greater than the threshold, the vertical partitioning may be available for the coding block. Since only the vertical partitioning is available for the coding block, encoding of information indicating the partitioning type of the coding block may be omitted, and the vertical partitioning may be applied to the coding block.

When the vertical partitioning is applied to a 8×4 size coding block shown in FIG. 35 (b), the coding block is partitioned into two sub-blocks, each having a 8×2 size. In this case, since the height of the sub-block is smaller than the threshold, the vertical partitioning may not be available for the coding block. To the contrary, when the horizontal partitioning is applied to the coding block of the 8×4 size, the coding block is partitioned into two sub-blocks, each having a 4×4 size, Since both the width and the height of the sub-block are greater than the threshold, the horizontal partitioning may be applied for the coding block. Since only the horizontal partitioning is available for the coding block, encoding of information indicating the partitioning type of the coding block may be omitted, and the vertical partitioning may be applied to the coding block.

When both the vertical partitioning and the horizontal partitioning are available, information indicating the partitioning type of the coding block may be parsed and then the partitioning type of the coding block may be determined based on the parsed information.

The number of sub-blocks may be determined based on at least one of the size or the shape of the coding block or the transform block. In one example, when one of the width and the height of the coding block is 8, and the other thereof is 4, the coding block may be partitioned into two sub-blocks. To the contrary, when both of the width and the height of the coding block are 8 or greater, or when one of the width and the height of the coding block is greater than 8, the coding block may be partitioned into four sub-blocks. In summary, when the coding block is 4×4 sized, the coding block may not be partitioned into sub-blocks. When the coding block is 4×8 or 8×4 sized, the coding block may be partitioned into two sub-blocks. In other cases, the coding block may be partitioned into four sub-blocks.

Alternatively, information indicating the size or the shape of the sub-block, or the number of sub-blocks may be signaled in a bitstream. The size or the shape of the sub-blocks may be determined based on information indicating the number of sub-blocks. Alternatively, the number of sub-blocks may be determined based on information indicating the size or the shape of the sub-blocks.

When the sub-partition intra encoding method is applied, the sub-blocks generated by partitioning the coding block or the transform block may use the same intra-prediction mode. In one example, based on the intra-prediction mode of neighboring blocks adjacent to the coding block, MPMs for the coding block may be derived, and then the intra-prediction mode of the coding block may be determined based on the derived MPMs. When the intra-prediction mode of the coding block is determined, intra-prediction of each sub-block may be performed using the determined intra-prediction mode.

When the sub-partition intra encoding method is applied, one of the MPMs may be determined as an intra-prediction mode of the coding block. That is, when the sub-partition intra encoding method is applied, and even through an MPM flag is not signaled, the MPM flag may be considered to be true.

Alternatively, when the sub-partition intra encoding method is applied, one of predefined candidate intra-prediction modes may be determined as the intra-prediction mode of the coding block. In one example, one of a horizontal intra-prediction mode, a vertical intra-prediction mode, a diagonal intra-prediction mode (e.g., at least one of a left-top intra-prediction mode, a right-top intra-prediction mode, or a left-bottom intra-prediction mode), and a non-directional intra-prediction mode (e.g., at least one of a planner mode or a DC mode) may be determined as the intra-prediction mode of the coding block. Index information specifying one of the predefined candidate intra-prediction modes may be signaled in a bitstream. Alternatively, the number and/or the type of candidate intra-prediction modes may vary depending a partitioning direction of the coding block. In one example, when the horizontal partitioning is applied to the coding block, at least one of a non-directional intra-prediction mode, a vertical intra-prediction mode, a left-top diagonal intra-prediction mode, or a right-top diagonal intra-prediction mode may be set as a candidate intra-prediction mode. To the contrary, when the vertical partitioning is applied to the coding block, at least one of a non-directional intra-prediction mode, a horizontal intra-prediction mode, a left-top diagonal intra-prediction mode, or a left-bottom diagonal intra-prediction mode may be set as a candidate intra-prediction mode.

According to an embodiment of the present disclosure, an intra-prediction mode of at least one of the sub-blocks may be set to be different from those of the other sub-blocks. In one example, an intra-prediction mode of an N-th sub-block may be derived by adding or subtracting an offset to or from an intra-prediction mode of an (N−1)-th sub-block. The offset may be predefined in the encoder and the decoder. Alternatively, the offset may be derived based on at least one of a size, a shape or an intra-prediction mode of the coding block, a size or a shape of the sub-block, the number of sub-blocks, or a partitioning direction of the coding block. Alternatively, information for deriving the offset may be signaled in a bitstream.

Alternatively, when the intra-prediction mode of the (N−1)-th sub-block is a non-directional mode, the intra-prediction mode of the N-th sub-block may be set to be same as the intra-prediction mode of the (N−1)-th sub-block. When the intra-prediction mode of the (N−1)-th sub-block is a directional mode, an intra-prediction mode derived by adding or subtracting an offset to or from the intra-prediction mode of the (N−1)-th sub-block may be set to be the same as the intra-prediction mode of the N-th sub-block.

Alternatively, a directional intra-prediction mode may be applied to some of the plurality of sub-blocks, while a non-directional intra-prediction mode may be applied to the rest of them. A sub-block to which the non-directional intra-prediction mode is to be applied may be determined based on at least one of a size, a shape, or a position of a sub-block or the number of sub-blocks. Alternatively, only when a directional intra-prediction mode applied to one of the plurality of sub-blocks has a predefined value, the non-directional intra-prediction mode may be applied to another of the plurality of sub-blocks.

Alternatively, an intra-prediction mode of each sub-block may be derived from MPMs. To this end, index information specifying one of the MPMs may be signaled for each sub-block.

Alternatively, an intra-prediction mode of each sub-block may be derived from predefined candidate intra-prediction modes. To this end, index information specifying one of predefined candidate intra-prediction modes may be signaled for each sub-block. Different sub-blocks may have different numbers and/or types of candidate intra-prediction modes.

Alternatively, information indicating whether the intra-prediction modes of the sub-blocks are set to be identical with each other may be signaled in a bitstream.

Quantization parameters of the sub-blocks may be individually determined. Accordingly, quantization parameter value for each sub-block may be set differently. In order to determine a quantization parameter of each sub-block, information indicating a difference between quantization parameter of sub-block and a quantization parameter of a previous sub-block may be encoded. In one example, in order to determine a quantization parameter of an N-th sub-block, a difference between a quantization parameter of the N-th sub-block and a quantization parameter of a (N−1)-th sub-block may be encoded.

Intra-prediction of a sub-block may be performed using a reference sample. In this connection, the reference sample may be derived from a reconstructed sample of a neighboring block adjacent to the sub-block. When the neighboring block adjacent to the sub-block is included in the same coding block in which the sub-block is included, a reference sample of the sub-block may be derived based on the reconstructed sample of the neighboring sub-block. In one example, when a first sub-block is located on a left or a top of a second sub-block, a reference sample of the second sub-block may be derived from a reconstructed sample of the first sub-block. To this end, parallel intra-prediction may not be applied to between sub-blocks. That is, encoding/decoding may be sequentially performed on sub-blocks included in the coding block. Accordingly, after encoding/decoding of the first sub-block is completed, intra-prediction for the second sub-block may be performed.

When the sub-partition intra encoding method is applied, a multi-line intra-prediction encoding method that selects one among a plurality of reference sample line candidates may not be applied. When the multi-line intra-prediction encoding method is not applied, an adjacent reference sample line adjacent to each sub-block may be determined as a reference sample line of each sub-block. Alternatively, when an index of a reference sample line of a current block is greater than 0, encoding of a syntax element, intra_subpartitions_mode_flag, indicating whether the sub-partition intra encoding method is applied may be omitted. When the encoding of the syntax, intra_subpartitions_mode_flag, is omitted, the sub-partition intra encoding method may not be applied.

Alternatively, even when the sub-partition intra encoding method is applied, the multi-line intra-prediction encoding method may be used. To this end, index information for specifying a reference sample line for each sub-block may be signaled in a bitstream. Alternatively, index information for specifying a reference sample line may be signaled in a bitstream for only one of the plurality of sub-blocks, and this index information may be applied to the remaining sub-blocks. Alternatively, index information for specifying a reference sample line for a coding block may be signaled, and a plurality of sub-blocks included in the coding block may share the index information.

Alternatively, only a sub-block having a predefined position or a predefined partition index among sub-blocks may be configured to use the multi-line intra-prediction encoding method. In one example, index information specifying one of reference sample line candidates may be signaled only for a sub-block having a partition index of 0 or a sub-block adjoining a top boundary or a left boundary of the coding block, among the plurality of sub-blocks. In this connection, the multi-line intra-prediction encoding method may not be applied to the remaining sub-blocks. Accordingly, intra-prediction of the remaining sub-blocks may be performed using an adjacent reference sample line.

A prediction encoding mode for each sub-block may be different. In one example, intra prediction may be applied to some of sub-blocks, while inter prediction, a current picture reference, or combined prediction may be applied to remaining sub-blocks.

FIG. 36 is a diagram showing an example in which a prediction encoding mode for each sub-blocks is set differently.

An intra-prediction mode or a prediction encoding mode for each sub-block may be set differently. In one example, in the example shown in FIG. 36, intra prediction may be applied to a sub-block 0 and a sub-block 1, while a current picture reference may be applied to a sub-block 1 and a sub-block 2.

When the current picture referencing is used, a prediction block of a sub-block may be derived from a pre-decoded region of a current picture or slice (or tile group). When the current picture referencing is applied, a motion vector may be derived in order to specify the prediction block of the sub-block. The motion vector under the current picture referencing may be referred to as a 'block vector'.

The motion vector may be derived based on a motion vector of a neighboring block to the coding block or the sub-block. Alternatively, information for determining the motion vector may be signaled in a bitstream.

In this connection, a maximum value of the motion vector of the sub-block may be determined based on a size of the sub-block or a size of the coding block or the transform block to which the sub-block belongs. In one example, the motion vector of the sub-block may be set not to be beyond a boundary of the coding block or the transform block to which the sub-block belongs. That is, the prediction block of the sub-block may be derived from a pre-encoded/pre-decoded region in the coding block to which the sub-block belongs.

Index information indicating one of pre-decoded sub-blocks in the coding block instead of the motion vector may be encoded and signaled in a bitstream. The prediction block of the sub-block may be determined as a pre-decoded sub-block specified by the index information.

In another example, it may be allowed that the motion vector of the sub-block to be beyond the boundary of the coding block or the transform block to which the sub-block belongs.

When the prediction block is generated as a result of performing the intra-prediction, each of prediction samples may be updated based on a position of each of the prediction samples included in the prediction block. This update method may be referred to as a sample position-based intra weighted prediction method (or Position Dependent Prediction Combination: PDPC).

Whether to apply the PDPC may be determined in consideration of a size, a shape or an intra-prediction mode of a current block, a reference sample line of the current block, or a color component. In one example, PDPC may be applied when the intra-prediction mode of the current block is at least one of a planar mode, a DC mode, a vertical direction mode, a horizontal direction mode, a mode having an index value smaller than that of the vertical direction mode or a mode having an index value larger than that of the horizontal direction mode. Alternatively, PDPC may be applied only when at least one of a width and a height of the current block is greater than 4. Alternatively, only when an index of the reference picture line of the current block is 0, the PDPC may be applied. Alternatively, PDPC may be applied only when the index of the reference picture line of the current block is more than a predefined value. Alternatively, PDPC may be applied only for a luma component. Alternatively, depending on whether two or more of the above enumerated conditions are satisfied, whether to apply the PDPC may be determined.

Alternatively, whether to apply the PDPC may be determined based on whether the sub-partition intra encoding method is applied. In one example, when the sub-partition intra encoding method is applied to the coding block or the transform block, the PDPC may not be applied. Alternatively, when the sub-partition intra encoding method is applied to the coding block or the transform block, the PDPC may be applied to at least one of a plurality of sub-blocks. In this connection, the sub-block to which the PDPC is to be applied may be determined based on at least one of a size, a shape, a position, an intra-prediction mode or a reference sample line index of the coding block or the sub-block. In one example, the PDPC may be applied to a sub-block adjacent to a top boundary and/or a left boundary of the coding block or to a sub-block adjacent to a bottom boundary and/or a right boundary of the coding block. Alternatively, based on the size or the shape of the sub-block, the PDPC may be applied to all of sub-blocks included in the coding block, or the PDPC may not be applied to all of sub-blocks included in the coding block. In one example, when at least one of a width or a height of the sub-block is smaller than a threshold, the application of the PDPC may be omitted. In another example, the PDPC may be applied to all sub-blocks in the coding block.

Alternatively, depending on whether at least one of a size, a shape, an intra-prediction mode or a reference picture index of each of sub-blocks generated by partitioning the coding block or the transform block satisfies a preset condition, whether to apply the PDPC to each sub-block may be determined. In one example, when at least one of a width or a height of a sub-block is greater than 4, the PDPC may be applied to the sub-block.

In another example, information indicating whether the PDPC is applied may be signaled in a bitstream.

Alternatively, a region to which PDPC is applied may be determined based on at least one of a size, a shape or an intra-prediction mode of a current block, or a position of a prediction sample. In one example, when the intra-prediction mode of the current block has an index larger than that of a vertical direction mode, a prediction sample of which at least one of an x-axis coordinate or a y-axis coordinate is greater than a threshold may not be corrected, and correction may be performed only on a prediction sample of which an x-axis coordinate or a y-axis coordinate is smaller than or equal to the threshold. Alternatively, when the intra-prediction mode of the current block has an index smaller than that of a horizontal direction mode, a prediction sample of which at least one of an x-axis coordinate or a y-axis coordinate thereof is larger than the threshold may not be corrected, and correction may be performed only on a prediction sample of which an x-axis coordinates or a y-axis coordinate is smaller than or equal to the threshold. In this connection, the threshold may be determined based on at least one of a size, a shape or an intra-prediction mode of the current block.

When a prediction sample is obtained via intra-prediction, a reference sample used to correct the obtained prediction sample may be determined based on a position of the obtained prediction sample. For convenience of description, in an embodiment as described later, a reference sample used to correct a prediction sample may be referred to as a PDPC reference sample. In addition, the prediction sample obtained via the intra-prediction may be referred to as a first prediction sample, and a prediction sample obtained by correcting the first prediction sample may be referred to as a second prediction sample.

FIG. 37 is a diagram showing an applicative aspect of PDPC.

The first prediction sample may be corrected using at least one PDPC reference sample. The PDPC reference sample may include at least one of a left top reference sample adjacent to a left top corner of a current block, a top reference sample on top of the current block, or a left reference sample on a left of the current block.

At least one of the reference samples included in a reference sample line of the current block may be set as the PDPC reference sample. Alternatively, regardless of the reference sample line of the current block, at least one of reference samples belonging to a reference sample line having an index 0 may be set as the PDPC reference sample. In one example, even when the first prediction sample is obtained using a reference sample included in a reference sample line having an index 1 or an index 2, the second prediction sample may be obtained using a reference sample included in a reference sample line having an index 0.

The number or a position of PDPC reference samples used to correct the first prediction sample may be determined based on at least one of the intra-prediction mode of the current block, the size of the current block, the shape of the current block, or a position of the first prediction sample.

In one example, when the intra-prediction mode of the current block is a planner mode or a DC mode, the second prediction sample may be obtained using the top reference sample and the left reference sample. In this connection, the top reference sample may be a reference sample vertically arranged with the first prediction sample (e.g., the reference sample having the same x coordinate as that of the first prediction sample) and the left reference sample may be a reference sample horizontally arranged with the first prediction sample (e.g., the reference sample having the same y coordinate as that of the first prediction sample).

When the intra-prediction mode of the current block is the horizontal intra-prediction mode, the second prediction sample may be obtained using the top reference sample. In this connection, the top reference sample may be a reference sample vertically arranged with the first prediction sample.

When the intra-prediction mode of the current block is a vertical intra-prediction mode, a second prediction sample may be obtained using the left reference sample. In this connection, the left reference sample may be a reference sample horizontally arranged with the first prediction sample.

When the intra-prediction mode of the current block is a left bottom diagonal direction intra-prediction mode or a right top diagonal direction intra-prediction mode, the second prediction sample may be obtained based on the left top reference sample, the top reference sample, and the left reference sample. The left top reference sample may be a reference sample (e.g., a reference sample of a (−1, −1) position) adjacent to the left top corner of the current block. The top reference sample may be a reference sample located diagonally to a right top of the first prediction sample, and the left reference sample may be a reference sample located diagonally to a left bottom of the first prediction sample.

In summary, when the position of the first prediction sample is (x, y), R(−1, −1) may be set as the left top reference sample, and R(x+y+1, −1) or R(x, −1) may be set as the top reference sample. Further, R(−1, x+y+1) or R(−1, y) may be set as the left reference sample.

In another example, the position of the left reference sample or the top reference sample may be determined based on at least one of the shape of the current block or whether the wide angle intra mode is applied.

Specifically, when the intra-prediction mode of the current block is the wide angle intra-prediction mode, a reference sample spaced apart by an offset from a reference sample located in a diagonal direction of the first prediction sample may be set as the PDPC reference sample. In one example, the top reference sample R(x+y+k+1, −1) and the left reference sample R(−1, x+y−k+1) may be set as the PDPC reference samples.

In this connection, the offset k may be determined based on the wide angle intra-prediction mode. Following Equation 14 and Equation 15 represent examples of deriving the offset based on the wide angle intra-prediction mode.

$$k = \text{CurrIntraMode} - 66 \text{ if (CurrIntraMode} > 66) \qquad \text{[Equation 14]}$$

$$k = -\text{CurrIntraMode if (CurrIntraMode} < 0) \qquad \text{[Equation 15]}$$

The second prediction sample may be determined based on a weighted sum between the first prediction sample and the PDPC reference samples. In one example, the second prediction sample may be obtained based on a following Equation 16.

$$\text{pred}(x,y) = (wL*R_L + wT*R_T - wTL*R_{TL} + (64 - wL - wT + wTL)*\text{pred}(x,y) + 32) >> 6 \qquad \text{[Equation 16]}$$

In the Equation 16, $R_L$ represents the left reference sample, $R_T$ represents the top reference sample, and $R_{TL}$ represents the left top reference sample. pred(x,y) represents the prediction sample of the (x,y) position. wL represents a weight assigned to the left reference sample, wT represents a weight assigned to the top reference sample, and wTL represents a weight assigned to the left top reference sample. A weight assigned to the first prediction sample may be derived by subtracting the weights assigned to the reference samples from a maximum value. For convenience of description, a weight allocated to the PDPC reference sample may be referred to as a PDPC weight.

Each weight allocated to each reference sample may be determined based on at least one of an intra-prediction mode of the current block or a position of the first prediction sample.

In one example, at least one of wL, wT, or wTL may have a proportional or inverse-proportional relationship with at least one of an x-axis coordinate value or a y-axis coordinate value of the prediction sample. Alternatively, at least one of wL, wT, or wTL may have a proportional or inverse-proportional with at least one of a width or a height of the current block.

When the intra-prediction mode of the current block is a DC mode, the PDPC weights may be determined as a following Equation 17.

$$wT = 32 >> ((y<<1)>>\text{shift})$$

$$wL = 32 >> ((x<<1)>>\text{shift})$$

$$wTL = (wL>>4) + (wT>>4) \qquad \text{[Equation 17]}$$

In the above Equation 17, x and y represent a position of the first prediction sample.

A variable, shift, used in a bit shift operation in the Equation 17 may be derived based on a width or a height of the current block. In one example, the variable, shift, may be derived based on a following Equation 18 or Equation 19.

$$\text{shift} = (\log_2(\text{width}) - 2 + \log_2(\text{height}) - 2 + 2) >> 2 \qquad \text{[Equation 18]}$$

$$\text{shift} = ((\text{Log}_2(nTbW) + \log_2(nTbH) - 2) >> 2 \qquad \text{[Equation 19]}$$

Alternatively, a variable, shift, may be derived based on an intra direction parameter of the current block.

The number or a type of parameters used to derive the variable, shift, may vary based on the intra-prediction mode of the current block. In one example, when the intra-prediction mode of the current block is a planar mode, a DC mode, a vertical direction mode or a horizontal direction mode, the variable, shift, may be derived using the width and the height of the current block, as in the example shown in the above Equation 18 or Equation 19. When the intra-prediction mode of the current block is an intra-prediction mode having an index greater than that of the vertical intra-prediction mode, the variable, shift, may be derived using the height and the intra direction parameter of the current block. When the intra-prediction mode of the current block is an intra-prediction mode having an index smaller than that of the horizontal intra-prediction mode, the variable, shift, may be derived using the width and the intra direction parameter of the current block.

When the intra-prediction mode of the current block is a planner mode, the wTL value may be set to 0. wL and wT may be derived based on a following Equation 20.

$$wT[y] = 32 >> ((y<<1)>>\text{shift})$$

$$wL[x] = 32 >> ((x<<1)>>\text{shift}) \qquad \text{[Equation 20]}$$

When the intra-prediction mode of the current block is the horizontal intra-prediction mode, wT may be set to 0, and wTL and wL may be set to be equal to each other. To the contrary, when the intra-prediction mode of the current block is the vertical intra-prediction mode, wL may be set to 0, and wTL and wT may be set to be equal to each other.

When the intra-prediction mode of the current block is an intra-prediction mode in a right top direction having an index value greater than that of the vertical intra-prediction mode, the PDPC weights may be derived based on a following Equation 21.

$$wT = 16 >> ((y<<1)>>\text{shift})$$

$$wL = 16 >> ((x<<1)>>\text{shift})$$

$$wTL = 0 \qquad \text{[Equation 21]}$$

To the contrary, when the intra-prediction mode of the current block is an intra prediction mode in a left bottom direction having an index value smaller than the horizontal intra-prediction mode, the PDPC weights may be derived based on a following Equation 22.

$$wT = 16 >> ((y<<1)>>\text{shift})$$

$$wL = 16 >> ((x<<1)>>\text{shift})$$

$$wTL = 0 \qquad \text{[Equation 22]}$$

As in the above-described embodiment, the PDPC weights may be determined based on the position x and y of the prediction sample.

In another example, a weight allocated to each of the PDPC reference samples may be determined on a sub-block basis. Prediction samples included in the sub-block may share the same PDPC weights.

A size of the sub-block as a basic unit at which a weight is determined may be predefined in the encoder and the decoder. In one example, a weight may be determined for each sub-block of a 2×2 size or a 4×4 size.

Alternatively, a size or a shape of a sub-block, or the number of sub-blocks may be determined, based on the size or the shape of the current block. In one example, regardless of the size of the coding block, the coding block may be partitioned into 4 sub-blocks. Alternatively, depending on the size of the coding block, the coding block may be partitioned into 4 or 16 sub-blocks.

Alternatively, the size or the shape of the sub-block, or the number of the sub-blocks may be determined based on the intra-prediction mode of the current block. In one example, when the intra-prediction mode of the current block has the horizontal direction, N columns (or N rows) may be set as one sub-block. When the intra-prediction mode of the current block has the vertical direction, N rows (or N columns) may be set as one sub-block.

Following Equations 23 to 19 represent examples of determining the PDPC weight for a 2×2 sized sub-block. Equation 23 exemplifies a case where the intra-prediction mode of the current block is a DC mode.

$$wT=32>>(((y<<\log_2 K)>>\log_2 K)<<1)>>\text{shift})$$

$$wL=32>>(((x<<\log_2 K))>>\log_2 K))<<1)>>\text{shift})$$

$$wTL=(wL>>4)+(wT>>4) \qquad \text{[Equation 23]}$$

In the Equation 23, K may be determined based on the size of the sub-block.

Equation 24 exemplifies a case where the intra-prediction mode of the current block is an intra-prediction mode having the right top direction having an index value greater than that of the vertical intra-prediction mode.

$$wT=16>>(((y<<\log_2 K))>>\log_2 K))<<1)>>\text{shift})$$

$$wL=16>>(((x<<\log_2 K))>>\log_2 K))<<1)>>\text{shift})$$

$$wTL=0 \qquad \text{[Equation 24]}$$

Equation 25 exemplifies a case in which the intra-prediction mode of the current block is an intra-prediction mode having the left bottom direction having an index value smaller than that of the horizontal intra-prediction mode.

$$wT=16>>(((y<<\log_2 K))>>\log_2 K))<<1)>>\text{shift})$$

$$wL=16>>(((x<<\log_2 K))>>\log_2 K))<<1)>>\text{shift})$$

$$wTL=0 \qquad \text{[Equation 25]}$$

In each of the Equations 23 to 25, x and y represent the position of the reference sample in the sub-block. The reference sample may be one of a sample located at the left top of the sub-block, a sample located at the center of the sub-block, or a sample located at the right bottom of the sub-block.

Following Equations 26 to 28 represent examples of determining the PDPC weight for a 4×4 sized sub-block. Equation 26 exemplifies a case where the intra-prediction mode of the current block is a DC mode.

$$wT=32>>(((y<<2)>>2)<<1)>>\text{shift})$$

$$wL=32>>(((x<<2)>>2)<<1)>>\text{shift})$$

$$wTL=(wL>>4)+(wT>>4) \qquad \text{[Equation 26]}$$

Equation 27 exemplifies a case where the intra-prediction mode of the current block is an intra-prediction mode having the right top direction having an index value greater than that of the vertical intra-prediction mode.

$$wT=16>>(((y<<2)>>2)<<1)>>\text{shift})$$

$$wL=16>>(((x<<2)>>2)<<1)>>\text{shift})$$

$$wTL=0 \qquad \text{[Equation 27]}$$

Equation 28 exemplifies a case in which the intra-prediction mode of the current block is an intra-prediction mode having the left bottom direction having an index value smaller than that of the horizontal intra-prediction mode.

$$wT=16>>(((y<<2)>>2)<<1)>>\text{shift})$$

$$wL=16>>(((x<<2)>>2)<<1)>>\text{shift})$$

$$wTL=0 \qquad \text{[Equation 28]}$$

In the above-described embodiments, it has been described that the PDPC weights are determined in consideration of a position of a first prediction sample or prediction samples included in the sub-block. In another example, the PDPC weights may be determined based on the shape of the current block.

In one example, in a DC mode, the PDPC weight derivation method may vary depending on whether the current block is a non-square with a width greater than a height or a non-square with a height greater than a width.

A following Equation 29 represents an example of deriving the PDPC weight when the current block is a non-square whose a width is greater than a height thereof. A following Equation 30 represents an example of deriving the PDPC weight when the current block is a non-square whose a height is greater than a width thereof.

$$wT=32>>((y<<1)>>\text{shift})$$

$$wL=32>>(x>>\text{shift})$$

$$wTL=(wL>>4)+(wT>>4) \qquad \text{[Equation 29]}$$

$$wT>>((y>>\text{shift})$$

$$wL=32>>((x<<1)>>\text{shift})$$

$$wTL=(xL>>4)+(wT>>4) \qquad \text{[Equation 30]}$$

When the current block is non-square, the current block may be predicted using the wide-angle intra-prediction mode. In this way, even when the wide-angle intra-prediction mode is applied, the first prediction sample may be updated by applying the PDPC.

When wide angle intra-prediction is applied to the current block, the PDPC weight may be determined based on the shape of the coding block.

In one example, when the current block is a non-square whose a width is greater than a height thereof, a case in which the top reference sample located on the right top of the first prediction sample is closer to the first prediction sample than the left reference sample located on the left bottom of the first prediction sample is may occur, depending on the position of the first prediction sample. Accordingly, in correcting the first prediction sample, the weight applied to the top reference sample may be set to have a larger value than the weight applied to the left reference sample.

To the contrary, when the current block is a non-square whose a height is greater than a width thereof, a case in which the left reference sample located on the left bottom of the first prediction sample is closer to the first prediction sample than the top reference sample located on the right top of the first prediction sample is may occur, depending on the position of the first prediction sample. Accordingly, in correcting the first prediction sample, the weight applied to the left reference sample may be set to have a larger value than the weight applied to the top reference sample.

A following Equation 31 represents an example of deriving the PDPC weight when the intra-prediction mode of the current block is a wide-angle intra-prediction mode with an index greater than 66.

$$wT=16>>(y>>\text{shift})$$

$$wL=16>>((x<<1)>>\text{shift})$$

$$wTL=0 \qquad \text{[Equation 31]}$$

Equation 32 represents an example of deriving the PDPC weight when the intra-prediction mode of the current block is a wide-angle intra-prediction mode with an index smaller than 0.

$$wT=16>>((y<<1)>>\text{shift})$$

$$wL=16>>(x>>\text{shift})$$

$$wTL=0 \qquad \text{[Equation 32]}$$

Based on a ratio of the current block, the PDPC weight may be determined. The ratio of the current block represents a ratio of a width and a height of the current block, and may be defined as a following Equation 33.

$$wh\text{ratio}=CU\text{width}/CU\text{Height} \qquad \text{[Equation 33]}$$

Based on the intra-prediction mode of the current block, the method for deriving the PDPC weight may vary.

In one example, following Equation 34 and Equation 35 represent examples of deriving the PDPC weight when the intra-prediction mode of the current block is a DC mode. Specifically, Equation 34 show an example of deriving the PDPC weight when the current block is a non-square whose a width is greater than a height thereof. Equation 35 show an example of deriving the PDPC weight when the current block is a non-square whose a width is smaller than a height thereof.

$$wT=32>>((y<<1)>>\text{shift})$$

$$wL=32>>(((x<<1)>>wh\text{Ratio})>>\text{shift})$$

$$wTL=(wL>>4)+(wT>>4) \qquad \text{[Equation 34]}$$

$$wT=32>>(((y<<1)>>1/wh\text{Ratio})>>\text{shift})$$

$$wL=32>>((x<<1)>>\text{shift})$$

$$wTL=(wL>>4)+(wT>>4) \qquad \text{[Equation 35]}$$

Equation 36 represents an example of deriving the PDPC weight when the intra-prediction mode of the current block is a wide-angle intra-prediction mode with an index greater than 66.

$$wT=16>>(((y<<1)>>1/wh\text{Ratio})>>\text{shift})$$

$$wL=16>>((x<<1)>>\text{shift})$$

$$wTL=0) \qquad \text{[Equation 36]}$$

Equation 37 represents an example of deriving the PDPC weight when the intra-prediction mode of the current block is a wide-angle intra-prediction mode with an index smaller than 0.

$$wT=16>>((y<<1)>>\text{shift})$$

$$wL=16>>(((x<<1)>>wh\text{Ratio})>>\text{shift})$$

$$wTL=0) \qquad \text{[Equation 37]}$$

A residual image may be derived by subtracting a prediction image from an original image. In this connection, when the residual image is converted into a frequency domain, even though high frequency components are removed from frequency components, subjective image quality of the image does not drop significantly. Accordingly, when values of high frequency components are transformed into small values, or when values of high frequency components are set to 0, compression efficiency may be increased without causing large visual distortion. Reflecting the above feature, transform may be performed on a current block so as to decompose a residual image to two-dimensional frequency components. The transform may be performed by using transform methods such as DCT (discrete cosine transform), DST (discrete sine transform), etc.

DCT is configured to decompose (or transform) a residual image into two-dimensional frequency components using a cosine transform, and DST is configured to decompose (or transform) a residual image into 2D frequency components using a sine transform. As a result of transforming the residual image, frequency components may be expressed as a base image. In one example, when performing DCT transform on a block of an N×N size, $N^2$ basic pattern components may be obtained. A size of each of the basic pattern components included in an N×N sized block may be obtained via the transform. Depending on a transform scheme as used, the size of the basic pattern component may be referred to as a DCT coefficient or a DST coefficient.

The transform scheme of DCT is mainly used to transform an image in which non-zero low-frequency components are distributed in a larger amount. The transform scheme of DST is mainly used to transform an image in which high frequency components are distributed in a larger amount.

It is also possible that the residual image may be transformed using a transform scheme other than DCT or DST.

Hereinafter, transforming the residual image into the 2D frequency components may be referred to as a 2D image transform. In addition, a size of each of basic pattern components obtained as a result of the transform may be referred to as a transform coefficient. In one example, the transform coefficient may mean a DCT coefficient or a DST coefficient. When both a first transform and a second transform to be described later are applied, the transform coefficient may mean a size of the basic pattern component generated as a result of the second transform.

A transform method may be determined on a basis of a block. A transform method may be determined on the basis of at least one of a prediction encoding mode for a current block, a size of the current block, or a shape of the current block. In an example, when a current block is encoded through an intra-prediction mode, and a size of the current block is smaller than N×N, transform may be performed by using a transform method of DST. On the other hand, when the above condition is not satisfied, transform may be performed by using a transform method of DCT.

For a partial block of a residual image, two-dimensional image transform may not be performed. Not performing two-dimensional image transform may be referred to as transform skip. When transform skip is applied, quantization may be applied to residual values for which transform is not performed.

After performing transform on a current block by using DCT or DST, transform may be performed again on the transformed current block. In this connection, transform based on DCT or DST may be defined as first transform, and performing transform again on a block to which first transform is applied may be defined as second transform.

First transform may be performed by using any one of a plurality of transform core candidates. In an example, first transform may be performed by using any one of DCT2, DCT8, or DST7.

Different transform cores may be used for a horizontal direction and a vertical direction. Information representing a combination of a transform core of a horizontal direction and a transform core of a vertical direction may be signaled in a bitstream.

The first transform and the second transform may be performed on different block sizes basis, respectively. In one example, the first transform may be performed on an 8×8 sized block basis, and the second transform may be performed on a 4×4 sized sub-block basis of a transformed 8×8 block. Alternatively, the second transform may be performed on transform coefficients belonging to three sub-blocks, each of which has a 4×4 size. The three sub-blocks may include a sub-block located at the left-top of the current block, a sub-block adjacent to the right of the sub-block, and a sub-block adjacent to the bottom of the sub-block. Alternatively, the second transform may be performed on a 8×8 sized block basis.

Transform coefficients of residual regions on which the second transform is not performed may be set to 0.

Alternatively, the first transform may be performed on a 4×4 block, and the second transform may be performed on an 8×8 sized region including the transformed 4×4 block.

Information indicating whether the second transform is performed may be signaled in a bitstream. In one example, a flag indicating whether to perform the second transform, or index information specifying whether to perform the second transform and a transform kernel used for the second transform may be signaled in a bitstream. In one example, when the index information is 0, this indicates that the second transform is not performed on the current block. To the contrary, when the index information is greater than 0, the transform kernel used for performing the second transform may be determined based on the index information.

Alternatively, whether to perform the second transform may be determined based on whether the horizontal transform core and the vertical transform core are the same. In one example, the second transform may be performed only when the horizontal transform core and the vertical transform core are the same. Alternatively, only when the horizontal transform core and the vertical transform core are different from each other, the second transform may be performed.

Alternatively, only when the horizontal transform and vertical transform is performed by using a predefined transform core, the second transform may be allowed. In one example, when the DCT2 transform core is used for the horizontal transform and the vertical transform, the second transform may be allowed. Alternatively, when the sub-partition intra encoding method is applied to the current block, the second transform may be allowed only when the DCT2 transform core is used for the horizontal transform and the vertical transform.

Alternatively, whether to perform the second transform may be determined based on the number of non-zero transform coefficients of the current block. In one example, when the number of the non-zero transform coefficients of the current block is smaller than or equal to a threshold, the second transform may not be applied. When the number of the non-zero transform coefficients of the current block is greater than the threshold, the second transform may be applied. Only when the current block is encoded using intra-prediction, the second transform may be applied.

Alternatively, whether to perform the second transform may be determined based on a position of a last non-zero transform coefficient of the current block. In one example, when at least one of an x-axis coordinate or a y-axis coordinate of the last non-zero transform coefficient of the current block is greater than a threshold, or when at least one of an x-axis coordinate or a y-axis coordinate of a sub-block to which the last non-zero transform coefficient of the current block belongs is greater than a threshold, the second transform may not be performed. In this connection, the threshold may be predefined in the encoder and the decoder. Alternatively, the threshold may be determined based on the size or the shape of the current block.

Alternatively, when only a transform coefficient of a DC component exists in the current block, the second transform may not be applied. In this connection, the DC component represents a transform coefficient of a left-top position in the current block.

Based on the shape of the current block, a size or a shape of the sub-block on which the second transform is to be performed may be determined.

FIGS. 38 and 39 are diagrams showing a sub-block on which the second transform is be performed.

When the current block is square, the first transform may be performed, and then the second transform may be performed on a sub-block of an N×N size of a left top of the current block. In one example, when the current block is an 8×8 sized coding block, the first transform may be performed on the current block, and then the second transform may be performed on a left top 4×4 sized sub-block of the current block (see FIG. 38).

When the current block is a non-square whose a width is larger by 4 times or greater than a height thereof, the first transform may be performed, and then the second transform may be performed on a sub-block of a (kN)×(4 kN) size of a left top of the current block. In one example, when the current block is a 16×4 sized non-square, the first transform may be performed on the current block, and then the second transform may be performed on a 2×8 sized sub-block of left top of the current block (see FIG. 39 (*a*)).

When the current block is a non-square whose a height is larger by 4 times or greater than a width thereof, the first transform may be performed, and then, the second transform may be performed on a sub-block of a (4 kN)×(kN) size of a left top of the current block. In one example, when the current block is a 16×4 sized non-square, the first transform may be performed on the current block, and then the second transform may be performed on a 2×8 sized sub-block of left top of the current block (see FIG. 39 (*b*)).

In the decoder, inverse transform of the second transform (second inverse transform) may be performed, and inverse transform of the first transform (first inverse transform) may be performed on a result of the second inverse transform. As a result of performing the second inverse transform and the first inverse transform, residual signals for the current block may be obtained.

Information indicating a transform type of the current block may be signaled in a bitstream. The information may be index information, tu_mts_idx, indicating one of combinations of a horizontal transform type and a vertical transform type.

Based on transform type candidates specified by the index information, tu_mts_idx, a vertical transform core and a horizontal transform core may be determined. Tables 9 and 10 show transform type combinations based on tu_mts_idx.

TABLE 9

| tu_mts_idx | Transform type | |
|---|---|---|
| | Horizontal | Vertical |
| 0 | SKIP | SKIP |
| 1 | DCT-II | DCT-II |
| 2 | DST-VII | DST-VII |
| 3 | DCT-VIII | DST-VII |
| 4 | DST-VII | DCT-VIII |
| 5 | DCT-VIII | DCT-VIII |

TABLE 10

| tu_mts_idx | Transform type | |
|---|---|---|
| | Horizontal | Vertical |
| 0 | DCT-II | DCT-II |
| 1 | SKIP | SKIP |
| 2 | DST-VII | DST-VII |
| 3 | DCT-VIII | DST-VII |
| 4 | DST-VII | DCT-VIII |
| 5 | DCT-VIII | DCT-VIII |

The transform type may be determined as one of DCT2, DST7, DCT8, or transform skip. Alternatively, a transform type combination candidate may be composed using only transform cores except for the transform skip. When Table 9 is used, and when tu_mts_idx is 0, the transform skip may be applied to horizontal and vertical directions. When tu_mts_idx is 1, DCT2 may be applied to the horizontal and vertical directions. When tu_mts_idx is 3, DCT8 may be applied to the horizontal direction, and DCT7 may be applied to the vertical direction.

When Table 10 is used, and when tu_mts_idx is 0, DCT2 may be applied to the horizontal and vertical directions. When tu_mts_idx is 1, the transform skip may be applied to the horizontal and vertical directions. When tu_mts_idx is 3, DCT8 may be applied to the horizontal direction, and DCT7 may be applied to the vertical direction.

Whether to encode index information may be determined based on at least one of a size, a shape or the number of non-zero coefficients of the current block, whether the second transform has performed, or whether the sub-partition intra encoding method has applied. In one example, when the sub-partition intra encoding method is applied to the current block, or when the number of non-zero coefficients of the current block is equal to or smaller than a threshold, the signaling of the index information may be omitted. When the signaling of the index information is omitted, a default transform type may be applied to the current block. The default transform type may include at least one of DCT2 or DST7. When there are a plurality of default transform types, one of the plurality of default transform types may be selected based on at least one of the size, the shape or the intra-prediction mode of the current block, whether the second transform has been performed or whether the sub-partition intra encoding method has been applied. In one example, based on whether a width of the current block falls within a preset range, one of the plurality of transform types may be determined as a horizontal transform type. Based on whether a height of the current block falls within a preset range, one of the plurality of transform types may be determined as a vertical transform type. Alternatively, the default mode may vary depending on whether the size, the shape or the intra-prediction mode of the current block, or whether the second transform has been applied.

Alternatively, when only the transform coefficient of the DC component exists in the current block, each of the horizontal transform type and the vertical transform type may be set to the default transform type. In one example, when only the transform coefficient of the DC component exists in the current block, each of the horizontal transform type and the vertical transform type may be set to DCT2.

The threshold may be determined based on the size or the shape of the current block. In one example, when the size of the current block is smaller than or equal to 32×32, the threshold may be set to 2. When the current block is larger than 32×32 (for example, when the current block is a coding block of a 32×64 or 64×32 size), the threshold may be set to 4.

A plurality of lookup tables may be pre-stored in the encoder/decoder. Each of The plurality of lookup tables may differentiated by at least one of index values allocated to transform type combination candidates, the types of transform type combination candidates, and/or the number of transform type combination candidates.

A lookup table for the current block may be selected based on at least one of the size, the shape, the prediction encoding mode or the intra-prediction mode of the current block, whether the second transform has been applied, or whether the transform skip has been applied to a neighboring block. In one example, when the size of the current block is 4×4 or smaller, or when the current block is encoded via inter-prediction, a lookup table of Table 9 may be selected. When the size of the current block is larger than 4×4 or when the current block is encoded via intra-prediction, a lookup table of Table 10 may be selected.

Alternatively, information indicating one of the plurality of lookup tables may be signaled in a bitstream. The decoder may select a lookup table for the current block based on the information.

In another example, an index assigned to the transform type combination candidate may be adaptively determined, based on at least one of the size, shape, the prediction encoding mode or the intra-prediction mode of the current block, whether the second transform has been applied, or whether the transform skip has been applied to the neighboring block. In one example, an index allocated to the transform skip when the size of the current block is 4×4 may have a smaller value than an index allocated to the transform skip when the size of the current block is larger than 4×4. Specifically, when the size of the current block is 4×4, an index 0 may be applied to the transform skip. When the current block is greater than 4×4 and is smaller than or equal to 16×16, an index greater than 0 (e.g., index 1) may be assigned to the transform skip. When the current block is greater than 16×16, a maximum value (e.g., 5) may be assigned to the index of the transform skip.

Alternatively, when the current block is encoded via inter-prediction, an index 0 may be assigned to the transform skip. When the current block is encoded via intra-prediction, an index greater than 0 (e.g., index 1) may be assigned to the transform skip.

Alternatively, when the current block is 4×4 sized and is encoded via inter-prediction, an index 0 may be assigned to the transform skip. To the contrary, when the current block is not encoded via inter-prediction, or when a size of the current block is greater than 4×4, an index of a value greater than 0 (e.g., index 1) may be assigned to the transform skip.

Transform type combination candidates different from the transform type combination candidates listed in Tables 9 and 10 may be defined and used. In one example, the transform skip may be applied to one of the horizontal transform and the vertical transform, and a transform type combination candidate to which a transform core including DCT2, DCT8, or DST7 is applied may be applied to the other thereof. In this connection, whether to use the transform skip as a horizontal transform type candidate or a vertical transform type candidate may be determined, based on at least one of the size (e.g., width and/or height), the shape, or the prediction encoding mode or the intra-prediction mode of the current block.

Alternatively, information indicating whether a specific transform type candidate is available may be signaled in a bitstream. In one example, a flag indicating whether the transform skip may be used as a horizontal transform type candidate or a vertical transform type candidate may be signaled in a bitstream. Depending on the flag, whether a specific transform type combination candidate among a plurality of transform type combination candidates is included may be determined.

Alternatively, whether the specific transform type candidate is applied to the current block may be signaled in a bitstream. In one example, a flag, cu_mts_flag, indicating whether to apply DCT2 to the horizontal direction and the vertical direction may be signaled in a bitstream. When a value of cu_mts_flag is 1, DCT2 may be set as vertical and horizontal transform cores. When the value of cu_mts_flag is 0, DCT8 or DST7 may be set as vertical and horizontal transform cores.

Alternatively, when the value of cu_mts_flag is 0, information, tu_mts_idx, specifying one of the plurality of transform type combination candidates may be signaled in a bitstream.

When the current block is a non-square whose a width is greater than a height thereof or a non-square whose a height is greater than a width thereof, the encoding of cu_mts_flag may be omitted. Thus, the value of cu_mts_flag may be inferred as 0.

Depending on the size, the shape, or the intra-prediction mode of the current block, the number of available transform type combination candidates may be set to vary. In one example, when the current block is square, three or more transform type combination candidates may be used. When the current block is non-square, two transform type combination candidates may be used. Alternatively, when the current block is square, only a transform type combination candidate in which a horizontal transform type and a vertical transform type are different from each other among the transform type combination candidates may be used.

When there are three or more transform type combination candidates that the current block may use, index information, tu_mts_idx, indicating one of the transform type combination candidates may be signaled in a bitstream. To the contrary, when there are two transform type combination candidates that the current block may use, a flag, mts_flag, indicating one of the transform type combination candidates may be signaled in a bitstream. Table 11 below shows encoding of information for specifying the transform type combination candidates based on the shape of the current block.

TABLE 11

| | Descriptor |
|---|---|
| residual_coding( x0, y0, log2TbWidth, log2TbHeight, cIdx ) { | |
| ... | |
| if( cu_mts_flag[ x0 ][ y0 ] && ( cIdx = = 0 ) && | |

TABLE 11-continued

| | Descriptor |
|---|---|
| !transform_skip_flag[ x0 ][ y0 ][ cIdx ] && ( ( CuPredMode[ x0 ][ y0 ] = = MODE_INTRA && numSigCoeff > 2 ) \|\| ( CuPredMode[ x0 ][ y0 ] = = MODE INTER ) ) ) { | |
| if (cbHeight == cbWidth) { | |
| mts_idx[ x0 ][ y0 ] | ae (v) |
| } else { | |
| mts_flag[ x0 ][ y0 ] | u (1) |
| } | |
| } | |

Depending on the shape of the current block, indices of the transform type combination candidates may be rearranged (or reordered). In one example, indices allocated to the transform type combination candidates when the current block is square may be different from indices allocated to the transform type combination candidates when the current block are non-square. In one example, when the current block is square, the transform type combination may be selected based on a following Table 12. When the current block is non-square, the transform type combination may be selected based on Table 13 below.

TABLE 12

| | INTRA | | INTER | |
|---|---|---|---|---|
| mts_idx | Horizontal transform core | Vertical transform core | Horizontal transform core | Vertical transform core |
| 0 | DST7 | DST7 | DCT8 | DCT8 |
| 1 | DCT8 | DST7 | DST7 | DCT8 |
| 2 | DST7 | DCT8 | DCT8 | DST7 |
| 3 | DCT8 | DCT8 | DST7 | DST7 |

TABLE 13

| | INTRA | | INTER | |
|---|---|---|---|---|
| mts_idx | Horizontal transform core | Vertical transform core | Horizontal transform core | Vertical transform core |
| 0 | DCT8 | DST7 | DST7 | DCT8 |
| 1 | DST7 | DCT8 | DCT8 | DST7 |
| 2 | DST7 | DST7 | DST7 | DST7 |
| 3 | DCT8 | DCT8 | DST7 | DST7 |

Figure 40:
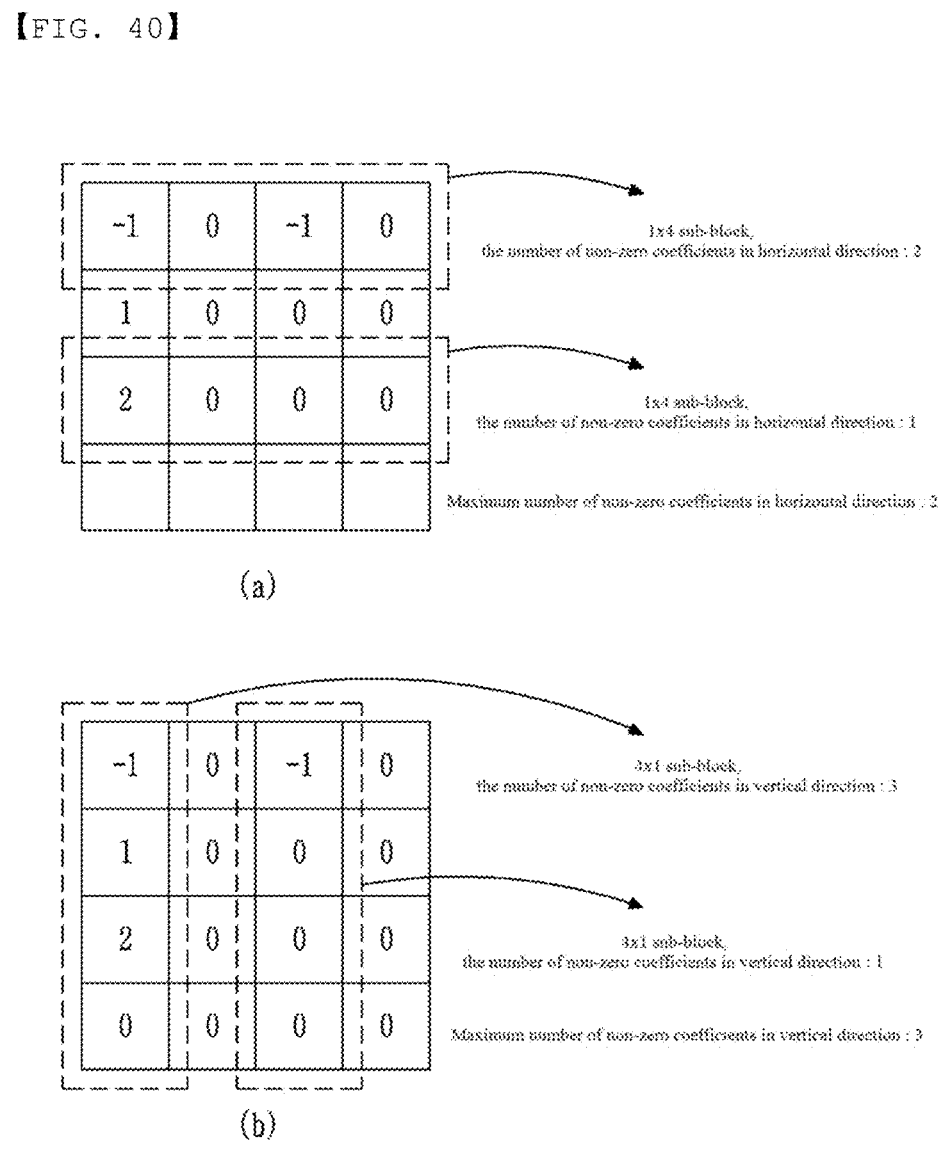

The transform type may be determined based on the number of horizontal non-zero coefficients or vertical non-zero coefficients of the current block. In this connection, the number of horizontal non-zero coefficient represents the number of non-zero coefficients included in 1×N (where N is a width of the current block). The number of vertical non-zero coefficients represents the number of non-zero coefficients included in N×1 (where N is a height of the current block). When a maximum value of the number of the horizontal non-zero coefficients is smaller than or equal to a threshold, a first transform type may be applied for the horizontal direction. When the maximum value of the horizontal non-zero coefficients is greater than the threshold, a second transform type may be applied for the horizontal direction. When a maximum value of the number of the vertical non-zero coefficients is smaller than or equal to a threshold, the first transform type may be applied for the vertical direction. When the maximum value of the number of the vertical non-zero coefficients is greater than the threshold, the second transform type may be applied for the vertical direction. FIG. 40 is a diagram for describing an example in which the transform type of the current block is determined.

In one example, when the current block is encoded via intra-prediction, and the maximum value of the number of the horizontal non-zero coefficients of the current block is 2 or smaller (see FIG. 40 (*a*)), DST7 may be determined as the horizontal transform type.

When the current block is encoded via intra-prediction and the maximum value of the number of the vertical non-zero coefficients of the current block is greater than 2 (see FIG. 40 (*b*)), DCT2 or DCT8 may be determined as the vertical transform type.

Information indicating whether index information for determining the transform type of the current block is explicitly signaled may be signaled in a bitstream. In one example, information, sps_explicit_intra_mts_flag, indicating whether explicit transform type determination is allowed for a block encoded via intra-prediction and/or information, sps_explicit_inter_mts_flag, indicating whether explicit transform type determination is allowed for a block encoded via inter-prediction may be signaled at a sequence level.

When the explicit transform type determination is allowed, a transform type of the current block may be determined based on the index information, tu_mts_idx, signaled in the bitstream. To the contrary, when the explicit transform type determination is not allowed, a transform type of the current block may be determined based on at least one of the size or the shape of the current block, whether transform on a sub-block basis is allowed, a position of a sub-block including a non-zero transform coefficient, whether the second transform has been performed, or whether the sub-partition intra encoding method has been applied. In one example, a horizontal transform type of the current block may be determined based on the width of the current block. A vertical transform type of the current block may be determined based on a height of the current block. For example, when the width of the current block is smaller than 4 or greater than 16, the horizontal transform type thereof may be determined as DCT2. Otherwise, the horizontal transform type thereof may be determined as DST7. When the height of the current block is smaller than 4 or greater than 16, the vertical transform type thereof may be determined as DCT2. Otherwise, the vertical transform type thereof may be determined as DST7. In this connection, in order to determine the horizontal transform type, and the vertical transform type, a threshold to be compared to the width and the height may be determined based on at least one of the size, the shape, or the intra-prediction mode of the current block.

Alternatively, when the current block is a square which a height and a width are the same, the horizontal transform type and the vertical transform type are set to be same as each other. When the current block is a non-square whose a height and a width are not equal to each other, the horizontal transform type and the vertical transform type may be set to be different from each other. In one example, when the width of the current block is greater than the height thereof, the horizontal transform type may be determined as DST7 and the vertical transform type may be determined as DCT2. When the height of the current block is greater than the width, the vertical transform type may be determined as DST7 and the horizontal transform type may be determined as DCT2.

The number and/or the type of transform type candidates or the number and/or the type of transform type combination candidates may vary depending on whether the explicit transform type determination is allowed. In one example, when the explicit transform type determination is allowed, DCT2, DST7 and DCT8 may be used as transform type candidates. Accordingly, each of the horizontal transform type and the vertical transform type may be set to DCT2, DST8, or DCT8. When the explicit transform type determination is not allowed, only DCT2 and DST7 may be used as transform type candidates. Accordingly, each of the horizontal transform type and the vertical transform type may be determined as DCT2 or DST7.

The coding block or the transform block may be partitioned into a plurality of sub-blocks, and the transform may be performed on each of the plurality of sub-blocks. In one example, when the above-described sub-partition intra encoding method is applied to the coding block, the coding block may be divvied into the plurality of sub-blocks, and then the transform may be performed on each of the plurality of sub-blocks.

Transform types of the sub-blocks may be the same as each other. In one example, when the transform type of a first sub-block among the plurality of sub-blocks is determined, the transform type of the first sub-block may be applied to the remaining sub-blocks as well. Alternatively, the transform type for the coding block may be determined and then the transform type of the coding block may be determined as the transform type of each sub-block.

In another example, the transform types of the plurality of sub-blocks may be individually determined. A transform type of each sub-block may be determined based on information signaled for each sub-block. In one example, the index information, tu_mts_idx, may be signaled for each sub-block. The index information, tu_mts_idx, may specify one of a plurality of combinations of horizontal and vertical transform types. Depending on the value of tu_mts_idx, the horizontal transform type and the vertical transform type may be determined as DCT2, DST7, or DCT8. Based on the index information, tu_mts_idx, whether the horizontal transform type and the vertical transform type are the same may be determined.

Information indicating whether a transform type of a current sub-block is the same as a transform type of a previous sub-block may be signaled in a bitstream. When the information indicates that a transform type of a current sub-block is the same as a transform type of a previous sub-block, the encoding of the index information, tu_mts_idx, for the current sub-block may be omitted. The transform type of the previous sub-block may be applied to the current sub-block. To the contrary, when the information indicates that a transform type of a current sub-block is different from a transform type of a previous sub-block, the index information, tu_mts_idx, for the current sub-block may be encoded. In this connection, index information of the current sub-block may indicate one of remaining transform type combinations other than a transform type combination indicated by index information of the previous sub-block.

Alternatively, the method may be configured such that when the coding block is partitioned into a plurality of sub-blocks, the explicit transform type determination is not allowed. In this connection, when the explicit transform type is allowed, a transform type may be determined based on the index information, tu_mts_idx. To the contrary, when the explicit transform type determination is not allowed, the transform type may be determined in consideration of at least one of a size or a shape of a sub-block, or a position of a sub-block including a non-zero coefficient.

FIG. 41 is a diagram showing an example of determining a transform type of a sub-block.

In FIG. 41, an example in which a height and width ratio of a sub-block is 1:2 or 2:1 is shown.

The horizontal transform type and the vertical transform type may be determined based on the width and the height of the sub-block, respectively. In one example, as in the example shown in FIGS. 41 (*a*) and (*b*), when the width of the sub-block is smaller than a threshold, a first transform type (e.g., DCT2) may be used as the horizontal transform type. To the contrary, when the width of the sub-block is greater than or equal to the threshold, a second transform type (e.g., DST7) may be used as the horizontal transform type.

Further, when the height of the sub-block is smaller than the threshold, the first transform type (e.g., DCT2) may be used as the vertical transform type. To the contrary, when the width of the sub-block is greater than or equal to the threshold, the second transform type (e.g., DST7) may be used as the vertical transform type.

In this connection, the threshold may be a natural number such as 2, 4 or 8. The threshold may be variable based on at least one of the size, the shape, the intra-prediction mode, or the prediction encoding mode of the coding block. Alternatively, information for determining the threshold may be signaled in a bitstream.

In the above example, the width and the height of the sub-block are compared with a single threshold. However, the disclosure is not limited thereto. The width and the height of the sub-block may be compared with two thresholds and then the transform type may be determined based on the comparison result. In one example, when the width of the sub-block is smaller than a first threshold or larger than a second threshold, the horizontal transform type may be determined as DCT2. Otherwise, the horizontal transform type may be determined as DST7. Further, when the height of the sub-block is smaller than the first threshold or larger than the second threshold, the vertical transform type may be determined as DCT2. Otherwise, the vertical transform type may be determined as DST7. The second threshold may be a natural number greater than the first threshold. The first threshold may be a natural number such as 2, 4 or 8. The second threshold may be a natural number such as 8, 16 or 32.

In another example, when the sub-block is a square which a height and a width are the same, the horizontal transform type and the vertical transform type may set to be the same, but, when the sub-block is a non-square whose a height and a width are not equal to each other, the horizontal transform type and the vertical transform type may be set to be different from each other. In one example, when the width of the sub-block is greater than the height thereof, the horizontal transform type may be determined as DST7 and the vertical transform type may be determined as DCT2. When the height of the sub-block is greater than the width thereof, the vertical transform type may be determined as DST7 and the horizontal transform type may be determined as DCT2.

Values of residual coefficients included in at least one of the plurality of sub-blocks may be set to 0. In this connection, the residual coefficient refers to a transform coefficient generated via transform, a transform skip coefficient generated via transform skip, or a quantized coefficient generated by quantizing the transform coefficient. In one example, values of the residual coefficients included in a sub-block spaced apart from a boundary of the coding block by a predetermined distance or greater may be set to 0.

FIG. 42 is a diagram to describe an example in which residual coefficients of sub-blocks are set to 0.

In the example shown in FIG. 42, CBF (Coded Block Flag) indicates whether there is a non-zero residual coefficient in a sub-block. When a value of the CBF is 0, it indicates that there is no non-zero residual coefficient in the sub-block, and when a value of the CBF is 1, it indicates that there is a non-zero residual coefficient in the sub-block.

When a distance from a boundary of the coding block to the sub-block is greater than a threshold, the residual coefficients included in the sub-block may be set to 0. In this connection, the distance from the boundary of the coding block to the sub-block may be obtained based on a first sample located at the boundary of the coding block and a second sample included in the sub-block. In one example, the first sample may be a sample located at a top left corner of the coding block, a sample located at a bottom left corner thereof, a sample located at a left-middle thereof, a sample located at a top right corner thereof, a sample located at a bottom right corner thereof, a sample located at a right-middle thereof, a sample located at a top-center thereof, or a sample located at a bottom-center thereof. The second sample may be a sample located at a top left corner of the sub-block, a sample located at a bottom left corner thereof, a sample located at a left-middle thereof, a sample located at a top right corner thereof, a sample located at a bottom right corner thereof, a sample located at a right-middle thereof, a sample located in a top center thereof, or a sample located in a bottom center thereof.

The threshold may be determined based on at least one of the size, the shape of the coding block, the number of sub-blocks included in the coding block, or a size of a sub-block. Alternatively, information for determining the threshold may be signaled in a bitstream.

In one example, when vertical partitioning is applied to the current block, a residual coefficient of a sub-block whose distance from a left boundary of the coding block is greater than or equal to a threshold may be set to 0. When a size of the coding block is 64, and the threshold is 32, residual coefficients of sub-blocks (Sub-CU2 and Sub-CU3) whose distance from the left boundary of the coding block is greater than or equal to 32 may be set to 0, as in the example shown in FIG. 42 (*a*).

Alternatively, when horizontal partitioning is applied to the current block, a residual coefficient of a sub-block whose distance from a top boundary of the coding block is greater than or equal to a threshold may be set to 0. When a size of the coding block is 64, and the threshold is 32, residual coefficients of sub-blocks (Sub-CU2 and Sub-CU3) whose a distance from the top boundary of the coding block is greater than or equal to 32 may be set to 0, as in the example shown in FIG. 42 (*b*).

Contrary to the illustrated example, the residual coefficients included in sub-blocks whose distance from the boundary of the coding block is smaller than the threshold may be set to 0.

Alternatively, residual coefficients of remaining sub-blocks excluding a sub-block positioned at a preset position among the plurality of sub-blocks may be set to 0. In one example, when vertical partitioning is applied to the coding block, residual coefficients of remaining sub-blocks excluding the leftmost or rightmost sub-block among the plurality of sub-blocks may be set to 0. Alternatively, when horizontal partitioning is applied to the coding block, residual coefficients of remaining sub-blocks excluding a topmost or bottommost sub-block located among the plurality of sub-blocks may be set to 0.

Encoding of information indicating whether a non-zero coefficient exists in a sub-block, for example, the encoding of the CBF may be omitted. When the CBF encoding is omitted, whether a non-zero residual coefficient is included in each sub-block may be determined based on a distance between the boundary of the coding block and the sub-block or a position of the sub-block. In one example, in the example shown in FIG. 42, the CBF values of sub-block 0 and sub-block 1 (sub-CU0, sub-CU1) may be derived as 1, and the CBF values of sub-block 2 and sub-block 3 (sub-CU2, sub-CU3) may be derived as 0.

Transform and/or quantization may be performed on a sub-block including a non-zero coefficient, while transform and quantization may be omitted on a sub-block not including a non-zero coefficient.

In another example, information indicating whether transform is performed only on a partial region of a coding block or a transform block may be encoded and signaled in a bitstream. The information may be a 1-bit flag, cu_sbt_flag. When the flag is 1, this indicates that transform is performed only on some of the plurality of sub-blocks generated by partitioning the coding block or the transform block. When the flag is 0, this indicates that transform is performed without dividing the coding block or the transform block into sub-blocks.

A technique for performing transform only on a partial region of a coding block may be configured to be allowed only when the sub-partition intra encoding scheme is applied to the coding block. Accordingly, only when the sub-partition intra encoding method is applied to the coding block, cu_sbt_flag may be encoded and signaled in a bitstream. When the value of cu_sbt_flag is 1, transform is performed only on some sub-blocks among a plurality of sub-blocks generated by partitioning the coding block or a transform block. The residual coefficients of the remaining sub-blocks may be set to 0. When the value of cu_sbt_flag is 1, transform may be performed on all sub-blocks.

Alternatively, when the sub-partition intra encoding method is applied to the coding block, the encoding of cu_sbt_flag may be omitted and the value of cu_sbt_flag may be inferred to 1.

In another example, only when the prediction encoding mode of the coding block is inter prediction or current picture referencing, a technique of performing transform only on a partial region of a coding block may be allowed. When the coding block is encoded via inter prediction or via current picture referencing, information indicating whether transform is performed only on a partial region of a coding block may be encoded and signaled in a bitstream. When transform is performed only on the partial region of the coding block, information indicating a partitioning type of the coding block may be encoded and signaled in a bitstream. The information indicating the partitioning type of the coding block may include at least one of information indicating whether the coding block is partitioned into four sub-blocks, information indicating the partitioning direction of the coding block or information indicating the number of sub-blocks. In one example, when cu_sbt_flag is 1, a flag, cu_sbt_quadtree_flag, indicating whether the coding block is partitioned into four sub-blocks may be signaled in a bitstream. When cu_sbt_quadtree_flag is 1, this indicates that the coding block is partitioned into four sub-blocks. In one example, a coding block may be partitioned into 4 sub-blocks by using 3 vertical lines or 3 horizontal lines. Alternatively, a coding block may be partitioned into 4 sub-blocks using one vertical line and one horizontal line. When cu_sbt_quadtree_flag is 0, this indicates that the coding block is partitioned into two sub-blocks. In one example, the coding block may be partitioned into two sub-blocks by using one vertical line or one horizontal line.

Further, a flag indicating the partitioning direction of the coding block may be signaled in a bitstream. In one example, a flag, cu_sbt_horizontal_flag, indicating whether horizontal partitioning is applied to the coding block may be encoded and signaled in a bitstream. When a value of cu_sbt_horizontal_flag is 1, it indicates that horizontal partitioning is applied to the coding block, and when a value of cu_sbt_horizontal_flag is 0, it indicates that vertical partitioning is applied to the coding block.

Information indicating a position of a sub-block in which a non-zero coefficient does not exist or a sub-block on which transform is not performed may be signaled in a bitstream. Based on the information, a sub-block on which transform and/or quantization has been performed and a sub-block on which transform and/or quantization has been omitted may be determined.

FIG. 43 represents an example in which a position of a sub-block on which transform and/or quantization has been performed is specified based on information signaled in a bitstream.

A flag, sbt_upleft_flag, indicating whether a non-zero coefficient exists in a specific position or a first sub-block may be signaled in a bitstream. When the value of sbt_upleft_flag is 1, this indicates that transform and/or quantization has been performed on a sub-block located at a top or a left of the coding block, and indicates that transform and/or quantization has not been performed on a sub-block located at a right or a bottom of the coding block. When the value of sbt_upleft_flag is 0, this indicates that transform and/or quantization has been performed on a sub-block located at the top or the left of the coding block, and indicates that transform and/or quantization has not been performed on a sub-block located at the right or the bottom of the coding block.

When the coding block is partitioned into 4 sub-blocks, a sbt_upleft_flag may indicate that transform and/or quantization has been performed on N sub-blocks. In one example, when the value of sbt_upleft_flag is 1, this indicates that transform and/or quantization have been performed on top or left two sub-blocks. When the value of sbt_upleft_flag is 0, this indicates that transform and/or quantization has been performed on right or bottom two sub-blocks.

Unlike the above illustrated example, the value of N may be set to 1 or 3.

The residual coefficients of the sub-blocks on which transform and/or quantization has not been performed may be set to 0.

The transform type of the sub-block may be determined based on the partitioning direction of the coding block and the position of the sub-block. In one example, when the coding block is divided in the vertical direction, and when transform is performed on a left sub-block among the sub-blocks, the horizontal transform type and the vertical transform type thereof may be set to be different from each other. In one example, the horizontal transform type may be set to DCT8, while the vertical transform type may be set to DST7. To the contrary, when the coding block is divided in the vertical direction, and when transform is performed on a right sub-block among sub-blocks, the horizontal transform type and the vertical transform type of the sub-block may be set to be same as each other. In one example, the horizontal transform type and vertical transform type may be set to DST7.

Alternatively, when the coding block is divided in the horizontal direction, and when transform is performed on a top sub-block among sub-blocks, the horizontal transform type and the vertical transform type may be set to be different from each other. In one example, the horizontal transform type may be set to DST7, and the vertical transform type may be set to DCT8. To the contrary, when the coding block is divided in the horizontal direction, and when transform is performed on a bottom sub-block among sub-blocks, the horizontal transform type and the vertical transform type of the sub-block may be set to be same as each other. In one example, the horizontal transform type and vertical transform type may be set to DST7.

Encoding of information indicating whether a non-zero coefficient exists in a sub-block, for example, encoding of CBF may be omitted. When the CBF encoding is omitted, whether a non-zero residual coefficient is included in each sub-block may be determined based on a position of a sub-block on which transform is performed. In one example, when the value of sbt_upleft_flag is 0, a CBF value of a left or top sub-block may be inferred as 0 and a CBF value of a right or bottom sub-block may be inferred as 1. Alternatively, when the value of sbt_upleft_flag is 1, the CBF value of a left or top sub-block may be inferred as 1, and the CBF value of a right or bottom sub-block may be inferred as 0.

A reconstructed sample of the sub-block on which the transform is performed may be derived as a sum of a prediction sample and a residual sample. To the contrary, a prediction sample of a sub-block on which transform is omitted may be set as a reconstructed sample. Quantization is to reduce energy of a block, and a quantization process includes a process of dividing a transform coefficient by a specific constant value. The constant value may be derived based on a quantization parameter, and the quantization parameter may be defined as a value between 1 and 63.

When the encoder performs transform and quantization, the decoder may obtain a residual block via inverse quantization and inverse transform. The decoder may obtain a sum of the residual block and the prediction block to obtain a reconstructed block for the current block.

When the reconstructed block of the current block is obtained, loss of information as occurring in the process of the quantization and encoding may be reduced via the in-loop filtering. The in-loop filter may include at least one of a deblocking filter, a sample adaptive offset filter (SAO), or an adaptive loop filter (ALF). Hereinafter, a reconstructed block before an in-loop filter is applied is referred to as a first reconstructed block and a reconstructed block after an in-loop filter is applied is referred to as a second reconstructed block.

The second reconstructed block may be obtained by applying at least one of a deblocking filter, SAO or ALF to the first reconstructed block. In this connection, SAO or ALF may be applied after the deblocking filter is applied.

Applying the embodiments as described about the decoding process or the encoding process to the encoding process or the decoding process respectively may be included in the scope of the present disclosure. Within the scope of the present disclosure, the embodiments in which operations occur in a predetermined order may be modified to embodiments in which the operations occur in a different order from the predetermined order.

Although the above-described embodiment is described based on a series of the operations or the flowchart, the embodiment does not limit a time-series order of the operations of the method thereto. In another example, the operations may be performed simultaneously or in a different order therefrom as necessary. Further, in the above-described embodiment, each of the components (for example, a unit, a module, etc.) constituting the block diagram may be implemented in a form of a hardware device or software. A plurality of components may be combined with each other into a single component which may be implemented using a single hardware device or software. The above-described embodiment may be implemented using program instructions that may be executed via various computer components. The instructions may be recorded in a computer-readable storage medium. The computer-readable storage medium may contain therein program instructions, data files, data structures, or the like alone or in combination with each other. Examples of the computer-readable storage media include magnetic media such as hard disks, floppy disks, and magnetic tapes, optical storage media such as CD-ROMs, DVDs, and magneto-optical media such as floptical disks, and hardware devices such as ROM, RAM, flash memory, and the like specifically configured to store therein and execute the program instructions. The hardware device may be configured to operate as one or more software modules to perform processing according to the present disclosure, and vice versa.

INDUSTRIAL AVAILABILITY

The present disclosure may be applied to an electronic device that encodes/decodes video.

What is claimed is:

1. A method for decoding video data, the method comprising:
   determining whether to partition a current block into a plurality of sub-blocks;
   determining an intra-prediction mode for the current block; and
   when the current block is partitioned into the plurality of sub-blocks, performing intra-prediction on each of the sub-blocks, based on the intra-prediction mode,
   wherein whether to partition the current block into the plurality of sub-blocks is determined based on a flag,
   wherein when a size of the current block is smaller than a threshold, parsing of the flag from a bitstream is omitted, and
   wherein when the parsing of the flag is omitted, the flag is considered to indicate that the current block is not partitioned into the plurality of sub-blocks.

2. The method of claim 1, wherein the method further comprises determining a reference sample line of the current block,
   wherein when an index of a determined reference sample line is greater than a threshold, the parsing of the flag from the bitstream is omitted.

3. The method of claim 1, wherein a number of the sub-blocks included in the current block is determined based on at least one of a size or a shape of the current block.

4. The method of claim 1, wherein the method further comprises performing first inverse transform on the current block,
   wherein the first inverse transform is performed based on one among at least one transform core candidate, and
   wherein a number of transform core candidates varies depending on whether the current block has been partitioned into the plurality of sub-blocks.

5. The method of claim 4, wherein the method further comprises performing second inverse transform on the current block, and
   wherein when the second inverse transform is performed, the transform core is set to DCT2.

6. The method of claim 5, wherein a transform coefficient of a region in the current block on which the second inverse transform is not performed is 0.

7. The method of claim 5, wherein whether to perform the second inverse transform is determined based on a position of a last transform coefficient in the current block.

8. A method for encoding video data, the method comprising:
   determining whether to partition a current block into a plurality of sub-blocks;
   determining an intra-prediction mode for the current block; and
   when the current block is partitioned into the plurality of sub-blocks, performing intra-prediction on each of the sub-blocks, based on the intra-prediction mode,
   wherein whether to encode a flag indicating whether to partition the current block into the plurality of sub-blocks into a bitstream is determined based on whether a size of the current block is smaller than a threshold, and
   wherein when the size of the current block is smaller than the threshold, the encoding of the flag is omitted and it is determined that the current block is not partitioned into the plurality of sub-blocks.

9. The method of claim 8, wherein the method further comprises determining a reference sample line of the current block, and
   wherein when an index of the determined reference sample line is greater than a threshold, the encoding of the flag is omitted.

10. The method of claim 8, wherein a number of the sub-blocks included in the current block is determined based on at least one of a size or a shape of the current block.

11. The method of claim 8, wherein the method further comprises performing first transform on the current block,
   wherein the first transform is performed based on one among at least one transform core candidate, and
   wherein a number of transform core candidates varies depending on whether the current block has been partitioned into the plurality of sub-blocks.

12. The method of claim 11, wherein the method further comprises performing second transform on the current block, and
   wherein when the second transform is performed, the transform core is set to DCT2.

13. The method of claim 12, wherein a transform coefficient of a region in the current block in which the second transform is not performed is 0.

14. The method of claim 12, wherein whether to perform the second transform is determined based on a position of a last transform coefficient in the current block.

15. A device for decoding video data, the device comprising an intra-prediction unit configured to:
   determine whether to partition a current block into a plurality of sub-blocks;
   determine an intra-prediction mode for the current block; and
   when the current block is partitioned into the plurality of sub-blocks, perform intra-prediction on each of the sub-blocks, based on the intra-prediction mode,
   wherein whether to partition the current block into the plurality of sub-blocks is determined based on a flag,
   wherein when a size of the current block is smaller than a threshold, parsing of the flag from a bitstream is omitted, and
   wherein when the parsing of the flag is omitted, the flag is considered to indicate that the current block is not partitioned into the plurality of sub-blocks.

* * * * *